US012540287B2

(12) United States Patent
Webster-Gardiner et al.

(10) Patent No.: US 12,540,287 B2
(45) Date of Patent: *Feb. 3, 2026

(54) SUSTAINABLE AVIATION FUEL FROM NORMAL ALPHA OLEFIN BYPRODUCTS AND PROCESS FOR SAME

(71) Applicant: CHEVRON PHILLIPS CHEMICAL COMPANY LP, The Woodlands, TX (US)

(72) Inventors: Michael S. Webster-Gardiner, Kingwood, TX (US); James Hillier, Kingwood, TX (US); Reza Khankal, Bellaire, TX (US); Jared Fern, Kingwood, TX (US); Steven M. Bischof, Kingwood, TX (US); Thomas J. Malinski, The Woodlands, TX (US); Jeffery C. Gee, Kingwood, TX (US); Spencer A. Kerns, Kingwood, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 182 days.

This patent is subject to a terminal disclaimer.

(21) Appl. No.: 18/462,558

(22) Filed: Sep. 7, 2023

(65) Prior Publication Data
US 2025/0084331 A1    Mar. 13, 2025

(51) Int. Cl.
| | | |
|---|---|---|
| *C10L 1/06* | (2006.01) | |
| *B01J 31/02* | (2006.01) | |
| *B01J 31/14* | (2006.01) | |
| *B01J 31/34* | (2006.01) | |
| *C07C 2/32* | (2006.01) | |
| *C07C 5/03* | (2006.01) | |

(52) U.S. Cl.
CPC ............ *C10L 1/06* (2013.01); *B01J 31/0267* (2013.01); *B01J 31/143* (2013.01); *B01J 31/34* (2013.01); *C07C 2/32* (2013.01); *C07C 5/03* (2013.01); *B01J 2231/20* (2013.01); *C07C 2531/22* (2013.01); *C07C 2531/24* (2013.01); *C10L 2270/04* (2013.01)

(58) Field of Classification Search
CPC ..... C10L 1/06; C10L 2270/04; B01J 31/0267; B01J 31/143; B01J 31/34; B01J 2231/20; C07C 2/32; C07C 5/03; C07C 2531/22; C07C 2531/24; C07C 1/24; C07C 2/08; C07C 6/04; Y02P 30/20; C10G 2400/22; C10G 3/42; C10G 50/00; C10G 2300/1014; C10G 2400/08; C10G 69/126
See application file for complete search history.

(56) References Cited

U.S. PATENT DOCUMENTS

| | | | |
|---|---|---|---|
| 6,291,733 B1 | 9/2001 | Small | |
| 6,914,165 B2 | 7/2005 | Flego | |
| 8,334,420 B2 | 12/2012 | Small | |
| 8,680,003 B2 | 3/2014 | Sydora | |
| 8,791,217 B2 | 7/2014 | Hlavinka | |
| 8,969,640 B2 | 3/2015 | Blommel | |
| 9,115,225 B2 | 8/2015 | Hlavinka | |
| 9,175,109 B1 | 11/2015 | Kreischer | |
| 9,352,309 B2 | 5/2016 | Sydora | |
| 9,708,549 B2 | 7/2017 | Gee | |
| 9,745,230 B2 | 8/2017 | Small | |
| 9,840,676 B1 * | 12/2017 | Harvey | ..................... C07C 2/24 |
| 9,968,921 B2 | 5/2018 | Kilgore | |
| 10,113,130 B1 | 10/2018 | Harvey | |
| 10,183,899 B2 | 1/2019 | Bischof | |
| 10,240,102 B2 | 3/2019 | Small | |
| 10,329,212 B2 | 6/2019 | Fern | |
| 10,414,698 B2 | 9/2019 | Fern | |
| 10,435,334 B2 | 10/2019 | Bischof | |
| 10,435,336 B2 | 10/2019 | Kreischer | |
| 10,544,070 B2 | 1/2020 | Small | |
| 10,647,626 B2 | 5/2020 | Coffin | |
| 10,927,052 B2 | 2/2021 | Coffin | |
| 11,072,569 B2 | 7/2021 | Bischof | |
| 11,078,433 B2 | 8/2021 | Smith | |
| 11,174,205 B2 | 11/2021 | Gee | |

(Continued)

FOREIGN PATENT DOCUMENTS

| | | |
|---|---|---|
| WO | 2002004575 A2 | 1/2002 |
| WO | 2018071905 A1 | 4/2018 |

OTHER PUBLICATIONS

Faroon et al., Toxicological Profile for Jet Fuels JP-4 and JP-7, US Dept of Health and Human Services, Jun. 1995.
Holladay et al., Sustainable Aviation Fuel: Review of Technical Pathways. US Dept of Energy, Office of Energy Efficiency and Renewable Energy, Sep. 2020.
ISCC for Sustainable Aviation Fuels.
Small, B., "Insights on the Mechanism for Ethylene Tetramerization", Organometallics, DOI: 10.1021/acs.organomet.2c00285.

(Continued)

*Primary Examiner* — Ali Z Fadhel

(74) *Attorney, Agent, or Firm* — Merchant & Gould P.C.

(57) ABSTRACT

Process for making sustainable aviation fuel (SAF) from specific bio-ethylene oligomerization reactions producing a $C_4$-$C_8$ alpha-olefin and a by-product mixture of $C_{10}$ olefins. This mixed decene stream is upgraded by further oligomerizing with at least one $C_4$-$C_6$ alpha-olefin to provide a $C_{16-}$ olefin stream, which is hydrogenated to $C_{16-}$ paraffins which is used to form a SAF. Employing bio-ethylene to produce the mixed decene stream, which is relatively low-value due in part to its non-selectivity, leverages that non-selectivity into a desirable sustainable aviation fuel product where the low selectivity is preferable. These and other embodiments and aspects are described herein.

36 Claims, No Drawings

(56) References Cited

U.S. PATENT DOCUMENTS

| | | |
|---|---|---|
| 11,186,530 B2 | 11/2021 | Gee |
| 11,358,914 B2 | 6/2022 | Bischof |
| 2012/0197053 A1 | 8/2012 | Cantrell |
| 2012/0209045 A1 | 8/2012 | Wright |
| 2014/0051898 A1 | 2/2014 | Wright |
| 2016/0194257 A1 | 7/2016 | Lilga |
| 2016/0194572 A1* | 7/2016 | Lilga ............... C07C 2/24 585/277 |
| 2017/0327437 A1* | 11/2017 | Hwang ............. C10G 50/00 |
| 2017/0341999 A1* | 11/2017 | Fern ................. C07C 2/36 |
| 2021/0009911 A1 | 1/2021 | Medoff |
| 2021/0355047 A1 | 11/2021 | Li |
| 2022/0396534 A1 | 12/2022 | Vincent |
| 2022/0396741 A1 | 12/2022 | Vincent |
| 2023/0313048 A1 | 10/2023 | Jan |
| 2024/0246887 A1 | 7/2024 | Mathur |
| 2025/0084327 A1* | 3/2025 | Khankal ............ C10G 49/02 |

OTHER PUBLICATIONS

International Search Report and Written Opinion issued in corresponding PCT Application No. PCT/US2024/045290, mailed on Dec. 20, 2024, 16 pages.

International Search Report and Written Opinion issued in corresponding PCT Application No. PCT/US2024/045299, mailed on Feb. 3, 2025, 24 pages.

Babu B Hari et al: "An integrated process for production of jet-fuel range olefins from ethylene using Ni-AISBA-15 and Amberlyst-35 catalysts", Applied Catalysis A: General, vol. 530, 2017, pp. 48-55.

Axens Oligomerization—Bio-Olefin Upgrading, Axens Renewable Paythways, 1 page.

Non-Final Office Action issued in U.S. Appl. No. 18/462,567, filed Sep. 7, 2023. Notification issued Mar. 20, 2025, 21 pages.

Sustainable Aviation Fuel: Review of Technical Pathways, U.S. Department of Energy, energy.gov/eere/bioenergy, 2020, 81 pages.

Toxicological Profile for Jet Fuels JP-4 and JP-7, U.S. Department of Health and Human Services, Agency for Toxic Substances and Disease Registry, Jun. 1995, 150 pages.

International Search Report and Written Opinion issued in corresponding PCT Application No. PCT/US2025/042160, mailed on Nov. 21, 2025, 13 pp.

Liu et al., "Experimental and numberical analysis on flow characteristics and pyrolysis mechanism of hydrocarbon fuel with a novel online hybred method," ScienceDirect, Energy Conversion and Management, 198 (2019) 111817, 14 pp.

Gao et al.," Novel measurement of isobaric specific heat capacity for kerosene RP-3 at high temperature and high pressure," ScienceDirect, Thermochimica Acta 638 (2016) pp. 113-119.

* cited by examiner

SUSTAINABLE AVIATION FUEL FROM NORMAL ALPHA OLEFIN BYPRODUCTS AND PROCESS FOR SAME

CROSS REFERENCE TO RELATED APPLICATIONS

None.

TECHNICAL FIELD

This disclosure relates to the production of sustainable aviation fuels (SAF) from bio-ethylene derived from a biomass ethanol or a bio-syngas ethanol.

BACKGROUND OF THE DISCLOSURE

Although the jet fuel market is smaller than the gasoline and diesel fuel markets, it still constitutes some 25% of the total transportation fuel consumption and currently exceeds 26 billion gallons per year in the U.S. alone. Market growth in jet fuels is expected to approximately double over the next 20 years, while the gasoline markets are expected to decline over this time. Therefore, maintaining a robust jet fuel production and transportation infrastructure, and developing improved processes for producing jet and aviation fuels are becoming increasingly important.

Sustainable aviation fuels (SAF) may offer the needed resilience to meet these future needs in terms of feedstock availability, while addressing the need to reduce emissions. Not only can SAF provide a large reduction of greenhouse gas emissions with little or no changes to current engine technology, SAF may also provide a drop-in fuel solution. Drop-in fuels allow current aircraft to use a 50 percent blend of SAF and Jet A with no engine or other modifications. In addition, SAF production facilities may be located near the airports they service, which may also improve fuel transport issues for jet fuels. Therefore, many companies have set SAF use goals as a primary strategy to attain net-zero emissions.

However, challenges to the large scale production and use of SAF remain. While SAF provide an environmentally sustainable technology, current technologies to produce SAF are not yet economically viable. For example, SAF may cost four to five times as much as conventional jet fuel, and currently makes up less than one percent of fuel available in the market. Therefore, there remains a need for processes for making sustainable aviation fuels which may improve the technology, and enhance the production economics, and which may provide additional benefits or efficiencies to address the rapidly growing need for jet fuel.

SUMMARY OF THE DISCLOSURE

Aviation fuels contain primarily saturated hydrocarbon compounds, including linear and branched alkanes (paraffins), and cycloalkanes (cycloparaffins or naphthenes), with smaller concentrations of aromatic compounds and olefins. The high hydrogen-to-carbon ratio of the paraffins provides a high heat release per unit weight and a relatively cleaner burn than other hydrocarbons, while cycloparaffins provide less heat release per unit of weight but increase the fuel's density.

The composition of aviation fuels is based primarily on fuel specifications which provide the maximum performance for the specific aircraft for which the fuel is used, rather than a specification based on chemical composition.

The ethylene oligomerization process described herein can be used to provide products in the kerosene jet fuel range ($C_8$-$C_{16}$) or wide-cut jet fuel range ($C_5$-$C_{15}$ or $C_4$-$C_{16}$). For example, JP-4 is a wide-cut fuel because it is produced from a broad distillation temperature range and contains a wide array of carbon chain-lengths, from 4 to 16 carbons long. The approximate composition of JP-4 is about 86 vol. % saturated hydrocarbons, about 13 vol. % (v/v) aromatic hydrocarbons, about 1 vol. % olefins, and JP-4 has a distillation range of about 60° C. to 270° C.

The process for making a sustainable aviation fuel is based upon generating bio-ethylene by dehydration of biomass ethanol or a bio-syngas ethanol, and subsequently employing certain oligomerization and hydrogenation reactions to generate products which can be used as components in an aviation fuel. In particular, the disclosed process takes advantage of the selective, on-purpose production of a $C_4$-$C_8$ alpha-olefin from ethylene, in which the principal by-product is a mixture of $C_{10}$ olefins, also referred to herein as mixed decenes. Because the mixed decene product in this normal alpha-olefin (NAO) mixture is produced from an ethylene feed derived from bio-ethanol, the mixed decene by-product can be further oligomerized and hydrogenated to form a sustainable aviation fuel comprising $C_{16-}$ paraffins and cycloparaffins. Moreover, the mixed decene by-product itself may also be hydrogenated to form a mixture of decenes which are used as a component of a sustainable aviation fuel by blending with $C_{16-}$ paraffins and cycloparaffins to provide the SAF.

Previously, the mixed decene by-product from the ethylene oligomerization to form $C_4$-$C_8$ alpha-olefins was an undesirable product which has been sold as-is for a low-cost fuel. This relatively low-value by-product can be upgraded as described herein to produce aviation fuel by contacting the mixed decenes with at least one $C_{6-}$ alpha-olefin in the presence of an oligomerization catalyst system to provide a $C_{16-}$ olefin stream, which then can be hydrogenated in the presence of a hydrogenation catalyst to provide a sustainable aviation fuel comprising $C_{16-}$ paraffins. Although the ethylene oligomerization process can be highly selective, for example for producing 1-hexene, the production of decene by-products is not selective. For example, the mixture of decenes can include 1-decene, 2-butyl-1-hexene, 3-propyl-1-heptene, 4-ethyl-1-octene, 5-methyl-1-nonene, 4-decene, and 5-decene. Whether these decenes are hydrogenated to decanes for use as a SAF component or further oligomerized and then hydrogenated to a SAF, the lack of selectivity in their production does not impart any disadvantage to this mixture for a sustainable aviation fuel end-use.

Accordingly, this disclosure provides a process for making a sustainable aviation fuel, the process comprising: (a) providing a bio-ethylene feed, at least a portion of which is derived from the dehydration of biomass ethanol; (b) contacting the bio-ethylene feed with a first catalyst system comprising a first oligomerization catalyst to form an oligomerization product comprising at least one $C_4$-$C_8$ alpha-olefin and a mixture of decenes; (c) separating the mixture of decenes from the oligomerization product; (d) (i) contacting the mixture of decenes with at least one $C_{6-}$ alpha-olefin in the presence of a second catalyst system comprising a second oligomerization catalyst or (ii) contacting the mixture of decenes with at least one $C_{8-}$ alpha-olefin in the presence of a second catalyst system comprising a metathesis catalyst to provide a $C_{16-}$ olefin stream; (e) hydrogenating the $C_{16-}$ olefin stream in the presence of a first hydrogenation catalyst to provide $C_{16-}$ paraffins; and (f) using the $C_{16-}$ paraffins as a component to form a sustainable aviation fuel.

In another aspect for example, this disclosure provides a process for making a sustainable aviation fuel, the process comprising: (a) providing a bio-ethylene feed, at least a portion of which is derived from the dehydration of biomass ethanol; (b) contacting the bio-ethylene feed with a first catalyst system comprising a first oligomerization catalyst to form an oligomerization product comprising at least one $C_4$-$C_8$ alpha-olefin and a mixture of decenes; (c) separating the mixture of decenes from the oligomerization product; (d) contacting the mixture of decenes with at least one $C_{6-}$ alpha-olefin in the presence of a second catalyst system comprising a second oligomerization catalyst to provide a $C_{16-}$ olefin stream; (e) hydrogenating the $C_{16-}$ olefin stream in the presence of a first hydrogenation catalyst to provide $C_{16-}$ paraffins; and (f) using the $C_{16-}$ paraffins as a component to form a sustainable aviation fuel.

In still another aspect for example, this disclosure provides a process for making a sustainable aviation fuel, the process comprising: (a) providing a bio-ethylene feed, at least a portion of which is derived from the dehydration of biomass ethanol; (b) contacting the bio-ethylene feed with a first catalyst system comprising a first oligomerization catalyst to form an oligomerization product comprising at least one $C_4$-$C_8$ alpha-olefin and a mixture of decenes; (c) separating the mixture of decenes from the oligomerization product; (d) contacting the mixture of decenes with at least one $C_{8-}$ alpha-olefin in the presence of a second catalyst system comprising a metathesis catalyst to provide a $C_{16-}$ olefin stream; (e) hydrogenating the $C_{16-}$ olefin stream in the presence of a first hydrogenation catalyst to provide $C_{16-}$ paraffins; and (f) using the $C_{16-}$ paraffins as a component to form a sustainable aviation fuel.

In a further aspect, once the mixture of decenes has been separated from the oligomerization product, it can be utilized in different ways. For example, the process for making a sustainable aviation fuel can comprise: (a) providing a bio-ethylene feed, at least a portion of which is derived from the dehydration of biomass ethanol; (b) contacting the bio-ethylene feed with a first catalyst system comprising a first oligomerization catalyst to form an oligomerization product comprising at least one $C_4$-$C_8$ alpha-olefin and a mixture of decenes; (c) separating the mixture of decenes from the oligomerization product; (d) hydrogenating the mixture of decenes in the presence of a second hydrogenation catalyst to provide a mixture of decanes; and (e) using the mixture of decanes as a component to form a sustainable aviation fuel.

This disclosure also describes, in another aspect, a process for making a sustainable aviation fuel, the process comprising: (a) providing a bio-ethylene feed, at least a portion of which is derived from the dehydration of biomass ethanol; (b) contacting the bio-ethylene feed with a first catalyst system comprising a first oligomerization catalyst to form an oligomerization product comprising at least one $C_4$-$C_6$ alpha-olefin and a mixture of decenes; (c) contacting the oligomerization product with a second catalyst system comprising a second oligomerization catalyst or a metathesis catalyst to provide a $C_{16-}$ olefin stream; (d) hydrogenating the $C_{16-}$ olefin stream in the presence of a first hydrogenation catalyst to provide $C_{16-}$ paraffins; and (c) using the $C_{16-}$ paraffins as a component to form a sustainable aviation fuel. In this process, step (b) of contacting the bio-ethylene feed with the first catalyst system and step (c) of contacting the oligomerization product with the second catalyst system can be carried out in the same reactor or in different reactors, for example, different reactors in series.

In these processes, the $C_{6-}$ alpha-olefins can comprise, consist essentially of, or can be selected from, for example, ethylene, propylene, 1-butene, 1-pentene, 1-hexene, or a combination thereof; or alternatively, ethylene, 1-butene, 1-hexene, or a combination thereof. The $C_{8-}$ alpha-olefins in these process can comprise, consist essentially of, or can be selected from, for example, propylene, 1-butene, 2-butene, isobutylene, 1-pentene, 1-hexene, 3,3-dimethyl-1-butene, 1-octene, or a combination thereof; or alternatively, propylene, 1-butene, 2-butene, 1-hexene, 1-octene, or a combination thereof. Because the mixture of decenes can be contacted with at least one $C_{8-}$ alpha-olefin in the presence of a second catalyst system comprising a metathesis catalyst to provide a $C_{16-}$ olefin stream, it is not necessary to include ethylene among the $C_{8-}$ alpha-olefins, which would result in a non-productive olefin metathesis reaction. The $C_4$-$C_8$ alpha-olefin in this process can comprise or be selected from, for example, 1-butene, 1-hexene, 1-octene, or any combination thereof.

If desired, the sustainable aviation fuel or a component thereof prepare as described herein can be used as-is, that is, it can be used without further purification. In another aspect, the sustainable aviation fuel or a component thereof prepared as described herein can be used following further purification by any method. Suitable purifications may be designed to remove contaminants such as sulfur compounds or may be used to fractionate the SAF or component thereof to select a higher or lower boiling fraction thereof. In a further aspect, the sustainable aviation fuel or the component thereof can be blended with a non-sustainable aviation fuel.

In an aspect, in the disclosed processes for making a sustainable aviation fuel, the step of providing a bio-ethylene feed can include: [1] converting a starch-based feedstock, a sugar-based feedstock, or a cellulosic feedstock to a biomass ethanol; and [2] dehydrating the biomass ethanol to provide a bio-ethylene feed. In these processes described herein, all or only a portion of the bio-ethylene feed used in the disclosed processes can be derived from the dehydration of biomass ethanol. Therefore, in an aspect, the sustainable aviation fuel provided herein can be certified as compliant with the Carbon Offsetting and Reduction Scheme for International Aviation (CORSIA) sustainability criteria in accordance with the International Sustainability and Carbon Certification (ISCC) CORSIA certification system. In another aspect, the sustainable aviation fuel provided herein can be certified as a Lower Carbon Aviation Fuel (LCAF) in accordance with the International Sustainability and Carbon Certification (ISCC) LCAF certification system. In either aspect, the certification can be based upon the weight or fraction of the sustainable aviation fuel attributable to the biomass ethanol determined by mass balance and the free attribution method.

These and other embodiments and aspects of the processes, methods, and compositions including catalyst compositions are described more fully in the Detailed Description and claims and further disclosure such as the Examples provided herein.

DETAILED DESCRIPTION OF THE DISCLOSURE

This disclosure describes a process for making a sustainable aviation fuel (SAF) which is based upon generating bio-ethylene by dehydration of biomass ethanol or a bio-syngas ethanol, which takes advantage of specific ethylene oligomerization reactions which produce an on-purpose $C_4$-$C_8$ alpha-olefin such as 1-butene, 1-hexene, 1-octene, or any combination thereof. In this oligomerization reaction, the predominant by-product is a mixture of $C_{10}$ olefins which may be referred to herein as mixed decenes. The mixed decene stream, although it can be well-defined, is generally an undesirable and low-value product which is sold as a low-cost fuel. By upgrading the mixed decene stream by further oligomerizing the mixed decenes with at least one $C_4$-$C_6$ alpha-olefin to provide a $C_{16-}$ olefin stream which is subsequently hydrogenated, the resulting $C_{16-}$ paraffins can be used as a component to form a sustainable aviation fuel. In this aspect, the use of bio-ethylene to produce what was previously a low value product stream, in part due to its non-selectivity, has allowed leveraging that non-selectivity where it is desirable, in sustainable aviation fuels. For example, the mixed decenes can include 1-decene, 2-butyl-1-hexene, 3-propyl-1-heptene, 4-ethyl-1-octene, 5-methyl-1-nonene, 4-decene, and 5-decene. Hydrogenating these components provides the saturated analogs of these olefins, which are desirable components in SAF.

The mixed decene stream can be utilized in other ways to form products that are useful components in sustainable aviation fuels. For example, when the mixed decenes are formed in the on-purpose bio-ethylene oligomerization to form $C_4$-$C_8$ alpha-olefins, the mixed decenes can be separated from the oligomerization product, hydrogenated to provide a mixture of decanes, and this mixture of bio-decanes can be used as a component to form a sustainable aviation fuel. For example, the mixture of decanes can be blended with $C_{16-}$ paraffins and/or cycloparaffins to provide a sustainable aviation fuel. In any use of the products of this disclosure as components for sustainable aviation fuel (SAF), any further oligomerization or blending and the like can be conducted with other bio-sourced components so that all of the components of the SAF are bio-derived. Alternatively any further oligomerization or blending and the like can be conducted with other components which are partially bio-sourced or not-bio-sourced to provide a fraction or portion of the SAF as constituting a sustainable component.

In another aspect, the mixed decene stream can be utilized in still other ways to form products that are useful components in sustainable aviation fuels. For example, using the processes disclosed herein, the bio-ethylene feed can be catalytically oligomerized to form an oligomerization product comprising at least one $C_4$-$C_8$ alpha-olefin and a mixture of decenes. In an aspect, the oligomerization product can further comprise octenes, dodecenes, tetradecenes, or any combination thereof. The mixture of decenes can be separated from the oligomerization product and subsequently contacted with at least one $C_{6-}$ alpha-olefin in the presence of another oligomerization catalyst system to provide a $C_{16-}$ olefin stream. This $C_{16-}$ olefin stream can then be hydrogenated to provide $C_{16-}$ paraffins, which can be utilized as a component to form a sustainable aviation fuel. Therefore, when produced from bio-ethylene, the mixed decene stream can provide various routes to a SAF.

Accordingly, in an aspect, there is provided a process for making a sustainable aviation fuel, the process comprising: (a) providing a bio-ethylene feed, at least a portion of which is derived from the dehydration of biomass ethanol; (b) contacting the bio-ethylene feed with a first catalyst system comprising a first oligomerization catalyst to form an oligomerization product comprising at least one $C_4$-$C_8$ alpha-olefin and a mixture of decenes; (c) separating the mixture of decenes from the oligomerization product; (d) hydrogenating the mixture of decenes in the presence of a hydrogenation catalyst to provide a mixture of decanes; and (c) using the mixture of decanes as a component to form a sustainable aviation fuel. In this aspect, using the mixture of decanes as a component to form a sustainable aviation fuel can include blending the mixture of decanes with $C_{16-}$ paraffins and/or cycloparaffins to provide a sustainable aviation fuel.

Accordingly, in another aspect, there is provided a process for making a sustainable aviation fuel, the process comprising: (a) providing a bio-ethylene feed, at least a portion of which is derived from the dehydration of biomass ethanol; (b) contacting the bio-ethylene feed with a first catalyst system comprising a first oligomerization catalyst to form an oligomerization product comprising at least one $C_4$-$C_8$ alpha-olefin and a mixture of decenes; (c) separating the mixture of decenes from the oligomerization product; (d) (i) contacting the mixture of decenes with at least one $C_{6-}$ alpha-olefin in the presence of a second catalyst system comprising a second oligomerization catalyst or (ii) contacting the mixture of decenes with at least one $C_{8-}$ alpha-olefin in the presence of a second catalyst system comprising a metathesis catalyst to provide a $C_{16-}$ olefin stream; (e) hydrogenating the $C_{16-}$ olefin stream in the presence of a first hydrogenation catalyst to provide $C_{16-}$ paraffins; and (f) using the $C_{16-}$ paraffins as a component to form a sustainable aviation fuel.

In still a further aspect, provided herein is a process for making a sustainable aviation fuel, the process comprising: (a) providing a bio-ethylene feed, at least a portion of which is derived from the dehydration of biomass ethanol; (b) contacting the bio-ethylene feed with a first catalyst system comprising a first oligomerization catalyst to form an oligomerization product comprising at least one $C_4$-$C_6$ alpha-olefin at least one $C_4$-$C_6$ alpha-olefin, and a mixture of decenes; (c) contacting the oligomerization product with a second catalyst system comprising a second oligomerization catalyst or a metathesis catalyst to provide a $C_{16-}$ olefin stream; (d) hydrogenating the $C_{16-}$ olefin stream in the presence of a first hydrogenation catalyst to provide $C_{16-}$ paraffins; and (c) using the $C_{16-}$ paraffins as a component to form a sustainable aviation fuel. In one aspect of this process, it is not necessary to separate the alpha-olefins from the mixed decenes before contacting with the second catalyst system comprising a second oligomerization catalyst or a metathesis catalyst.

Definitions

To define more clearly the terms used herein, the following definitions are provided, and unless otherwise indicated or the context requires otherwise, these definitions are applicable throughout this disclosure. If a term is used in this disclosure but is not specifically defined herein, the definition from the IUPAC Compendium of Chemical Terminology, $2^{nd}$ Ed (1997) can be applied, as long as that definition does not conflict with any other disclosure or definition applied herein or render indefinite or non-enabled any claim to which that definition is applied. To the extent that any definition or usage provided by any document incorporated herein by reference conflicts with the definition or usage provided herein, the definition or usage provided herein controls.

Groups of elements of the periodic table are indicated using the numbering scheme indicated in the version of the periodic table of elements published in *Chemical and Engineering News*, 63(5), 27, 1985. In some instances, a group of elements may be indicated using a common name assigned to the group. For example alkali metals for Group 1 elements, alkaline earth metals for Group 2 elements, transition metals for Group 3-12 elements, and halogens or halides for Group 17 elements.

Regarding claim transitional terms or phrases, the transitional term "comprising", which is synonymous with "including," "containing," or "characterized by," is inclusive or open-ended and does not exclude additional, unrecited elements or method steps. The transitional phrase "consisting of" excludes any element, step, or ingredient not specified in the claim. The transitional phrase "consisting essentially of" limits the scope of a claim to the specified materials or steps and those that do not materially affect the basic and novel characteristic(s) of the claimed invention. A "consisting essentially of" claim occupies a middle ground between closed claims that are written in a "consisting of" format and fully open claims that are drafted in a "comprising" format. Unless specified to the contrary, describing a process, system, or composition as "consisting essentially of" is not to be construed as "comprising," but is intended to describe the recited component that includes materials which do not significantly alter or do not materially affect the basic and novel characteristic(s) of process, system or composition to which the term is applied. For example, a feedstock consisting essentially of a material A can include impurities typically present in a commercially produced or commercially available sample of the recited material A.

When a claim includes different features and/or feature classes (for example, process steps, feedstock features, and/or product features, among other possibilities), the transitional terms comprising, consisting essentially of, and consisting of, apply only to feature class to which is utilized and it is possible to have different transitional terms or phrases utilized with different features within a claim. For example, a method can comprise several recited steps (and other non-recited steps) but utilize a catalyst composition preparation consisting of specific steps. In another example, a method can comprise several recited steps (and other non-recited steps) but utilize a catalyst composition consisting essentially of recited components. While compositions and methods are described in terms of "comprising" various components or steps, the compositions and methods can also "consist essentially of" or "consist of" the various components or steps, unless stated otherwise.

The terms "a," "an," and "the" are intended, unless specifically indicated otherwise, to include plural alternatives, e.g., at least one. For instance, the disclosure of "a heating zone" or a "heater" is meant to encompass one heating zone (or heater) or more than one heating zone (or heater) unless otherwise specified.

The terms "configured for use" or "adapted for use" and similar language is used herein to reflect that the particular recited structure or procedure is used in the disclosed and claimed system or process, or in a system or process downstream thereof such as an olefin hydrogenation system or process. For example, a particular structure "configured for use" means it is "configured for use in an oligomerization reactor system" for the processes disclosed herein, unless otherwise specified, and therefore is designed, shaped, arranged, constructed, and/or tailored to effect oligomerization, as would have been understood by the skilled person.

For any particular compound disclosed herein, a general structure or name presented is also intended to encompass all structural isomers, conformational isomers, and stereoisomers that can arise from a particular set of substituents, unless indicated otherwise. Thus, a general reference to a compound includes all structural isomers unless explicitly indicated otherwise or unless the context provides or requires otherwise. Additionally, the reference to a general structure or name encompasses all enantiomers, diastereomers, and other optical isomers whether in enantiomeric or racemic forms, as well as mixtures of stereoisomers, as the context permits or requires. For any particular formula or name that is presented, any general formula or name presented also encompasses all conformational isomers, regioisomers, and stereoisomers that can arise from a particular set of substituents.

Compound names such as the olefins in the $C_{16-}$ olefin stream or the paraffins in the $C_{16-}$ paraffins are named according to conventional organic chemistry nomenclature, and many of these compounds may have different systematic names. It will be readily appreciated by the person of ordinary skill in the art that different names may be used in the specification, claims, aspects, reaction schemes, or figures which refer to an identical compound that may be named differently elsewhere in the specification, claims, aspects, reaction schemes, or figures. For example, it will be apparent to the skilled person that the compound 5-methyl-8-methylenedodecane shown in Scheme 1 is the same compound as 5-methylene-8-methyl dodecane recited in the Aspects of the Disclosure and specification, when describing a 1-butene addition or oligomerization product with 5-methylnon-1-ene (also termed 5-methyl-1-nonene). Similarly, 5-methylenetridecane shown in Scheme 1 is the same compound as 2-butyl-1-decene recited in the Aspects of the Disclosure and specification, when describing a 1-butene addition product with 1-decene.

Various numerical ranges are disclosed herein. When Applicant discloses or claims a range of any type, Applicant's intent is to disclose or claim individually each possible number that such a range could reasonably encompass, including end points of the range as well as any sub-ranges and combinations of sub-ranges encompassed therein, unless otherwise specified. For example, by disclosing a temperature of from 70° C. to 80° C., Applicant's intent is to recite individually 70° C., 71° C., 72° C., 73° C., 74° C., 75° C., 76° C., 77° C., 78° C., 79° C., and 80° C., including any sub-ranges and combinations of sub-ranges encompassed therein, and these methods of describing such ranges are interchangeable. Moreover, all numerical end points of ranges are included in the disclosure of a range, unless excluded by proviso. Applicant reserves the right to proviso out or exclude any individual members of any such group of values or ranges, including any sub-ranges or combinations of sub-ranges within the group, that can be claimed according to a range or in any similar manner, if for any reason Applicant chooses to claim less than the full measure of the disclosure, for example, to account for a reference that Applicant may be unaware of at the time of the filing of the application. Further, Applicant reserves the right to proviso out or exclude any individual process steps, reactor elements, chemical substituents, analogs, compounds, ligands, structures, or groups thereof, or any members of a claimed group, if for any reason Applicant chooses to claim less than the full measure of the disclosure.

Values or ranges may be expressed herein as "about", from "about" one particular value, and/or to "about" another particular value. When such values or ranges are expressed, other embodiments disclosed include the specific value recited, from the one particular value, and/or to the other particular value. Similarly, when values are expressed as approximations, by use of the antecedent "about," it will be understood that the particular value forms another embodiment. It will be further understood that there are a number of values disclosed therein, and that each value is also herein disclosed as "about" that particular value in addition to the value itself. In embodiments, use of the term "about" can mean±15% of the stated value, ±10% of the stated value, ±5% of the stated value, ±3% of the stated value, ±2% of the stated value, or ±1% of the stated value. With any disclosure or claim of "about" a certain value, Applicant intends to include embodiments without the qualifier "about".

The term "hydrocarbon" is used herein to refer to a compound containing only carbon and hydrogen. Other identifiers can be utilized to indicate the presence of particular groups in the hydrocarbon (e.g., halogenated hydrocarbon indicates that the presence of one or more halogen atoms replacing an equivalent number of hydrogen atoms in the hydrocarbon).

The term "aliphatic" is used herein to refer to a class of acyclic or cyclic, saturated or unsaturated, carbon compounds, excluding aromatic compounds, e.g., an aliphatic compound is a non-aromatic organic compound. An "aliphatic group" is a generalized group formed by removing one or more hydrogen atoms (as necessary for the particular group) from a carbon atom of an aliphatic compound. Aliphatic compounds and therefore aliphatic groups can contain organic functional group(s) and/or atom(s) other than carbon and hydrogen.

The term "aromatic" is used herein to describe a compound containing a cyclically conjugated hydrocarbon that follows the Hückel (4n+2) rule and containing (4n+2) pi-electrons, where n is an integer from 1 to about 5. Aromatic compounds may be monocyclic or polycyclic unless otherwise specified. Aromatic compounds include "arenes" (hydrocarbon aromatic compounds) and "heteroarenes," also termed "hetarenes" (heteroaromatic compounds formally derived from arenes by replacement of one or more methine (—C=) carbon atoms by trivalent or divalent heteroatoms, in such a way as to maintain the continuous pi-electron system characteristic of aromatic systems and a number of out-of-plane pi-electrons corresponding to the Hückel rule (4n+2)). Thus, an arene is an aromatic hydrocarbon, with or without side chains (e.g., benzene, toluene, or xylene, among others).

The term "olefin" is used herein to refer to acyclic and cyclic hydrocarbons having one or more carbon-carbon double bonds apart from the formal ones in aromatic compounds. The class "olefins" subsumes alkenes and cycloalkenes and the corresponding polyenes. Ethylene, propylene, 1-butene, 2-butene, 1-hexene and the like are non-limiting examples of olefins. The term "alpha olefin" as used in this specification and claims refers to an olefin that has a double bond between the first and second carbon atom of the longest contiguous chain of carbon atoms. The term "alpha olefin" includes linear and branched alpha olefins unless expressly stated otherwise.

The terms "alkane" and "paraffin" are used herein interchangeably to refer to a saturated hydrocarbon compound, and unless otherwise specified, an "alkane" and "paraffin" include linear (n-) and branched (iso-) alkanes (paraffins). Other identifiers can be utilized to indicate the presence of particular groups in the alkane (e.g., halogenated alkane indicates that the presence of one or more halogen atoms replacing an equivalent number of hydrogen atoms in the alkane). Therefore, unless otherwise stated, the term $C_{16-}$ paraffins includes linear $C_{16-}$ n-alkanes and branched $C_{16-}$ iso-alkanes, for example, the $C_{16-}$ paraffins can include $C_{12}$ to $C_{16}$ n-alkanes, $C_{12}$ to $C_{16}$ iso-alkanes, or mixtures thereof.

The carbon count terminology used herein is standard in the industry to reflect a range, an inclusive upper limit, or an inclusive lower limit of a hydrocarbon or mixture of hydrocarbons, and this terminology does not require that each and every carbon count encompassed by the range or limit is present in the composition, as will be understood by the person of ordinary skill. For example, "$C_{16-}$ paraffins" refers to $C_{16}$ and lower carbon number paraffins, but does not necessarily require that all compounds in the disclose range be present. Specifically, the skilled person will appreciate that this terminology is context dependent.

The terms "cycloalkane," "cycloparaffin," and "naphthene" are used herein interchangeably to describe a saturated cyclic hydrocarbon, with or without side chains, for example, cyclobutane. Other identifiers can be utilized to indicate the presence of particular groups in the cycloparaffin (e.g., halogenated cycloalkane indicates that the presence of one or more halogen atoms replacing an equivalent number of hydrogen atoms in the cycloalkane). Unsaturated cyclic hydrocarbons having one endocyclic double or one triple bond are called cycloalkenes and cycloalkynes, respectively. Those having more than one such multiple bond are cycloalkadienes, cycloalkatrienes, and so forth. Other identifiers can be utilized to indicate the presence of particular groups in the cycloalkenes, cycloalkadienes, cycloalkatrienes, and so forth.

A chemical "group" or chemical "substituent" may be described according to how that group is formally derived from a reference or "parent" compound, for example, by the number of hydrogen atoms formally removed from the parent compound to generate the group, even if that group is not literally synthesized in this manner. These groups can be utilized as substituents or coordinated or bonded to metal atoms. For example, an "alkyl group" formally can be derived by removing one hydrogen atom from an alkane, while an "alkanediyl group" (also referred to as a "alkylene group") formally can be derived by removing two hydrogen atoms from an alkane. The disclosure that a substituent, ligand, or other chemical moiety can constitute a particular "group" implies that the known rules of chemical structure and bonding are followed when that group is employed as described. When describing a group as being "derived by," "derived from," "formed by," or "formed from," such terms are used in a formal sense and are not intended to reflect any specific synthetic method or procedure, unless specified otherwise or the context requires otherwise.

The terms "catalyst", "catalyst composition," "catalyst mixture," "catalyst system," and the like, do not depend upon the actual product or composition resulting from the contact or reaction of the initial components of the claimed catalyst or catalyst composition/mixture/system, the nature of the active catalytic site, or the fate of the co-catalyst, or substrate for the catalyst, or any activator (e.g., activator-support), after combining these components. Therefore, the terms "catalyst composition," "catalyst mixture," "catalyst system," and the like, encompass the initial starting components of the composition, as well as whatever product(s) may result from contacting these initial starting components, and this is inclusive of both heterogeneous and homogenous catalyst systems or compositions. The terms "catalyst composition," "catalyst mixture," "catalyst system," and the like, may be used interchangeably throughout this disclosure.

Although any methods, devices, and materials similar or equivalent to those described herein can be used in the practice or testing of the invention, the typical methods, devices and materials are herein described.

All publications and patents mentioned herein are incorporated herein by reference for the purpose of describing and disclosing, for example, the constructs and methodologies that are described in the publications, which might be used in connection with the presently described invention. The publications discussed throughout the text are provided solely for their disclosure prior to the filing date of the present application. Nothing herein is to be construed as an admission that the inventors are not entitled to antedate such disclosure by virtue of prior invention.

Initial Oligomerization Products

In the process for making a sustainable aviation fuel according to this disclosure, the first catalyst system comprising a first oligomerization catalyst can oligomerize the bio-ethylene feed to form an oligomerization product, comprising at least one $C_4$-$C_8$ alpha-olefin and by-product mixed decenes. The first oligomerization catalyst and the second oligomerization catalyst can be selected independently from any olefin oligomerization catalyst, and the metathesis catalyst can be selected from any metathesis catalyst. In an aspect, the oligomerization catalysts such as the chromium-based catalyst can be utilized as the first oligomerization catalyst and can provide the oligomerization product comprising at least one $C_4$-$C_8$ alpha-olefin and a mixture of decenes described in detail in this disclosure. The second catalyst system comprising a second oligomerization catalyst can be used to further oligomerize the mixed decenes with, for example, another ethylene or bio-ethylene molecule or a $C_4$-$C_6$ alpha-olefin such as a $C_4$-$C_6$ alpha-olefin prepared in the first oligomerization reaction, to form a $C_{16-}$ olefin stream. The $C_{16-}$ olefin stream can be hydrogenated and used as a component of a SAF.

The second catalyst system comprising a metathesis catalyst can be used in a metathesis reaction of the mixed decenes, for example, with propylene or a $C_4$-$C_8$ alpha-olefin such as a $C_4$-$C_6$ alpha-olefin prepared in the first oligomerization reaction, to form a $C_{16-}$ olefin stream, which also can be hydrogenated and used as a component of a SAF. In either aspect the ethylene, propylene, or $C_4$-$C_8$ alpha-olefins used in these processes can be bio-based such as the such as the $C_4$-$C_6$ alpha-olefin prepared in the first oligomerization reaction, or these olefins can be prepared using ethylene, propylene, or $C_4$-$C_8$ alpha-olefins from non-biological sources in making the sustainable aviation fuel. The second oligomerization catalyst can also be used to for contacting an oligomerization product comprising at least one $C_4$-$C_6$ alpha-olefin and a mixture of decenes, in which the mixture of decenes has not be separated from the oligomerization product, in order to provide a $C_{16-}$ olefin stream. In an aspect, the first catalyst system, the second catalyst system, or both independently can comprise a chromium-based catalyst, a metallocene-based catalyst, a Ziegler-Natta based catalyst, a metal-oxide supported Group 6-10 transition metal-based catalyst, or a combination thereof.

In one aspect, even though the oligomerization product which is formed from oligomerizing the bio-ethylene feed can include a mixture of olefins, it can be analyzed and the composition can be well-defined. The composition of the oligomerization product prepared from bio-ethylene using the first catalyst system can be adjusted according to the specific catalyst system employed and the conditions under which the oligomerization is carried out. In an aspect, the oligomerization product can comprise at least 60 mol %; at least 65 mol %; at least 70 mol %; at least 75 mol %; at least 80 mol %; at least 85 mol %; at least 90 mol %; or at least 95 mol % 1-hexene. Alternatively and in a further aspect, the oligomerization product can comprise at least 60 mol %; at least 65 mol %; at least 70 mol %; at least 75 mol %; at least 80 mol %; at least 85 mol %; at least 90 mol %; or at least 95 mol % 1-octene. The oligomerization product can also comprise at least 60 mol %; at least 65 mol %; at least 70 mol %; at least 75 mol %; at least 80 mol %; at least 85 mol %; at least 90 mol %; or at least 95 mol % 1-hexene and 1-octene combined.

A further aspect provides that the oligomerization product prepared from bio-ethylene using the first catalyst system can comprise at least 70 wt. % hexene; at least 75 wt. % hexene; at least 80 wt. % hexene; at least 85 wt. % hexene; or at least 90 wt. % hexene, based upon the weight of the oligomerization product. Alternatively and in a further aspect, the oligomerization product can include from 70 wt. % to 99.8 wt. % hexene; from 75 wt. % to 99.7 wt. % hexene; or alternatively, from 80 wt. % to 99.6 wt. % hexane, based upon the weight of the oligomerization product. Alternatively and in another aspect, the oligomerization product can also comprise at least 70 wt. % octene; at least 75 wt. % octene; at least 80 wt. % octene; at least 85 wt. % octene; or at least 90 wt. % octene, based upon the weight of the oligomerization product. Alternatively, the oligomerization product can include from 70 wt. % to 99.8 wt. % octene; from 75 wt. % to 99.7 wt. % octene; or from 80 wt. % to 99.6 wt. % octene, based upon the weight of the oligomerization product.

In a further aspect, the oligomerization product can include the mixed decenes in a concentration of at least 0.5 mol %; at least 1 mol %; at least 2 mol %; at least 3 mol %; at least 4 mol %; at least 5 mol %; at least 6 mol %; at least 8 mol %; at least 10 mol %; at least 12 mol %; or at least 15 mol % in the oligomerization product. The oligomerization product can comprise the mixture of decenes in a concentration of less than 40 mol %; less than 35 mol %; less than 30 mol %; less than 25 mol %; less than 20 mol %; less than 15 mol %; less than 10 mol %; or less than 5 mol %. For example, contacting the bio-ethylene feed with the first catalyst system can be carried out under conditions in which at least 0.2 wt. %, at least 1 wt. %, at least 2 wt. %, at least 5 wt. %, at least 7 wt. %, at least 10 wt. %, at least 12 wt. %, or at least 15 wt. % of the oligomerization product can include the mixture of decenes. Contacting the bio-ethylene feed with the first catalyst system also may be carried out under conditions in which less than 5 wt. %, less than 7 wt. %, less than 10 wt. %, less than 12 wt. %, less than 15 wt. %, less than 18 wt. %, or less than 20 wt. % of the oligomerization product can comprise or can consist essentially of the mixture of decenes.

As described herein, the mixed decene stream, although it can be well-defined, is formed in a non-selective manner such that a number of decene isomers are produced. For example, the mixture of decenes can comprise 1-decene, 2-butyl-1-hexene, 3-propyl-1-heptene, 4-ethyl-1-octene, 5-methyl-1-nonene, 4-decene, 5-decene, or any combination thereof. In an Aspect, the mixed decenes are described in U.S. Pat. No. 10,647,626, which is incorporated by reference in its entirety.

In an aspect, the mixture of decenes can comprise at least 76 mol %, at least 78 mol %, at least 80 mol %, or at least 82 mol % $C_{10}$ monoolefins. For example, the mixture of decenes can comprise from 76 mol % to 95 mol % $C_{10}$ monoolefins; from 78 mol % to 90 mol % $C_{10}$ monoolefins; from 80 mol % to 88 mol % $C_{10}$ monoolefins; or from 82 mol % to 86 mol % $C_{10}$ monoolefins.

According to a further aspect, the $C_{10}$ monoolefins can include: (a) at least 3 mol %, at least 4 mol %, at least 5 mol %, at least 6 mol %, at least 7 mol %, or at least 8 mol % 2-butyl-1-hexene; (b) at least 8 mol %, at least 9 mol %, at least 10 mol %, at least 11 mol %, at least 12 mol %, or at least 13 mol % 3-propyl-1-heptene; (c) at least 6 mol %, at least 7 mol %, at least 8 mol %, at least 9 mol %, at least 10 mol %, or at least 11 mol % 4-ethyl-1-octene; and (d) at least 20 mol %, at least 22 mol %, at least 24 mol %, at least 26 mol %, at least 28 mol %, or at least 30 mol % 5-methyl-1-nonene.

Further aspects of the mixed decenes, and $C_{10}$ monoolefins specifically, include the following. In one aspect, the $C_{10}$ monoolefins can comprise from 3 mol % to 20 mol %, from 4 mol % to 18 mol %, from 5 mol % to 17 mol %, from 6 mol % to 16 mol %, or from 7 mol % to 15 mol % 2-butyl-1-hexene. Another aspect of the $C_{10}$ monoolefins is that they can comprise from 10 mol % to 32 mol %, from 11 mol % to 30 mol %, from 12 mol % to 28 mol %, from 13 mol % to 26 mol %, or from 14 mol % to 24 mol % 3-propyl-1-heptene. In a further aspect, the $C_{10}$ monoolefins comprise from 7 mol % to 25 mol %, from 8 mol % to 24 mol %, from 9 mol % to 23 mol %, from 10 mol % to 22 mol %, or from 11 mol % to 21 mol % 4-ethyl-1-octene. In still a further aspect, the $C_{10}$ monoolefins comprise from 24 mol % to 52 mol %, from 26 mol % to 50 mol %, from 28 mol % to 48 mol %, from 30 mol % to 46 mol %, or from 32 mol % to 44 mol % 5-methyl-1-nonene.

According to another aspect, the $C_{10}$ monoolefins have any of the following features: (a) a molar ratio of 2-butyl-1-hexene to 5-methyl-1-nonene of at least 2:1, at least 2.4:1, at least 2.6:1, or at least 2.8:1; (b) a molar ratio of 3-propyl-1-heptene to 5-methyl-1-nonene of at least 1.2:1, at least 1.4:1, at least 1.6:1, or at least 1.8:1; (c) a molar ratio of 4-ethyl-1-octene to 5-methyl-1-nonene of at least 1.6:1, at least 1.7:1, at least 1.9:1, or at least 2.1:1; (d) a molar ratio of 2-butyl-1-hexene to 5-methyl-1-nonene of at least 2:1, at least 2.4:1, at least 2.6:1, or at least 2.8:1; (e) a molar ratio of 3-propyl-1-heptene to 5-methyl-1-nonene of at least 1.2:1, at least 1.4:1, at least 1.6:1, or at least 1.8:1; (f) a molar ratio of 4-ethyl-1-octene to 5-methyl-1-nonene of at least 1.6:1, at least 1.7:1, at least 1.9:1, or at least 2.1:1; or (g) any combination thereof.

The oligomerization product can further comprise $C_{9-}$ monoolefins, $C_{11+}$ monoolefins, or combinations thereof, in addition to the decene mixture and the at least one $C_4$-$C_8$ alpha-olefin. In an aspect, the oligomerization product can be further characterized, in another aspect, as further comprising at least 1 mol %, at least 2 mol %, at least 3 mol %, or at least 4 mol % $C_{14}$ monoolefins. For example, the oligomerization product can further comprise from 1 mol % to 12 mol % $C_{14}$ monoolefins; from 2 mol % to 10 mol % $C_{14}$ monoolefins; from 3 mol % to 8 mol % $C_{14}$ monoolefins; or from 4 mol % to 7 mol % $C_{14}$ monoolefins. A further aspect provides that the oligomerization product can further comprise: (a) from 0.1 mol % to 5 mol %, from 0.25 mol % to 4 mol %, or from 0.5 mol % to 3 mol % $C_8$ monoolefins, wherein the $C_8$ monoolefins comprise at least 95 mol % 1-octene; (b) 0.1 mol % to 5 mol %, from 0.25 mol % to 4 mol %, or from 0.5 mol % to 3 mol % $C_{12}$ monoolefins, wherein the $C_{12}$ monoolefins comprise from 54 mol % to 74 mol %, 1-dodecene; (c) from 0.05 mol % to 2 mol %, from 0.04 mol % to 1.5 mol %, from 0.06 mol % to 1.25 mol %, from 0.08 mol % to 1 mol %, or from 0.1 mol % to 0.75 mol % $C_{16}$ monoolefins and/or $C_{18}$ monoolefins; or (d) any combination thereof.

The mixture of decenes produced according to this disclosure, in an aspect, can comprise at least 95 mol % $C_{10}$ monoolefins, and the $C_{10}$ monoolefins comprise: (a) at least 3 mol % 2-butyl-1-hexene; (b) at least 10 mol % 3-propyl-1-heptene; (c) at least 7 mol % 4-ethyl-1-octene; and (d) at least 24 mol % 5-methyl-1-nonene. The mixture of decenes can also include linear $C_{10}$ monoolefins comprising or consisting essentially of 1-decene, 4-decene, 5-decene, or combinations thereof.

Subsequent Oligomerization or Metathesis Products

In the first oligomerization reaction using the first catalyst system, bio-ethylene produces at least one $C_4$-$C_8$ alpha-olefin and a mixture of decenes, such as described above. In some aspects, this mixture is separated and the mixture of decenes is used in subsequent oligomerization or metathesis reactions to provide the $C_{16-}$ olefin stream. In some aspects, it is not necessary to separate this mixture, and the $C_4$-$C_8$ alpha-olefin and a mixture of decenes can be reacted in the presence of the second catalyst system to form oligomerization or metathesis products in the $C_{16-}$ olefin stream.

In aspects, when the mixture of decenes is contacted with at least one $C_{6-}$ alpha-olefin in the presence of a second catalyst system comprising a second oligomerization catalyst, some metathesis products also may form. When the mixture of decenes is contacted with at least one $C_{6-}$ alpha-olefin in the presence of a second catalyst system comprising a metathesis catalyst, some oligomerization or addition products also may form. In an aspect, these reactions with the second catalyst system largely may involve the terminal olefins from the mixed decene stream, namely, 3-propyl-1-heptene, 4-ethyl-1-octene, 5-methyl-1-nonene, and 1-decene. In another aspect, these reactions with the second catalyst system largely may involve the terminal olefins from the mixed decene stream of the formula $CH_2$=CHR, where R is an alkyl, such that only a single alkyl group is bonded to the doubly-bonded C=C moiety, namely, 3-propyl-1-heptene, 4-ethyl-1-octene, 5-methyl-1-nonene, and 1-decene. These olefins from the mixed decene stream are more reactive in the subsequent oligomerization and/or metathesis reactions to form the $C_{16-}$ olefin stream.

In the subsequent reactions of the decenes with at least one $C_4$-$C_8$ alpha-olefin in the presence of the second catalyst system, the resulting $C_{16-}$ olefin stream can then be hydrogenated to form the $C_{16-}$ paraffins that are most useful in the sustainable aviation fuel components. Examples of a $C_{16-}$ olefin stream composition which is derived from olefin addition or oligomerization to the more reactive mixed decenes towards olefin addition or oligomerization, including 3-propyl-1-heptene, 4-ethyl-1-octene, 5-methyl-1-nonene, and 1-decene are provided herein. In addition, examples of a $C_{16-}$ olefin stream composition which is derived from olefin metathesis with the more olefin metathesis-reactive mixed decenes 3-propyl-1-heptene, 4-ethyl-1-octene, 5-methyl-1-nonene, 1-decene, 4-decene, and 5-decene are also provided herein. In this disclosure, the combination of 4-decene and 5-decene may be referred to simply as 4-/5-decene.

The olefin addition products disclosed herein and set out in detail below can vary in their relative concentrations or mole ratios in the $C_{16-}$ olefin stream. For example, in one aspect, the relative concentrations or mole ratios of the olefin addition products can mirror those of the decenes in the precursor mixed decene stream, which are more reactive mixed decenes towards olefin addition or oligomerization, specifically 3-propyl-1-heptene, 4-ethyl-1-octene, 5-methyl-1-nonene, and 1-decene. In another aspect, the relative concentrations or mole ratios of the olefin addition products can be different than the relative concentrations of these oligomerization- or addition-reactive decenes in the precursor mixed decene stream. Similarly, the olefin metathesis products disclosed herein and set out in detail below can vary in their relative concentrations or mole ratios in the $C_{16-}$ olefin stream. For example, in one aspect, the relative concentrations or mole ratios of the olefin metathesis products can mirror those of the decenes in the precursor mixed decene stream, which are the more olefin metathesis-reactive decenes 3-propyl-1-heptene, 4-ethyl-1-octene, 5-methyl-1-nonene, 1-decene, 4-decene, and 5-decene In another aspect, the relative concentrations or mole ratios of the olefin metathesis products can be different than the relative concentrations of these metathesis-reactive decenes in the precursor mixed decene stream.

In an aspect, the $C_{16-}$ olefin stream which is derived from ethylene addition to the more addition-reactive or oligomerization-reactive mixed decenes 3-propyl-1-heptene, 4-ethyl-1-octene, 5-methyl-1-nonene, and 1-decene can comprise or can consist essentially of 2-ethyl-3-propyl-1-heptene, 5-propyl-1-nonene, 2-ethyl-5-methyl-1-nonene, 7-methyl-1-undecene, 2-ethyl-4-ethyl-1-octene, 6-ethyl-1-decene, 2-ethyl-1-decene, and 1-dodecene. In further aspect, the $C_{16-}$ olefin stream which is derived from ethylene addition to the decenes 3-propyl-1-heptene, 4-ethyl-1-octene, 5-methyl-1-nonene, and 1-decene can comprise or can consist essentially of any combination of 2-ethyl-3-propyl-1-heptene, 5-propyl-1-nonene, 2-ethyl-5-methyl-1-nonene, 7-methyl-1-undecene, 2-ethyl-4-ethyl-1-octene, 6-ethyl-1-decene, 2-ethyl-1-decene, and 1-dodecene. In another aspect, the $C_{16-}$ olefin stream which is derived from ethylene addition to 3-propyl-1-heptene, 4-ethyl-1-octene, 5-methyl-1-nonene, and 1-decene can comprise or can consist essentially of any three, any four, any five, any six, or any seven of 2-ethyl-3-propyl-1-heptene, 5-propyl-1-nonene, 2-ethyl-5-methyl-1-nonene, 7-methyl-1-undecene, 2-ethyl-4-ethyl-1-octene, 6-ethyl-1-decene, 2-ethyl-1-decene, and 1-dodecene.

The $C_{16-}$ paraffin stream which is generated from hydrogenation of the $C_{16-}$ olefin stream which is derived from ethylene addition to the more addition-reactive or oligomerization-reactive mixed decenes 3-propyl-1-heptene, 4-ethyl-1-octene, 5-methyl-1-nonene, and 1-decene can comprise or consist essentially of 3-methyl-4-propyloctane, 5-propylnonane, 3,6-dimethyldecane, 5-methylundecane, 5-ethyl-3-methylnonane, 5-ethyldecane, 3-methylundecane, and dodecane. In a further aspect, the $C_{16-}$ paraffin stream which is generated from hydrogenation of the $C_{16-}$ olefin stream which is derived from ethylene addition to the decenes 3-propyl-1-heptene, 4-ethyl-1-octene, 5-methyl-1-nonene, and 1-decene can comprise or consist essentially of any combination of 3-methyl-4-propyloctane, 5-propylnonane, 3,6-dimethyldecane, 5-methylundecane, 5-ethyl-3-methylnonane, 5-ethyldecane, 3-methylundecane, and dodecane. In another aspect, the $C_{16-}$ olefin stream which is derived from ethylene addition to the 3-propyl-1-heptene, 4-ethyl-1-octene, 5-methyl-1-nonene, and 1-decene can comprise or can consist essentially of any three, any four, any five, any six, or any seven of 3-methyl-4-propyloctane, 5-propylnonane, 3,6-dimethyldecane, 5-methylundecane, 5-ethyl-3-methylnonane, 5-ethyldecane, 3-methylundecane, and dodecane.

In an aspect, the $C_{16-}$ olefin stream which is derived from propylene addition to the more addition-reactive or oligomerization-reactive mixed decenes 3-propyl-1-heptene, 4-ethyl-1-octene, 5-methyl-1-nonene, and 1-decene can comprise or can consist essentially of 4-methylene-5-propylnonane, 2-methyl-5-propylnon-1-ene, 7-methyl-4-methyleneundecane, 2,7-dimethylundec-1-ene, 6-ethyl-4-methylenedecane, 6-ethyl-2-methyldec-1-ene, 4-methylenedodecane, and 2-methyldodec-1-ene. In further aspect, the $C_{16-}$ olefin stream which is derived from propylene addition to the decenes 3-propyl-1-heptene, 4-ethyl-1-octene, 5-methyl-1-nonene, and 1-decene can comprise or can consist essentially of any combination of 4-methylene-5-propylnonane, 2-methyl-5-propylnon-1-ene, 7-methyl-4-methyleneundecane, 2,7-dimethylundec-1-ene, 6-ethyl-4-methylenedecane, 6-ethyl-2-methyldec-1-ene, 4-methylenedodecane, and 2-methyldodec-1-ene. In another aspect, the $C_{16-}$ olefin stream which is derived from propylene addition to 3-propyl-1-heptene, 4-ethyl-1-octene, 5-methyl-1-nonene, and 1-decene can comprise or can consist essentially of any three, any four, any five, any six, or any seven of 4-methylene-5-propylnonane, 2-methyl-5-propylnon-1-ene, 7-methyl-4-methyleneundecane, 2,7-dimethylundec-1-ene, 6-ethyl-4-methylenedecane, 6-ethyl-2-methyldec-1-enc, 4-methylenedodecane, and 2-methyldodec-1-ene.

The $C_{16-}$ paraffin stream which is generated from hydrogenation of the $C_{16-}$ olefin stream which is derived from propylene addition to the more addition-reactive or oligomerization-reactive mixed decenes 3-propyl-1-heptene, 4-ethyl-1-octene, 5-methyl-1-nonene, and 1-decene can comprise or consist essentially of 4-methyl-5-propylnonane, 2-methyl-5-propylnonane, 4,7-dimethylundecane, 2,7-dimethylundecane, 6-ethyl-4-methyldecane, 6-ethyl-2-methyldecane, 4-methyldodecane, and 2-methyldodecane. In a further aspect, the $C_{16-}$ paraffin stream which is generated from hydrogenation of the $C_{16-}$ olefin stream which is derived from propylene addition to the decenes 3-propyl-1-heptene, 4-ethyl-1-octene, 5-methyl-1-nonene, and 1-decene can comprise or consist essentially of any combination of 4-methyl-5-propylnonane, 2-methyl-5-propylnonane, 4,7-dimethylundecane, 2,7-dimethylundecane, 6-ethyl-4-methyldecane, 6-ethyl-2-methyldecane, 4-methyldodecane, and 2-methyldodecane. In another aspect, the $C_{16-}$ olefin stream which is derived from propylene addition to the 3-propyl-1-heptene, 4-ethyl-1-octene, 5-methyl-1-nonene, and 1-decene can comprise or consist essentially of any three, any four, any five, any six, or any seven of 4-methyl-5-propylnonane, 2-methyl-5-propylnonane, 4,7-dimethylundecane, 2,7-dimethylundecane, 6-ethyl-4-methyldecane, 6-ethyl-2-methyldecane, 4-methyldodecane, and 2-methyldodecane.

In an aspect, the $C_{16-}$ olefin stream which is derived from 1-butene addition to the more addition-reactive or oligomerization-reactive mixed decenes 3-propyl-1-heptene, 4-ethyl-1-octene, 5-methyl-1-nonene, and 1-decene can comprise or can consist essentially of 5-methylene-6-propyl decane, 3-methylene-6-propyl decane, 5-methylene-8-methyl dodecane, 3-methylene-8-methyl dodecane, 5-methylene-7-ethyl undecane, 3-methylene-7-ethyl undecane, 2-butyl-1-decene, and 2-ethyl-1-dodecene. In further aspect, the $C_{16-}$ olefin stream which is derived from 1-butene addition to the decenes 3-propyl-1-heptene, 4-ethyl-1-octene, 5-methyl-1-nonene, and 1-decene can comprise or can consist essentially of any combination of 5-methylene-6-propyl decane, 3-methylene-6-propyl decane, 5-methylene-8-methyl dodecane, 3-methylene-8-methyl dodecane, 5-methylene-7-ethyl undecane, 3-methylene-7-ethyl undecane, 2-butyl-1-decene, and 2-ethyl-1-dodecene. In another aspect, the $C_{16-}$ olefin stream which is derived from 1-butene addition to 3-propyl-1-heptene, 4-ethyl-1-octene, 5-methyl-1-nonene, and 1-decene can comprise or can consist essentially of any three, any four, any five, any six, or any seven of 5-methylene-6-propyl decane, 3-methylene-6-propyl decane, 5-methylene-8-methyl dodecane, 3-methylene-8-methyl dodecane, 5-methylene-7-ethyl undecane, 3-methylene-7-ethyl undecane, 2-butyl-1-decene, and 2-ethyl-1-dodecene.

The $C_{16-}$ paraffin stream which is generated from hydrogenation of the $C_{16-}$ olefin stream which is derived from 1-butene addition to the more addition-reactive or oligomerization-reactive mixed decenes 3-propyl-1-heptene, 4-ethyl-1-octene, 5-methyl-1-nonene, and 1-decene can comprise or consist essentially of 5-methyl-6-propyldecane, 3-methyl-6-propyldecane, 5,8-dimethyldodecane, 3,8-dimethyldodecane, 5-ethyl-7-methylundecane, 7-ethyl-3-methylundecane, 5-methyltridecane, and 3-methyltridecane. In a further aspect, the $C_{16-}$ paraffin stream which is generated from hydrogenation of the $C_{16-}$ olefin stream which is derived from 1-butene addition to the decenes 3-propyl-1-heptene, 4-ethyl-1-octene, 5-methyl-1-nonene, and 1-decene can comprise or consist essentially of any combination of 5-methyl-6-propyldecane, 3-methyl-6-propyldecane, 5,8-dimethyldodecane, 3,8-dimethyldodecane, 5-ethyl-7-methylundecane, 7-ethyl-3-methylundecane, 5-methyltridecane, and 3-methyltridecane. In another aspect, the $C_{16-}$ olefin stream which is derived from 1-butene addition to the 3-propyl-1-heptene, 4-ethyl-1-octene, 5-methyl-1-nonene, and 1-decene can comprise or consist essentially of any three, any four, any five, any six, or any seven of 5-methyl-6-propyldecane, 3-methyl-6-propyldecane, 5,8-dimethyldodecane, 3,8-dimethyldodecane, 5-ethyl-7-methylundecane, 7-ethyl-3-methylundecane, 5-methyltridecane, and 3-methyltridecane.

In an aspect, the $C_{16-}$ olefin stream which is derived from 1-hexene addition to the more addition-reactive or oligomerization-reactive mixed decenes 3-propyl-1-heptene, 4-ethyl-1-octene, 5-methyl-1-nonene, and 1-decene can comprise or can consist essentially of 6-methylene-5-propyl dodecane, 2-butyl-5-propyl-1-nonene, 2-hexyl-5-methyl-1-nonene, 2-butyl-7-methyl-1-undecene, 6-methylene-4-ethyl tridecane, 2-butyl-6-ethyl-1-decene, 2-hexyl-1-decene, and 4-butyl-1-dodecene. In further aspect, the $C_{16-}$ olefin stream which is derived from 1-hexene addition to the decenes 3-propyl-1-heptene, 4-ethyl-1-octene, 5-methyl-1-nonene, and 1-decene can comprise or can consist essentially of any combination of 6-methylene-5-propyl dodecane, 2-butyl-5-propyl-1-nonene, 2-hexyl-5-methyl-1-nonene, 2-butyl-7-methyl-1-undecene, 6-methylene-4-ethyl tridecane, 2-butyl-6-ethyl-1-decene, 2-hexyl-1-decene, and 4-butyl-1-dodecene. In another aspect, the $C_{16-}$ olefin stream which is derived from 1-hexene addition to 3-propyl-1-heptene, 4-ethyl-1-octene, 5-methyl-1-nonene, and 1-decene can comprise or can consist essentially of any three, any four, any five, any six, or any seven of 6-methylene-5-propyl dodecane, 2-butyl-5-propyl-1-nonene, 2-hexyl-5-methyl-1-nonene, 2-butyl-7-methyl-1-undecene, 6-methylene-4-ethyl tridecane, 2-butyl-6-ethyl-1-decene, 2-hexyl-1-decene, and 4-butyl-1-dodecene.

The $C_{16-}$ paraffin stream which is generated from hydrogenation of the $C_{16-}$ olefin stream which is derived from 1-hexene addition to the more addition-reactive or oligomerization-reactive mixed decenes 3-propyl-1-heptene, 4-ethyl-1-octene, 5-methyl-1-nonene, and 1-decene can comprise or consist essentially of 6-methyl-5-propyldodecane, 5-methyl-8-propyldodecane, 5,8-dimethyltetradecane, 5,10-dimethyltetradecane, 5-ethyl-7-methyltridecane, 5-ethyl-9-methyltridecane, 7-methylpentadecane, and pentadecane. In a further aspect, the $C_{16-}$ paraffin stream which is generated from hydrogenation of the $C_{16-}$ olefin stream which is derived from 1-hexene addition to the decenes 3-propyl-1-heptene, 4-ethyl-1-octene, 5-methyl-1-nonene, and 1-decene can comprise or consist essentially of any combination of 6-methyl-5-propyldodecane, 5-methyl-8-propyldodecane, 5,8-dimethyltetradecane, 5,10-dimethyltetradecane, 5-ethyl-7-methyltridecane, 5-ethyl-9-methyltridecane, 7-methylpentadecane, and pentadecane. In another aspect, the $C_{16-}$ olefin stream which is derived from 1-hexene addition to the 3-propyl-1-heptene, 4-ethyl-1-octene, 5-methyl-1-nonene, and 1-decene can comprise or consist essentially of any three, any four, any five, any six, or any seven of 6-methyl-5-propyldodecane, 5-methyl-8-propyldodecane, 5,8-dimethyltetradecane, 5,10-dimethyltetradecane, 5-ethyl-7-methyltridecane, 5-ethyl-9-methyltridecane, 7-methylpentadecane, and pentadecane.

In an aspect, the $C_{16-}$ olefin stream which is derived from either propylene metathesis or 2-butene metathesis with the more olefin metathesis-reactive mixed decenes 3-propyl-1-heptene. 4-ethyl-1-octene, 5-methyl-1-nonene, 1-decene, 4-decene, and 5-decene can comprise or can consist essentially of 4-propyl-2-octene, 5-ethyl-2-nonene, 6-methyl-2-decene, 2-undecene, 2-hexene, 2-heptene, and 2-octene. In further aspect, the $C_{16-}$ olefin stream which is derived from propylene metathesis with the decenes 3-propyl-1-heptene, 4-ethyl-1-octene, 5-methyl-1-nonene, 1-decene, 4-decene, and 5-decene can comprise or can consist essentially of any combination of 4-propyl-2-octene, 5-ethyl-2-nonene, 6-methyl-2-decene, 2-undecene, 2-hexene, 2-heptene, and 2-octene. In another aspect, the $C_{16-}$ olefin stream which is derived from propylene metathesis with 3-propyl-1-heptene, 4-ethyl-1-octene, 5-methyl-1-nonene, 1-decene, 4-decene, and 5-decene can comprise or can consist essentially of any three, any four, any five, or any six of 4-propyl-2-octene, 5-ethyl-2-nonene, 6-methyl-2-decene, 2-undecene, 2-hexene, 2-heptene, and 2-octene.

The $C_{16-}$ paraffin stream which is generated from hydrogenation of the $C_{16-}$ olefin stream which is derived from either propylene metathesis or 2-butene metathesis with the more olefin metathesis-reactive mixed decenes 3-propyl-1-heptene, 4-ethyl-1-octene, 5-methyl-1-nonene, 1-decene, 4-decene, and 5-decene can comprise or can consist essentially of 4-propyloctane, 5-ethylnonane, 5-methyldecane, undecane, n-hexane, n-heptane, and n-octane. In a further aspect, the $C_{16-}$ paraffin stream which is generated from hydrogenation of the $C_{16-}$ olefin stream which is derived from propylene metathesis with the mixed decenes 3-propyl-1-heptene, 4-ethyl-1-octene, 5-methyl-1-nonene, 1-decene, 4-decene, and 5-decene can comprise or can consist essentially of 4-propyloctane, 5-ethylnonane, 5-methyldecane, undecane, n-hexane, n-heptane, and n-octane. In another aspect, the $C_{16-}$ olefin stream which is derived from propylene metathesis with 3-propyl-1-heptene, 4-ethyl-1-octene, 5-methyl-1-nonene, 1-decene, 4-decene, and 5-decene can comprise or can consist essentially of can comprise or consist essentially of any three, any four, any five, or any six of 4-propyloctane, 5-ethylnonane, 5-methyldecane, undecane, n-hexane, n-heptane, and n-octane.

In an aspect, the $C_{16-}$ olefin stream which is derived from 1-butene metathesis with the more olefin metathesis-reactive mixed decenes 3-propyl-1-heptene, 4-ethyl-1-octene, 5-methyl-1-nonene, 1-decene, 4-decene, and 5-decene can comprise or can consist essentially of 5-propyl-3-nonene, 6-ethyl-3-decene, 7-methyl-3-undecene, 3-dodecene, 3-heptene, 3-octene, and 3-nonene. In further aspect, the $C_{16-}$ olefin stream which is derived from 1-butene metathesis with the decenes 3-propyl-1-heptene, 4-ethyl-1-octene, 5-methyl-1-nonene, 1-decene, 4-decene, and 5-decene can comprise or can consist essentially of any combination of 5-propyl-3-nonene, 6-ethyl-3-decene, 7-methyl-3-undecene, 3-dodecene, 3-heptene, 3-octene, and 3-nonene. In another aspect, the $C_{16-}$ olefin stream which is derived from 1-butene metathesis with 3-propyl-1-heptene, 4-ethyl-1-octene, 5-methyl-1-nonene, 1-decene, 4-decene, and 5-decene can comprise or can consist essentially of any three, any four, any five, or any six of 5-propyl-3-nonene, 6-ethyl-3-decene. 7-methyl-3-undecene, 3-dodecene, 3-heptene, 3-octene, and 3-nonene.

The $C_{16-}$ paraffin stream which is generated from hydrogenation of the $C_{16-}$ olefin stream which is derived from 1-butene metathesis with the more olefin metathesis-reactive mixed decenes 3-propyl-1-heptene, 4-ethyl-1-octene, 5-methyl-1-nonene, 1-decene, 4-decene, and 5-decene can comprise or can consist essentially of 5-propylnonane, 5-ethyldecane, 5-methylundecane, dodecane, heptane, octane, and nonane. In a further aspect, the $C_{16-}$ paraffin stream which is generated from hydrogenation of the $C_{16-}$ olefin stream which is derived from 1-butene metathesis with the mixed decenes 3-propyl-1-heptene, 4-ethyl-1-octene, 5-methyl-1-nonene, 1-decene, 4-decene, and 5-decene can comprise or can consist essentially of 5-propyl-nonane, 5-ethyldecane, 5-methylundecane, dodecane, heptane, octane, and nonane. In another aspect, the $C_{16-}$ olefin stream which is derived from 1-butene metathesis with 3-propyl-1-heptene, 4-ethyl-1-octene, 5-methyl-1-nonene, 1-decene, 4-decene, and 5-decene can comprise or can consist essentially of can comprise or consist essentially of any three, any four, any five, or any six of 5-propylnonane, 5-ethyldecane, 5-methylundecane, dodecane, heptane, octane, and nonane.

In an aspect, the $C_{16-}$ olefin stream which is derived from isobutylene metathesis with the more olefin metathesis-reactive mixed decenes 3-propyl-1-heptene, 4-ethyl-1-octene, 5-methyl-1-nonene, 1-decene, 4-decene, and 5-decene can comprise or can consist essentially of 2-methyl-4-propyl-2-octene. 5-ethyl-2-methyl-2-nonene, 2,6-dimethyl-2-decene, 2-methyl-2-undecene, 2-methyl-2-hexene, 2-methyl-2-heptene, and 2-methyl-2-octene. In further aspect, the $C_{16-}$ olefin stream which is derived from isobutylene metathesis with the decenes 3-propyl-1-heptene, 4-ethyl-1-octene, 5-methyl-1-nonene, 1-decene, 4-decene, and 5-decene can comprise or can consist essentially of any combination of 2-methyl-4-propyl-2-octene, 5-ethyl-2-methyl-2-nonene, 2,6-dimethyl-2-decene, 2-methyl-2-undecene, 2-methyl-2-hexene, 2-methyl-2-heptene, and 2-methyl-2-octene. In another aspect, the $C_{16-}$ olefin stream which is derived from isobutylene metathesis with 3-propyl-1-heptene, 4-ethyl-1-octene, 5-methyl-1-nonene, 1-decene, 4-decene, and 5-decene can comprise or can consist essentially of any three, any four, any five, or any six of 2-methyl-4-propyl-2-octene, 5-ethyl-2-methyl-2-nonene, 2,6-dimethyl-2-decene, 2-methyl-2-undecene, 2-methyl-2-hexene, 2-methyl-2-heptene, and 2-methyl-2-octene.

The $C_{16-}$ paraffin stream which is generated from hydrogenation of the $C_{16-}$ olefin stream which is derived from isobutylene metathesis with the more olefin metathesis-reactive mixed decenes 3-propyl-1-heptene, 4-ethyl-1-octene, 5-methyl-1-nonene, 1-decene, 4-decene, and 5-decene can comprise or can consist essentially of 2-methyl-4-propyloctane, 5-ethyl-2-methylnonane, 2,6-dimethyldecane, 2-methylundecane, 2-methylhexane, 2-methylheptane, and 2-methyloctane. In a further aspect, the $C_{16-}$ paraffin stream which is generated from hydrogenation of the $C_{16-}$ olefin stream which is derived from isobutylene metathesis with the mixed decenes 3-propyl-1-heptene, 4-ethyl-1-octene, 5-methyl-1-nonene, 1-decene, 4-decene, and 5-decene can comprise or can consist essentially of 2-methyl-4-propyloctane, 5-ethyl-2-methylnonane, 2,6-dimethyldecane, 2-methylundecane, 2-methylhexane, 2-methylheptane, and 2-methyloctane. In another aspect, the $C_{16-}$ olefin stream which is derived from isobutylene metathesis with 3-propyl-1-heptene, 4-ethyl-1-octene, 5-methyl-1-nonene, 1-decene, 4-decene, and 5-decene can comprise or can consist essentially of can comprise or consist essentially of any three, any four, any five, or any six of 2-methyl-4-propyloctane, 5-ethyl-2-methylnonane, 2,6-dimethyldecane, 2-methylundecane, 2-methylhexane, 2-methylheptane, and 2-methyloctane In an aspect, the $C_{16-}$ olefin stream which is derived from 1-pentene metathesis with the more olefin metathesis-reactive mixed decenes 3-propyl-1-heptene, 4-ethyl-1-octene, 5-methyl-1-nonene, 1-decene, 4-decene, and 5-decene can comprise or can consist essentially of 6-propyl-4-decene, 7-ethyl-4-undecene, 8-methyl-4-dodecene, 4-tridecene, 4-octene, 4-nonene, and 4-decene. In further aspect, the $C_{16-}$ olefin stream which is derived from 1-pentene metathesis with the decenes 3-propyl-1-heptene, 4-ethyl-1-octene, 5-methyl-1-nonene, 1-decene, 4-decene, and 5-decene can comprise or can consist essentially of any combination of 6-propyl-4-decene, 7-ethyl-4-undecene, 8-methyl-4-dodecene, 4-tridecene, 4-octene, 4-nonene, and 4-decene. In another aspect, the $C_{16-}$ olefin stream which is derived from 1-pentene metathesis with 3-propyl-1-heptene, 4-ethyl-1-octene, 5-methyl-1-nonene, 1-decene, 4-decene, and 5-decene can comprise or can consist essentially of any three, any four, any five, or any six of 6-propyl-4-decene, 7-ethyl-4-undecene, 8-methyl-4-dodecene, 4-tridecene, 4-octene, 4-nonene, and 4-decene.

The $C_{16-}$ paraffin stream which is generated from hydrogenation of the $C_{16-}$ olefin stream which is derived from 1-pentene metathesis with the more olefin metathesis-reactive mixed decenes 3-propyl-1-heptene, 4-ethyl-1-octene, 5-methyl-1-nonene, 1-decene, 4-decene, and 5-decene can comprise or can consist essentially of 5-propyldecane, 5-ethylundecane, 5-methyldodecane, tridecane, octane, nonane, and decane. In a further aspect, the $C_{16-}$ paraffin stream which is generated from hydrogenation of the $C_{16-}$ olefin stream which is derived from 1-pentene metathesis with the mixed decenes 3-propyl-1-heptene, 4-ethyl-1-octene, 5-methyl-1-nonene, 1-decene, 4-decene, and 5-decene can comprise or can consist essentially of 5-propyldecane, 5-ethylundecane, 5-methyldodecane, tridecane, octane, nonane, and decane. In another aspect, the $C_{16-}$ olefin stream which is derived from 1-pentene metathesis with 3-propyl-1-heptene, 4-ethyl-1-octene, 5-methyl-1-nonene, 1-decene, 4-decene, and 5-decene can comprise or can consist essentially of can comprise or consist essentially of any three, any four, any five, or any six of 5-propyldecane, 5-ethylundecane, 5-methyldodecane, tridecane, octane, nonane, and decane.

In an aspect, the $C_{16-}$ olefin stream which is derived from 1-hexene metathesis with the more olefin metathesis-reactive mixed decenes 3-propyl-1-heptene, 4-ethyl-1-octene, 5-methyl-1-nonene, 1-decene, 4-decene, and 5-decene can comprise or can consist essentially of 7-propyl-5-undecene, 8-ethyl-5-dodecene, 9-methyl-5-tridecene, 5-tetradecene, 4-nonene, 5-decene, and 5-undecene. In further aspect, the $C_{16-}$ olefin stream which is derived from 1-hexene metathesis with the decenes 3-propyl-1-heptene, 4-ethyl-1-octene, 5-methyl-1-nonene, 1-decene, 4-decene, and 5-decene can comprise or can consist essentially of any combination of 7-propyl-5-undecene, 8-ethyl-5-dodecene, 9-methyl-5-tridecene, 5-tetradecene, 4-nonene, 5-decene, and 5-undecene. In another aspect, the $C_{16-}$ olefin stream which is derived from 1-hexene metathesis with 3-propyl-1-heptene, 4-ethyl-1- octene, 5-methyl-1-nonene, 1-decene, 4-decene, and 5-decene can comprise or can consist essentially of any three, any four, any five, or any six of 7-propyl-5-undecene, 8-ethyl-5-dodecene, 9-methyl-5-tridecene, 5-tetradecene, 4-nonene, 5-decene, and 5-undecene.

The $C_{16-}$ paraffin stream which is generated from hydrogenation of the $C_{16-}$ olefin stream which is derived from 1-hexene metathesis with the more olefin metathesis-reactive mixed decenes 3-propyl-1-heptene, 4-ethyl-1-octene, 5-methyl-1-nonene, 1-decene, 4-decene, and 5-decene can comprise or can consist essentially of 5-propylundecane, 5-ethyldodecane, 5-methyltridecane, tetradecane, nonane, decane, and undecane. In a further aspect, the $C_{16-}$ paraffin stream which is generated from hydrogenation of the $C_{16-}$ olefin stream which is derived from 1-hexene metathesis with the mixed decenes 3-propyl-1-heptene, 4-ethyl-1-octene, 5-methyl-1-nonene, 1-decene, 4-decene, and 5-decene can comprise or can consist essentially of 5-propylundecane, 5-ethyldodecane, 5-methyltridecane, tetradecane, nonane, decane, and undecane. In another aspect, the $C_{16-}$ olefin stream which is derived from 1-hexene metathesis with 3-propyl-1-heptene, 4-ethyl-1-octene, 5-methyl-1-nonene, 1-decene, 4-decene, and 5-decene can comprise or can consist essentially of can comprise or consist essentially of any three, any four, any five, or any six of 5-propylundecane, 5-ethyldodecane, 5-methyltridecane, tetradecane, nonane, decane, and undecane.

In an aspect, the $C_{16-}$ olefin stream which is derived from 3,3-dimethyl-1-butene metathesis with the more olefin metathesis-reactive mixed decenes 3-propyl-1-heptene, 4-ethyl-1-octene, 5-methyl-1-nonene, 1-decene, 4-decene, and 5-decene can comprise or can consist essentially of 2,2-dimethyl-5-propyl-3-nonene, 6-ethyl-2,2-dimethyl-3-decene, 2,2,7-trimethyl-3-undecene, 2,2-dimethyl-3-dodecene, 2,2-dimethyl-3-heptene, 2,2-dimethyl-3-octene, and 2,2-dimethyl-3-nonene. In further aspect, the $C_{16-}$ olefin stream which is derived from 3,3-dimethyl-1-butene metathesis with the decenes 3-propyl-1-heptene, 4-ethyl-1-octene, 5-methyl-1-nonene, 1-decene, 4-decene, and 5-decene can comprise or can consist essentially of any combination of 2,2-dimethyl-5-propyl-3-nonene, 6-ethyl-2,2-dimethyl-3-decene, 2,2,7-trimethyl-3-undecene, 2,2-dimethyl-3-dodecene, 2,2-dimethyl-3-heptene, 2,2-dimethyl-3-octene, and 2,2-dimethyl-3-nonene. In another aspect, the $C_{16-}$ olefin stream which is derived from 3,3-dimethyl-1-butene metathesis with 3-propyl-1-heptene, 4-ethyl-1-octene, 5-methyl-1-nonene, 1-decene, 4-decene, and 5-decene can comprise or can consist essentially of any three, any four, any five, or any six of 2,2-dimethyl-5-propyl-3-nonene, 6-ethyl-2,2-dimethyl-3-decene, 2,2,7-trimethyl-3-undecene, 2,2-dimethyl-3-dodecene, 2,2-dimethyl-3-heptene, 2,2-dimethyl-3-octene, and 2,2-dimethyl-3-nonene.

The $C_{16-}$ paraffin stream which is generated from hydrogenation of the $C_{16-}$ olefin stream which is derived from 3,3-dimethyl-1-butene metathesis with the more olefin metathesis-reactive mixed decenes 3-propyl-1-heptene, 4-ethyl-1-octene, 5-methyl-1-nonene, 1-decene, 4-decene, and 5-decene can comprise or can consist essentially of 2,2-dimethyl-5-propylnonane, 6-ethyl-2,2-dimethyldecane, 2,2,7-trimethylundecane, 2,2-dimethyldodecane, 2,2-dimethylheptane, 2,2-dimethyloctane, and 2,2-dimethylnonane. In a further aspect, the $C_{16-}$ paraffin stream which is generated from hydrogenation of the $C_{16-}$ olefin stream which is derived from 3,3-dimethyl-1-butene metathesis with the mixed decenes 3-propyl-1-heptene, 4-ethyl-1-octene, 5-methyl-1-nonene, 1-decene, 4-decene, and 5-decene can comprise or can consist essentially of 2,2-dimethyl-5-propylnonane, 6-ethyl-2,2-dimethyldecane, 2,2,7-trimethylundecane, 2,2-dimethyldodecane, 2,2-dimethylheptane, 2,2-dimethyloctane, and 2,2-dimethylnonane. In another aspect, the $C_{16-}$ olefin stream which is derived from 3,3-dimethyl-1-butene metathesis with 3-propyl-1-heptene, 4-ethyl-1-octene, 5-methyl-1-nonene, 1-decene, 4-decene, and 5-decene can comprise or can consist essentially of can comprise or consist essentially of any three, any four, any five, or any six of 2,2-dimethyl-5-propylnonane, 6-ethyl-2,2-dimethyldecane, 2,2,7-trimethylundecane, 2,2-dimethyldodecane, 2,2-dimethylheptane, 2,2-dimethyloctane, and 2,2-dimethylnonane.

In an aspect, the $C_{16-}$ olefin stream which is derived from 1-octene metathesis with the more olefin metathesis-reactive mixed decenes 3-propyl-1-heptene, 4-ethyl-1-octene, 5-methyl-1-nonene, 1-decene, 4-decene, and 5-decene can comprise or can consist essentially of 5-propyl-6-tridecene, 5-ethyl-7-tetradecene, 11-methyl-7-pentadecene, 7-hexadecene, 4-undecene, 5-dodecene, and 6-tridecene. In further aspect, the $C_{16-}$ olefin stream which is derived from 1-octene metathesis with the decenes 3-propyl-1-heptene, 4-ethyl-1-octene, 5-methyl-1-nonene, 1-decene, 4-decene, and 5-decene can comprise or can consist essentially of any combination of 5-propyl-6-tridecene, 5-ethyl-7-tetradecene, 11-methyl-7-pentadecene, 7-hexadecene, 4-undecene, 5-dodecene, and 6-tridecene. In another aspect, the $C_{16-}$ olefin stream which is derived from 1-octene metathesis with 3-propyl-1-heptene, 4-ethyl-1-octene, 5-methyl-1-nonene, 1-decene, 4-decene, and 5-decene can comprise or can consist essentially of any three, any four, any five, or any six of 5-propyl-6-tridecene, 5-ethyl-7-tetradecene, 11-methyl-7-pentadecene, 7-hexadecene, 4-undecene, 5-dodecene, and 6-tridecene.

The $C_{16-}$ paraffin stream which is generated from hydrogenation of the $C_{16-}$ olefin stream which is derived from 1-octene metathesis with the more olefin metathesis-reactive mixed decenes 3-propyl-1-heptene, 4-ethyl-1-octene, 5-methyl-1-nonene, 1-decene, 4-decene, and 5-decene can comprise or can consist essentially of 5-propyltridecane, 5-ethyltetradecane, 5-methylpentadecane, hexadecane, undecane, dodecane, and tridecane. In a further aspect, the $C_{16-}$ paraffin stream which is generated from hydrogenation of the $C_{16-}$ olefin stream which is derived from 1-octene metathesis with the mixed decenes 3-propyl-1-heptene, 4-ethyl-1-octene, 5-methyl-1-nonene, 1-decene, 4-decene, and 5-decene can comprise or can consist essentially of 5-propyltridecane, 5-ethyltetradecane, 5-methylpentadecane, hexadecane, undecane, dodecane, and tridecane. In another aspect, the $C_{16-}$ olefin stream which is derived from 1-octene metathesis with 3-propyl-1-heptene, 4-ethyl-1-octene, 5-methyl-1-nonene, 1-decene, 4-decene, and 5-decene can comprise or can consist essentially of can comprise or consist essentially of any three, any four, any five, or any six of 5-propyltridecane, 5-ethyltetradecane, 5-methylpentadecane, hexadecane, undecane, dodecane, and tridecane.

An example of the oligomerization or addition reactions and products described herein is shown below. In Scheme 1, the $C_{14}$ olefins derived from 1-butene addition to the more addition-reactive or oligomerization-reactive mixed decenes 3-propyl-1-heptene, 4-ethyl-1-octene, 5-methyl-1-nonene, and 1-decene, along with their $C_{14}$ hydrogenation products are shown.

An example of the metathesis reactions and products described herein is shown below. In Scheme 2, the $C_{12-}$ olefins derived from 1-butene metathesis with the more metathesis-reactive mixed decenes 3-propyl-1-heptene, 4-ethyl-1-octene, 5-methyl-1-nonene, 1-decene, 4-decene, and 5-decene along with their $C_{12-}$ hydrogenation products are shown.
In a further aspect, these novel compositions themselves are provided according to the methods of this disclosure.
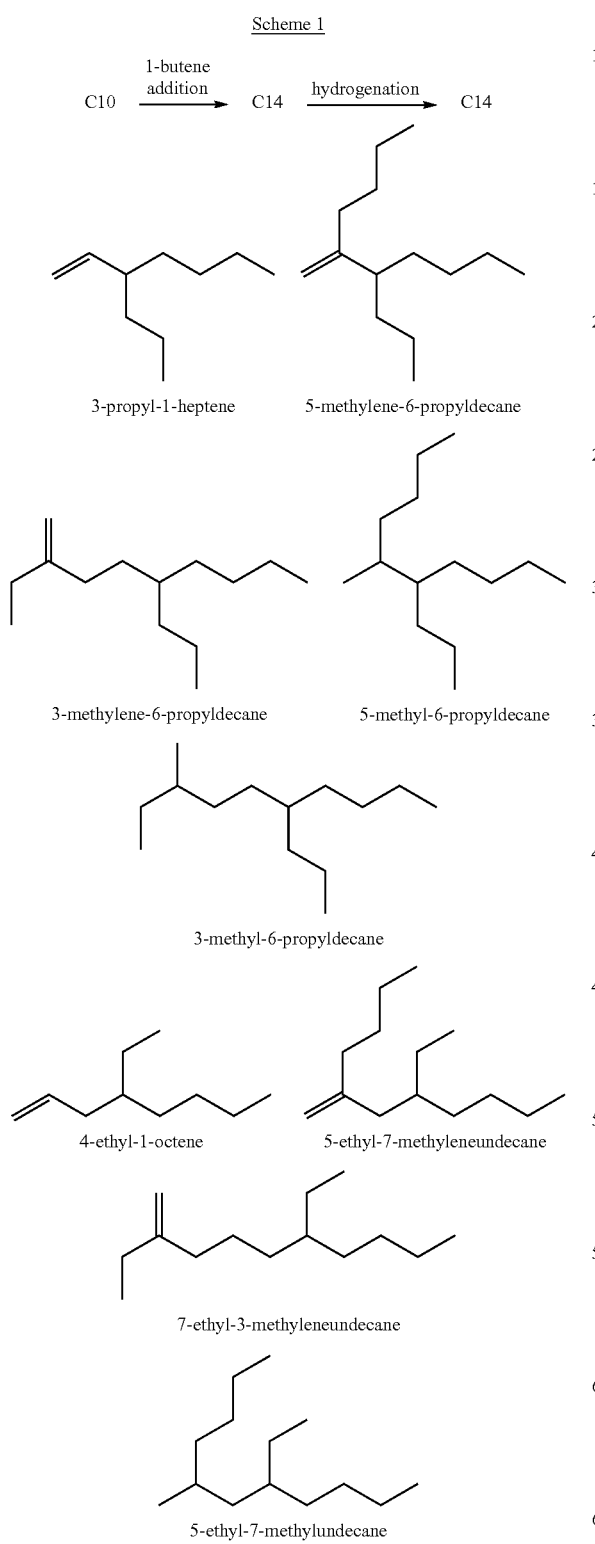
Scheme 1
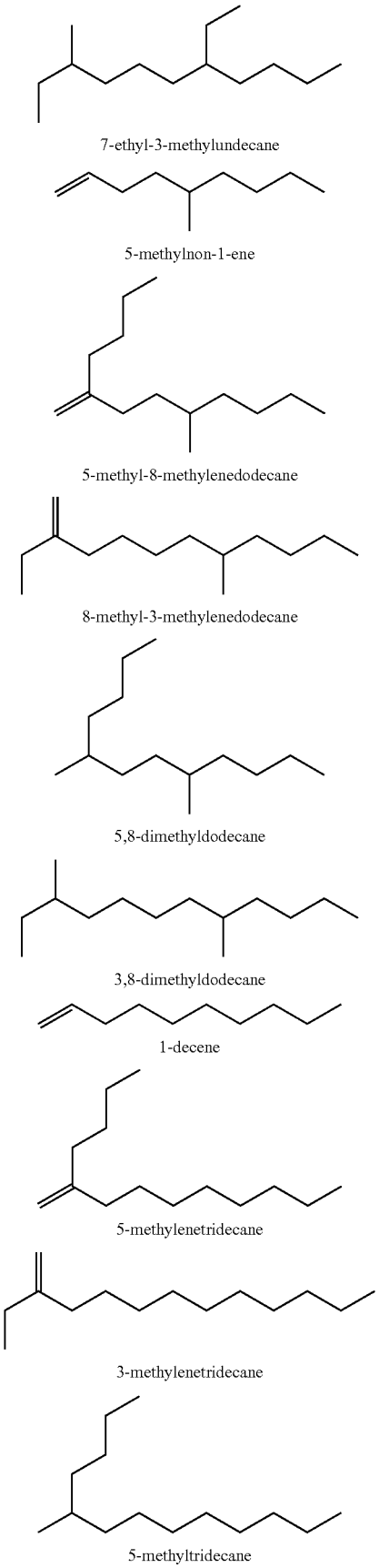

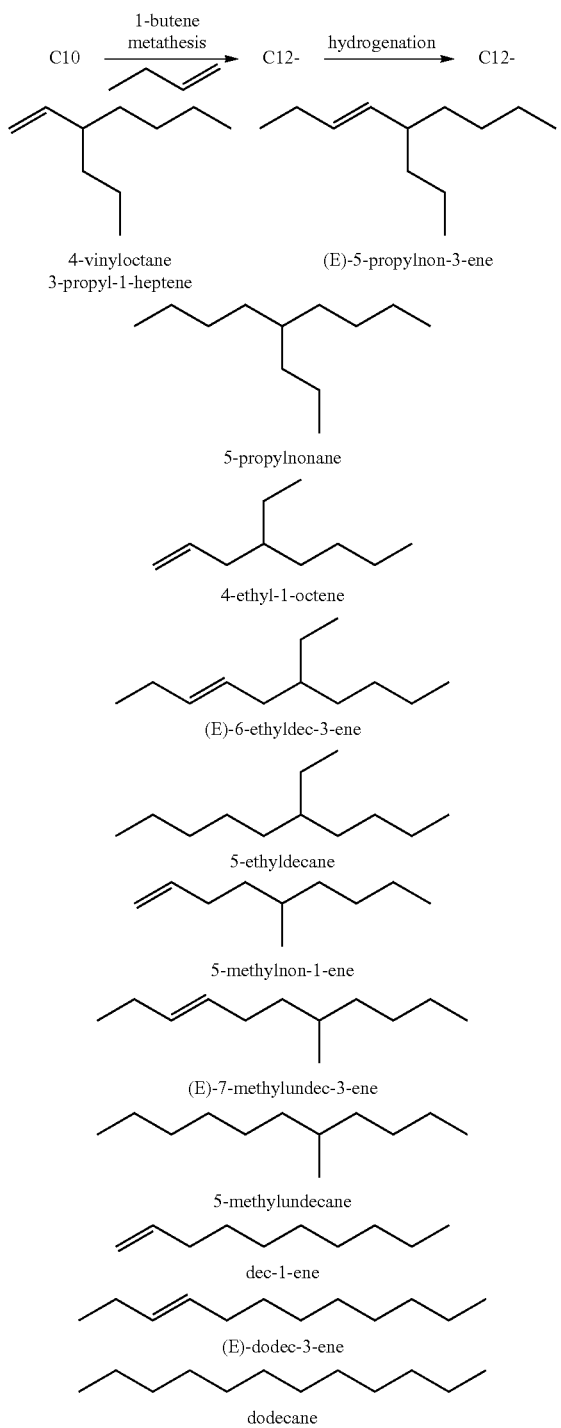

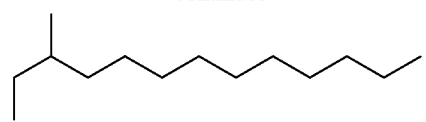
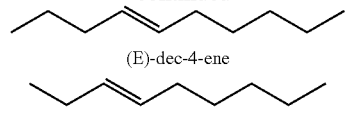
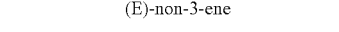
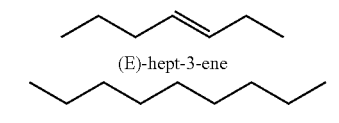
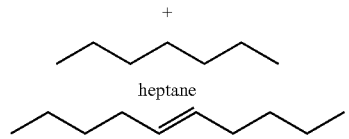
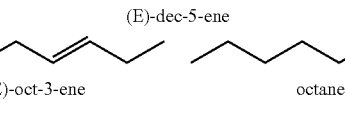
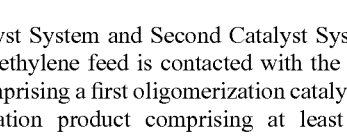
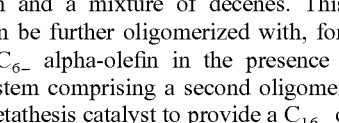
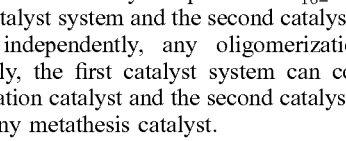

First Catalyst System and Second Catalyst System

The bio-ethylene feed is contacted with the first catalyst system comprising a first oligomerization catalyst to form an oligomerization product comprising at least one $C_4$-$C_8$ alpha-olefin and a mixture of decenes. This mixture of decenes can be further oligomerized with, for example, at least one $C_{6-}$ alpha-olefin in the presence of a second catalyst system comprising a second oligomerization catalyst or a metathesis catalyst to provide a $C_{16-}$ olefin stream. The first catalyst system and the second catalyst system can comprise, independently, any oligomerization catalyst. Alternatively, the first catalyst system can comprise any oligomerization catalyst and the second catalyst system can comprise any metathesis catalyst.

For example, the first catalyst system, the second catalyst system, or both catalyst systems independently can comprise chromium-based catalyst, a metallocene-based catalyst, a Ziegler-Natta based catalyst, a metal-oxide supported Group 6-10 transition metal-based catalyst, or a combination thereof. For example, aspects of this disclosure are provided in the following references, each of which is incorporated herein by reference in its entirety: U.S. Pat. Nos. 6,291,733; 8,334,420; 8,680,003; 8,791,217; 9,115,225; 9,175,109; 9,352,309; 9,708,549; 9,745,230; 9,968,921; 10,183,899; 10,240,102; 10,329,212; 10,414,698; 10,435,334; 10,435,336; 10,544,070; 10,927,052; 11,072,569; and 11,358,914. These references describe chromium-based catalysts and other catalysts which are useful for the ethylene oligomerization process describe herein and can be employed as the first catalyst system or the second catalyst system.

In another aspect, the first catalyst system, the second catalyst system, or both catalyst systems independently can comprise tungstated zirconium, molybdenum zirconium, nickel and/or cobalt doped tungstated zirconium, nickel and/or cobalt doped molybdenum zirconium catalysts, a Group 3 to Group 12 metal-treated zeolite, or combinations thereof.

In a further aspect, the first catalyst system, the second catalyst system, or both catalyst systems independently can comprise, consist essentially of, or be selected from molybdenum oxide on alumina ($MoO_3/Al_2O_3$), tungsten oxide on silica ($WO_3/SiO_2$), tungsten oxide on silica-alumina ($WO_3$/

$SiO_2/Al_2O_3$), rhenium oxide on alumina ($Re_2O_7/Al_2O_3$), cobalt oxide and molybdenum oxide on alumina ($CoO/MoO_3/Al_2O_3$), rhenium oxide on alumina activated with tetramethyl tin ($Re_2O_7/Al_2O_3/SnMe_4$), or any combination thereof.

In one aspect, the first catalyst system, the second catalyst system, or both catalyst systems independently can comprise, consist essentially of, or can be selected from a chromium-based catalyst, as described in detail herein. The chromium-based catalyst can form the oligomerization product comprising at least one $C_4$-$C_8$ alpha-olefin and a mixture of decenes as described in detail. In an aspect, the second catalyst system can comprise a metallocene-based catalyst, a Ziegler-Natta based catalyst, a metal-oxide supported Group 6-10 transition metal-based catalyst, or a combination thereof. For example, the chromium-based catalyst system can form the oligomerization product comprising at least one $C_4$-$C_8$ alpha-olefin and a mixture of decenes, and a metallocene catalyst system can be used to add another bio-ethylene molecule to the decenes to form a $C_{12}$ alpha-olefin. The metallocene-based catalyst, a Ziegler-Natta based catalyst, a metal-oxide supported Group 6-10 transition metal-based catalyst, can be used to oligomerize the mixed decenes with least one $C_{6-}$ alpha-olefin in the presence of a second catalyst system to provide a $C_{16-}$ olefin stream.

In the process for making a sustainable aviation fuel, the first catalyst system, the second catalyst system, or both catalyst systems independently can further comprise a metal alkyl compound which comprises, consists essentially of, or is an organoaluminum compound, an organoaluminoxane, an organoboron compound, an organozinc compound, an organomagnesium compound, an organolithium compound, or any combination thereof. For example, the metal alkyl compound comprises, consists essentially of, or can be a compound having the general formula: a) $M^3(X^{10})_n(X^{11})_{3-n}$, wherein $M^3$ is boron or aluminum and n is from 1 to 3 inclusive; b) $M^4(X^{10})_n(X^{11})_{2-n}$, wherein $M^4$ is magnesium or zinc and n is from 1 to 2 inclusive; or c) $M^5X^{10}$, wherein $M^5$ is Li; wherein $X^{10}$ is independently hydride or a $C_1$ to $C_{20}$ hydrocarbyl; and $X^{11}$ is independently a halide, a hydride, a $C_1$ to $C_{20}$ hydrocarbyl, or a $C_1$ to $C_{20}$ hydrocarbyloxide.

In the process for making a sustainable aviation fuel, in an aspect, the first catalyst system, the second catalyst system, or both catalyst systems independently can further comprise hydrogen. Alternatively, the first catalyst system, the second catalyst system, or both catalyst systems independently can further comprise hydrogen, for example, at a partial pressure of from 2 psi to 100 psi; 5 psi to 75 psi; or 10 psi to 50 psi.

Chromium-Based Catalyst System

In an aspect, the first catalyst system, the second catalyst system, or both catalyst systems independently can comprises or consist essentially of a chromium-based catalyst. For example, the chromium-based catalyst can provide the oligomerization product comprising at least one $C_4$-$C_8$ alpha-olefin and a mixture of decenes described in detail in this disclosure. This mixture of decenes can be further oligomerized with, for example, at least one $C_{6-}$ alpha-olefin in the presence of a second catalyst system, which can also comprise a chromium-based catalyst but other catalyst systems can be used, to provide a $C_{16-}$ olefin stream. The chromium-based catalyst system uses a combination of catalyst components that include a chromium compound and certain heteroatomic compounds referred to as "heteroatomic ligands" which can constitute a ligand on the chromium compound itself or can be used as a separate component of the chromium-based catalyst in combination with a chromium compound that does not include the heteroatomic ligand.

The chromium-based catalyst can comprise or can consist essentially of (a) a chromium-containing compound, (b) a heteroatomic ligand, (c) a metal alkyl compound, and (d) optionally, a diluent. Again, the heteroatomic ligand can be a separate component of the first catalyst system, the second catalyst system, or both, or it can be a ligand complexed to the chromium-containing compound of the first catalyst system, the second catalyst system, or both. As an example, the heteroatomic ligands can comprise, consist essentially of, or be selected from a pyrrole compound, a diphosphino aminyl compound, an $N^2$-phosphinyl amidine compound, or an $N^2$-phosphinyl formamidine compound.

In an aspect of this disclosure the first catalyst system, the second catalyst system, or both independently can comprise, consist essentially of, or are selected from: (a) a chromium-containing compound, a pyrrole compound, an organoaluminum compound, and optionally a halide containing compound; (b) a chromium-containing compound, a diphosphino aminyl compound, an organoaluminum compound; (c) a chromium-containing compound complexed to a diphosphino aminyl compound, and an organoaluminum compound; (d) a chromium-containing compound, an $N^2$-phosphinyl amidine compound, and an organoaluminum compound; (e) a chromium-containing compound complexed to an $N^2$-phosphinyl amidine compound, and an organoaluminum compound; (f) a chromium-containing compound, an $N^2$-phosphinyl formamidine compound, an organoaluminum compound; (g) a chromium-containing compound complexed to an $N^2$-phosphinyl formamidine compound, and an organoaluminum compound; or (h) any combinations thereof.

According to an aspect, the chromium-containing compound can comprise, consist essentially of, or be selected from chromium(II) nitrate, chromium(II) sulfate, chromium(II) fluoride, chromium(II) chloride, chromium(II) bromide, or chromium(II) iodide, chromium(III) nitrate, chromium(III) sulfate, chromium(III) fluoride, chromium(III) chloride, chromium(III) bromide, or chromium(III) iodide.

In another aspect, the chromium-containing compound can be selected from a chromium(II) carboxylate, a chromium(II) alkoxide, chromium(II) aryloxide, a chromium(II) beta-dionate (i.e. beta-diketonate), a chromium(III) carboxylate, a chromium(III) alkoxide, chromium(III) aryloxide, or a chromium(III) beta-dionate (i.e. beta-diketonate). In one example, each carboxylate group of the chromium-containing compound independently can be a $C_2$ to $C_{24}$ carboxylate group, or alternatively a $C_4$ to $C_{19}$ carboxylate group, or alternatively, a $C_5$ to $C_{12}$ carboxylate group. In another example, each alkoxide group of the chromium-containing compound independently can be a $C_1$ to $C_{24}$ alkoxy group, alternatively, a $C_4$ to $C_{19}$ alkoxy group, or alternatively, a $C_5$ to $C_{12}$ alkoxy group. In other examples, each aryloxide group of the chromium-containing compound independently can be a $C_6$ to $C_{24}$ aryloxy group, alternatively, a $C_6$ to $C_{19}$ aryloxy group, or alternatively, a $C_6$ to $C_{12}$ aryloxy group. Each beta-dionate group of the chromium-containing compound independently can be a $C_5$ to $C_{24}$ beta-dionate group, alternatively, a $C_5$ to $C_{19}$ beta-dionate group, or alternatively, a $C_5$ to $C_{12}$ beta-dionate group.

According to an aspect, the first catalyst system, the second catalyst system, or both independently can comprise a chromium carboxylate comprising or consisting essentially of an acetate, a propionate, a butyrate, a pentanoate, a hexanoate, a heptanoate, an octanoate, a nonanoate, a decanoate, an undecanoate, a dodecanoate, a tridecanoate, a tetradecanoate, a pentadecanoate, a hexadecanoate, a heptadecanoate, or an octadecanoate. The first catalyst system, the second catalyst system, or both independently also may comprise a chromium carboxylate wherein each carboxylate group of the chromium carboxylate is independently selected from acetate, propionate, n-butyrate, isobutyrate, valerate (n-pentanoate), neo-pentanoate, capronate (n-hexanoate), n-heptanoate, caprylate (n-octanoate), 2-ethylhexanoate, n-nonanoate, caprate (n-decanoate), n-undecanoate, laurate (n-dodecanoate), or stearate (n-octadecanoate).

Chromium carboxylates are useful chromium compounds, for example, the first catalyst system, the second catalyst system, or both independently can comprise a chromium carboxylate comprising, consisting essentially of, or selected from chromium(II) acetate, chromium(II) propionate, chromium(II) butyrate, chromium(II) isobutyrate, chromium(II) neopentanoate, chromium(II) oxalate, chromium(II) octanoate, chromium(II) 2-ethylhexanoate, chromium(II) laurate, or chromium(II) stearate, chromium(III) acetate, chromium(III) propionate, chromium(III) butyrate, chromium(III) isobutyrate, chromium(III) neopentanoate, chromium(III) oxalate, chromium(III) octanoate, chromium (III) 2-ethylhexanoate, chromium(III) 2,2,6,6,-tetramethylheptanedionate, chromium(III) naphthenate, chromium(III) laurate, or chromium(III) stearate.

Heteroatomic Ligands

The heteroatomic ligands for the chromium-based catalyst system described herein can be used as a separate component of the chromium-based catalyst in combination with a chromium compound, or the heteroatomic ligands can constitute a ligand on the chromium compound itself. In an aspect, the heteroatomic ligand can comprise, can consist essentially of, or can be, an amine compound, an amide compound, an imide compound, or combinations thereof. For example, the heteroatomic ligand can comprise, can consist essentially of, or can be: (a) a $C_2$ to $C_{30}$ amine; alternatively, a $C_2$ to $C_{20}$ amine; alternatively, $C_2$ to $C_{15}$ amine; or alternatively, a $C_2$ to $C_{10}$ amine; (b) a $C_3$ to $C_{30}$ amide; alternatively, a $C_3$ to $C_{20}$ amide; alternatively, $C_3$ to $C_{15}$ amide; or alternatively, a $C_3$ to $C_{10}$ amide; or (c) a $C_4$ to $C_{30}$ imide; alternatively, a $C_4$ to $C_{20}$ imide; alternatively, $C_4$ to $C_{15}$ imide; or alternatively, a $C_4$ to $C_{10}$ imide.

In a further aspect, the heteroatomic ligand can comprise, can consist essentially of, or can be, a pyrrole compound, a diphosphino aminyl compound, an $N^2$-phosphinyl amidine compound, an $N^2$-phosphinyl formamidine compound, or combinations thereof. For example, the heteroatomic ligand can comprise, can consist essentially of, or can be: (a) any pyrrole compound that can form a chromium pyrrolide complex; (b) is pyrrole ($C_5H_5N$), a derivative of pyrrole (e.g., indole), a substituted pyrroles, or a metal pyrrolide compound; or (c) pyrrole or any heteroleptic or homoleptic metal complex or salt containing a pyrrolide radical or ligand; or (b) a $C_4$ to $C_{30}$ pyrrole; alternatively, a $C_4$ to $C_{20}$ pyrrole; alternatively, $C_4$ to $C_{15}$ pyrrole; or alternatively, a $C_4$ to $C_{10}$ pyrrole.

In another aspect, the heteroatomic ligand can comprise, can consist essentially of, or can be a pyrrole compound having the Formula P1 or Formula I1:

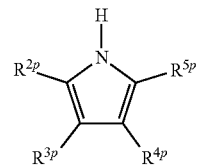

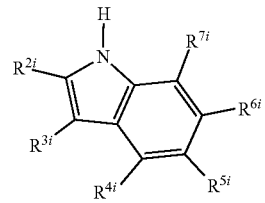

wherein: $R^{2p}$, $R^{3p}$, $R^{4p}$, and $R^{5p}$ of Formula P1 and $R^{2i}$, $R^{3i}$, $R^{4i}$, $R^{5i}$, $R^{6i}$, and $R^{7i}$ of Formula I1 can each independently be:

hydrogen, a $C_1$ to $C_{18}$ organyl group, a $C_1$ to $C_{18}$ hydrocarbyl group, or a $C_3$ to $C_{60}$ silyl group;
alternatively, hydrogen, a $C_1$ to $C_{15}$ organyl group, a $C_1$ to $C_{15}$ hydrocarbyl group, or a $C_3$ to $C_{45}$ silyl group;
alternatively, hydrogen, a $C_1$ to $C_{10}$ organyl group, a $C_1$ to $C_{10}$ hydrocarbyl group, or a $C_3$ to $C_{30}$ silyl group;
alternatively, hydrogen, a $C_1$ to $C_5$ organyl group, a $C_1$ to $C_5$ hydrocarbyl group, or a $C_3$ to $C_{15}$ silyl group.

For example, $R^{2p}$, $R^{3p}$, $R^{4p}$, and $R^{5p}$ of Formula P1 and $R^{2i}$, $R^{3i}$, $R^{4i}$, $R^{5i}$, $R^{6i}$, and $R^{7i}$ of Formula I1 can each independently be: hydrogen, or a $C_1$ to $C_{18}$ hydrocarbyl group; alternatively, hydrogen, or a $C_1$ to $C_{15}$ hydrocarbyl group; alternatively, hydrogen, or a $C_1$ to $C_{10}$ hydrocarbyl group; or alternatively, hydrogen, or a $C_1$ to $C_5$ hydrocarbyl group.

In another aspect, the pyrrole compound can comprise, can consist essentially of, or can be, pyrrole, 2,5-dimethylpyrrole, 2-methyl-5-ethylpyrrole, 2-methyl-5-propylpyrrole, 2,5-diethylpyrrole, 3,4-dimethylpyrrole, 2,5-di-n-propylpyrrole, 2,5-di-n-butylpyrrole, 2,5-di-n-pentylpyrrole, 2,5-di-n-hexylpyrrole, 2,5-di-n-heptylpyrrole, 2,5-di-n-octylpyrrole, 2,5-dibenzylpyrrole, 2,4-dimethyl-3-ethylpyrrole, 2,3,5-triethylpyrrrole, 2,3,5-tri-n-butylpyrrrole, 2,3,5-tri-n-pentylpyrrrole, 2,3,5-tri-n-hexylpyrrrole, 2,3,5-tri-n-heptylpyrrrole, 2,3,5-tri-n-octylpyrrrole, 2,3,4,5-tetraethylpyrrole, 2,3,4,5-tetra-n-butylpyrrole, 2,3,4,5-tetra-n-hexylpyrrole, 2,5-bis(2',2',2'-trifluoroethyl) pyrrole, 2,5-bis(2'-methoxymethyl) pyrrole, 2-methyl-4-isopropylpyrrole, 2-ethyl-4-isopropylpyrrole, 2-methyl-4-sec-butylpyrrole, 2-ethyl-4-sec-butylpyrrole, 2-methyl-4-isobutylpyrrole, 2-ethyl-4-isobutylpyrrole, 2-methyl-4-t-butylpyrrole, 2-ethyl-4-t-butylpyrrole, 2-methyl-4-neopentylpyrrole, 2-ethyl-4-neopentylpyrrole, 3,4-diisopropylpyrrole, 3,4-di-sec-butylpyrrole, 3,4-diisobutylpyrrole, 3,4-di-t-butylpyrrole, 3,4-di-neopentylpropylpyrrole, tetrahydroindole, dipyrrolylmethane, indole, 3,4-dichloropyrrole, 2,3,4,5-tetrachloropyrrole, pyrrole-2-carboxylic acid, 2-acetylpyrrole, pyrrole-2-carboxaldehyde, 3-acetyl-2,4-dimethylpyrrole, ethyl-2,4-dimethyl-5-(ethoxycarbonyl)-3-pyrrole-propionate, or ethyl-3,5-dimethyl-2-pyrrolecarboxylate.

According to another aspect of the heteroatomic ligand, the pyrrole compound can comprise, can consist essentially of, or can be: (a) a metal pyrrolide, such as an alkyl metal pyrrolide; (b) a diorganoaluminum pyrrolide of any pyrrole provided herein; (c) diethylaluminum 2,5-dimethylpyrrolide, ethylaluminum di(2,5-dimethylpyrrolide), aluminum tri (2,5-dimethylpyrrolide), or combinations thereof.

The heteroatomic ligand also may comprise, can consist essentially of, or can be, a diphosphino aminyl compound (i.e. a compound comprising a P—N—P (phosphorus-nitrogen-phosphorus) linkage). For example, the heteroatomic ligand can comprise, can consist essentially of, or can be a diphosphino aminyl moiety having Structure PNP2:

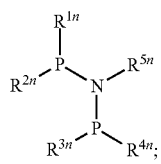

PNP2 wherein the $R^{1n}$, $R^{2n}$, $R^{3n}$, $R^{4n}$, and/or $R^{5n}$, independently can be:

(a) a $C_1$ to $C_{30}$ organyl group; alternatively, a $C_1$ to $C_{20}$ organyl group; alternatively, a $C_1$ to $C_{15}$ organyl group; alternatively, a $C_1$ to $C_{10}$ organyl group; or alternatively, a $C_1$ to $C_5$ organyl group;

(b) a $C_1$ to $C_{30}$ organyl group comprising inert functional groups; alternatively, a $C_1$ to $C_{20}$ organyl group comprising inert functional groups; alternatively, a $C_1$ to $C_{15}$ organyl group comprising inert functional groups; alternatively, a $C_1$ to $C_{10}$ organyl group comprising inert functional groups; or alternatively, a $C_1$ to $C_5$ organyl group comprising inert functional groups;

(c) a $C_1$ to $C_{30}$ hydrocarbyl group; alternatively, a $C_1$ to $C_{20}$ hydrocarbyl group; alternatively, a $C_1$ to $C_{15}$ hydrocarbyl group; alternatively, a $C_1$ to $C_{10}$ hydrocarbyl group; or alternatively, a $C_1$ to $C_5$ hydrocarbyl group;

(d) a $C_1$ to $C_{30}$ alkyl group; alternatively, a $C_1$ to $C_{20}$ alkyl group; alternatively, a $C_1$ to $C_{15}$ alkyl group; alternatively, a $C_1$ to $C_{10}$ alkyl group; or alternatively, a $C_1$ to $C_5$ alkyl group;

(e) a $C_6$ to $C_{30}$ aromatic group; alternatively, a $C_6$ to $C_{20}$ aromatic group; alternatively, a $C_6$ to $C_{15}$ aromatic group; or alternatively, a $C_6$ to $C_{10}$ aromatic group;

(f) a phenyl group or a $C_6$ to $C_{30}$ substituted phenyl group; alternatively, a phenyl group or a $C_6$ to $C_{20}$ substituted phenyl group; alternatively, a phenyl group or a $C_6$ to $C_{15}$ substituted phenyl group; alternatively, a phenyl group or a $C_6$ to $C_{10}$ substituted phenyl group; or alternatively, a phenyl group; or (g) a substituted or an unsubstituted $C_1$ to $C_{20}$ alkyl group, $C_5$ to $C_{20}$ cycloalkyl group, or $C_6$-$C_{20}$ aromatic group;

wherein any substituents are selected independently from a $C_1$ to $C_{10}$ hydrocarbyl group.

In this Structure PNP2, $R^{1n}$ and $R^{2n}$, and/or $R^{3n}$ and $R^{4n}$ of the diphosphino aminyl moiety can be joined to form a ring containing a phosphorus atom of the diphosphino aminyl moiety. For example, $R^{1n}$ and $R^{5n}$, or $R^{4n}$ and $R^{5n}$ of the diphosphino aminyl moiety can be joined to form a ring containing a phosphorus atom and the nitrogen atom of the diphosphino aminyl moiety.

The heteroatomic ligand also may comprise, can consist essentially of, or can be an $N^2$-phosphinyl formamidine compound having Structure NPF1, or an $N^2$-phosphinyl formamidine compound having Structure NPA1:

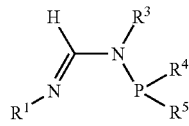

Structure NPF1

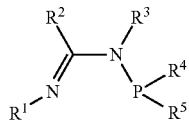

Structure NPA1 wherein $R^1$, $R^2$, $R^3$, $R^4$, and $R^5$ within Structure NPF1 and Structure NPFCr1 are independently:

(a)(i) a $C_1$ to $C_{30}$ organyl group, a $C_1$ to $C_{30}$ organyl group consisting essentially of inert functional groups, or a $C_1$ to $C_{30}$ hydrocarbyl group; (ii) a $C_1$ to $C_{20}$ organyl group, a $C_1$ to $C_{20}$ organyl group consisting essentially of inert functional groups, or a $C_1$ to $C_{20}$ hydrocarbyl group; (iii) a $C_1$ to $C_{15}$ organyl group, a $C_1$ to $C_{15}$ organyl group consisting essentially of inert functional groups, or a $C_1$ to $C_{15}$ hydrocarbyl group; (iv) a $C_1$ to $C_{10}$ organyl group, a $C_1$ to $C_{10}$ organyl group consisting essentially of inert functional groups, or a $C_1$ to $C_{10}$ hydrocarbyl group; or (v) a $C_1$ to $C_5$ organyl group, a $C_1$ to $C_5$ organyl group consisting essentially of inert functional groups, or a $C_1$ to $C_5$ hydrocarbyl group;

(b) a $C_1$ to $C_{30}$ alkyl group; alternatively, a $C_1$ to $C_{20}$ alkyl group; alternatively, a $C_1$ to $C_{15}$ alkyl group; alternatively, a $C_1$ to $C_{10}$ alkyl group; or alternatively, a $C_1$ to $C_5$ alkyl group; or (c) a be a $C_6$ to $C_{30}$ aromatic group; alternatively, a $C_6$ to $C_{20}$ aromatic group; alternatively, a $C_6$ to $C_{15}$ aromatic group; or alternatively, a $C_6$ to $C_{10}$ aromatic group;

(d) a phenyl group or a $C_6$ to $C_{30}$ substituted phenyl group; alternatively, a phenyl group or a $C_6$ to $C_{20}$ substituted phenyl group; alternatively, a phenyl group or a $C_6$ to $C_{15}$ substituted phenyl group; or alternatively, a phenyl group or a $C_6$ to $C_{10}$ substituted phenyl group; or (e) a benzyl group or a $C_6$ to $C_{30}$ substituted benzyl group; alternatively, a benzyl group or a $C_6$ to $C_{20}$ substituted benzyl group; alternatively, a benzyl group or a $C_6$ to $C_{15}$ substituted benzyl group; or alternatively, a benzyl group or a $C_6$ to $C_{10}$ substituted benzyl group.

In view of the heteroatomic ligand disclosed herein and in another aspect, the chromium-containing compound complexed to an $N^2$-phosphinyl formamidine compound or the chromium-containing compound complexed to an $N^2$-phosphinyl amidine compound have the following structures:

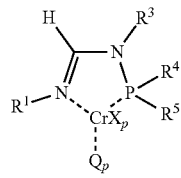

Structure NPFCr1

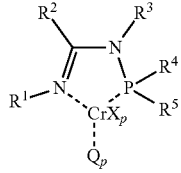

Structure NPACr1 wherein X is an anionic ligand, and p is from 2 to 6, Q is a neutral ligand such as a nitrile ligand or an ether ligand, and q is from 0 to 6; and wherein $R^1$, $R^2$, $R^3$, $R^4$, and $R^5$ within Structure NPF1 and Structure NPFCr1 are independently:

(a)(i) a $C_1$ to $C_{30}$ organyl group, a $C_1$ to $C_{30}$ organyl group consisting essentially of inert functional groups, or a $C_1$ to $C_{30}$ hydrocarbyl group; (ii) a $C_1$ to $C_{20}$ organyl group, a $C_1$ to $C_{20}$ organyl group consisting essentially of inert functional groups, or a $C_1$ to $C_{20}$ hydrocarbyl group; (iii) a $C_1$ to $C_{15}$ organyl group, a $C_1$ to $C_{15}$ organyl group consisting essentially of inert functional groups, or a $C_1$ to $C_{15}$ hydrocarbyl group; (iv) a $C_1$ to $C_{10}$ organyl group, a $C_1$ to $C_{10}$ organyl group consisting essentially of inert functional groups, or a $C_1$ to $C_{10}$ hydrocarbyl group; or (v) a $C_1$ to $C_5$ organyl group, a $C_1$ to $C_5$ organyl group consisting essentially of inert functional groups, or a $C$ to $C_5$ hydrocarbyl group;

(b) a $C_1$ to $C_{30}$ alkyl group; alternatively, a $C_1$ to $C_{20}$ alkyl group; alternatively, a $C_1$ to $C_{15}$ alkyl group; alternatively, a $C_1$ to $C_{10}$ alkyl group; or alternatively, a $C_1$ to $C_5$ alkyl group; or (c) a be a $C_6$ to $C_{30}$ aromatic group; alternatively, a $C_6$ to $C_{20}$ aromatic group; alternatively, a $C_6$ to $C_{15}$ aromatic group; or alternatively, a $C_6$ to $C_{10}$ aromatic group;

(d) a phenyl group or a $C_6$ to $C_{30}$ substituted phenyl group; alternatively, a phenyl group or a $C_6$ to $C_{20}$ substituted phenyl group; alternatively, a phenyl group or a $C_6$ to $C_{15}$ substituted phenyl group; or alternatively, a phenyl group or a $C_6$ to $C_{10}$ substituted phenyl group; or (e) a benzyl group or a $C_6$ to $C_{30}$ substituted benzyl group; alternatively, a benzyl group or a $C_6$ to $C_{20}$ substituted benzyl group; alternatively, a benzyl group or a $C_6$ to $C_{15}$ substituted benzyl group; or alternatively, a benzyl group or a $C_6$ to $C_{10}$ substituted benzyl group.

In another aspect, $R^1$ is a $C_1$ to $C_{15}$ alkyl group, a $C_4$ to $C_{20}$ cycloalkyl group, a $C_4$ to $C_{20}$ substituted cycloalkyl group, a $C_6$ to $C_{20}$ aryl group, or a $C_6$ to $C_{20}$ substituted aryl group; $R^2$ is a $C_1$ to $C_{30}$ organyl group consisting essentially of inert functional groups wherein the inert functional groups are selected from halo groups, nitro groups, hydrocarboxy groups, sulfidyl groups, hydrocarbyl groups, or combinations thereof; $R^3$ is hydrogen, $R^4$ and $R^5$ are each independently a $C_1$ to $C_{30}$ organyl group consisting essentially of inert functional groups wherein the inert functional groups are selected from halo groups, nitro groups, hydrocarboxy groups, sulfidyl groups, hydrocarbyl groups, or combinations thereof.

In any of the heteroatomic ligands disclosed herein, any substituent of a substituted group can be selected from: (a) a halide, a hydrocarbyl group, or a hydrocarboxy group; alternatively, a halide or a hydrocarbyl group; (b) a $C_1$ to $C_{10}$ hydrocarbyl group, or a $C_1$ to $C_{10}$ hydrocarboxy group; alternatively, a halide or a $C_1$ to $C_{10}$ hydrocarbyl group; alternatively, a halide or a $C_1$ to $C_{10}$ hydrocarboxy group; alternatively, a $C_1$ to $C_{10}$ hydrocarbyl group or a $C_1$ to $C_{10}$ hydrocarboxy group; alternatively, a halide; alternatively, a $C_1$ to $C_{10}$ hydrocarbyl group; or alternatively, a $C_1$ to $C_{10}$ hydrocarboxy group.

Organoaluminum Compounds

In the process for making a sustainable aviation fuel, the first catalyst system, the second catalyst system, or both independently can further comprise a metal alkyl compound, which can include an organoaluminum compound such as a trialkylaluminum compound or an organoaluminoxane. For example, the organoaluminum compound can comprise, consist essentially of, or be selected from a triorganoaluminum compound, a diorganoaluminum halide, an organoaluminum dihalide, a diorganoaluminum alkoxide, an organoaluminum dialkoxide, an aluminoxane, or combinations thereof. In an aspect, the organoaluminum compound can have a general formula $Al(R^{10})_n(X^{11})_{3-n}$, wherein: n is from 1 to 3 inclusive; each $R^{10}$ is independently a $C_1$ to $C_{20}$ hydrocarbyl; and $X^{11}$ is independently a halide, a hydride, a $C_1$ to $C_{20}$ hydrocarbyl, or a $C_1$ to $C_{20}$ hydrocarbyloxide. For example, the organoaluminum compound organoaluminum compound can comprise, consist of, consist essentially of, or can be selected from trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, or any combination thereof.

In a further aspect, the organoaluminum compound can comprise, consist essentially of, or can be selected from an aluminoxane compound. For example, the organoaluminum compound can comprise, consist essentially of, or be selected from at least one aluminoxane compound, and wherein the aluminoxane comprises a cyclic aluminoxane having the formula

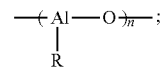

wherein R is a linear or branched alkyl having from 1 to 10 carbon atoms, and n is an integer from 3 to about 10; a linear aluminoxane having the formula

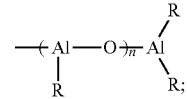

wherein R is a linear or branched alkyl having from 1 to 10 carbon atoms, and n is an integer from 1 to about 50; a cage aluminoxane having the formula $R^t_{5m+a}R^b_{m-a}Al_{4m}O_{3m}$, wherein m is 3 or 4 and $\alpha=N_{Al(3)}-n_{O(2)}+n_{O(4)}$; wherein $n_{Al(3)}$ is the number of three coordinate aluminum atoms, $n_{O(2)}$ is the number of two coordinate oxygen atoms, no (4) is the number of 4 coordinate oxygen atoms, $R^t$ represents a terminal alkyl group, and $R^b$ represents a bridging alkyl group; wherein R is a linear or branched alkyl having from 1 to 10 carbon atoms; or any combination thereof. In another aspect, the organoaluminum compound can comprise, consist essentially of, or be selected from an aluminoxane having the formula $(R^C-Al-O)_t$ or $R^C(R^C-Al-O)_tAl(R^C)_2$, wherein $R^C$ is a linear or branched $C_1$-$C_6$ alkyl such as methyl, ethyl, propyl, butyl, pentyl, or hexyl wherein t is an integer from 1 to 50, inclusive, or t is an integer from 2 to 20.

Examples of organoaluminoxane compounds can include, but are not limited to, the following. In an aspect, the organoaluminum compound can comprise, consist essentially of, or can be selected from methylaluminoxane (MAO), ethylaluminoxane, modified methylaluminoxane (MMAO) such as an isobutyl-modified methyl alumoxane, n-propylaluminoxane, iso-propylaluminoxane, n-butylaluminoxane, t-butylaluminoxane, sec-butylaluminoxane, iso-butylaluminoxane, t-butyl aluminoxane, 1-pentylaluminoxane, 2-pentylaluminoxane, 3-pentylaluminoxane, iso-pentylaluminoxane, neopentylaluminoxane, or any combinations thereof.

Diluents

As described herein, the chromium-based catalyst can comprise or can consist essentially of (a) a chromium-containing compound, (b) a heteroatomic ligand, (c) a metal alkyl compound, and (d) optionally, a diluent. Other catalyst systems described herein can optionally include a diluent if at least a portion of the reaction process is conducted in solution or a slurry. Therefore in an aspect, the first catalyst system, the second catalyst system, or both independently can comprise a diluent. For example, the diluent can comprise, consist essentially of, or be selected from a hydrocarbon, a halogenated hydrocarbon, or combinations thereof. In another aspect, the diluent can comprise, consist essentially of, or be selected from a cyclic diluent, an acyclic diluent, or combinations thereof. In another aspect, the diluent can comprise, consist essentially of, or be selected from a linear diluent, a branched diluent, or combinations thereof.

The diluent used according to this disclosure can also comprise, consist essentially of, or be selected from a aliphatic hydrocarbons, aromatic hydrocarbons, petroleum distillates, halogenated aliphatic hydrocarbons, halogenated aromatic hydrocarbons, or combinations thereof. For example, the diluent can comprise, consist essentially of, or be selected from a $C_3$ to $C_8$ linear or branched acyclic aliphatic hydrocarbon, $C_6$ to $C_{10}$ aromatic hydrocarbons, $C_1$ to $C_{15}$ halogenated aliphatic hydrocarbons, $C_1$ to $C_{10}$ halogenated aliphatic hydrocarbons, $C_1$ to $C_5$ halogenated aliphatic hydrocarbons, $C_6$ to $C_{20}$ halogenated aromatic hydrocarbons, $C_6$ to $C_{10}$ halogenated aromatic hydrocarbons, or combinations thereof.

In a further aspect, the diluent can comprise, consist essentially of, or be selected from a propane, iso-butane, n-butane, butane (n-butane or a mixture of linear and branched $C_4$ acyclic aliphatic hydrocarbons), pentane (n-pentane or a mixture of linear and branched $C_5$ acyclic aliphatic hydrocarbons), hexane (n-hexane or mixture of linear and branched $C_6$ acyclic aliphatic hydrocarbons), heptane (n-heptane or a mixture of linear and branched $C_7$ acyclic aliphatic hydrocarbons), octane (n-octane or a mixture of linear and branched $C_8$ acyclic aliphatic hydrocarbons), cyclohexane, methyl cyclohexane, benzene, toluene, xylene (including ortho-xylene, meta-xylene, para-xylene, or mixtures thereof), ethylbenzene, methylene chloride, chloroform, carbon tetrachloride, dichloroethane, trichloroethane, chlorobenzene, dichlorobenzene, or combinations thereof, which represent examples of suitable diluents.

Oligomerization Conditions

In the process for making a sustainable aviation fuel according to this disclosure, the oligomerization conditions can vary according to the olefin stream, the catalyst, and the like. In an aspect, contacting the bio-ethylene feed with the first catalyst system can be carried out at a total pressure of from 0 psig (0 KPa) to 2,500 psig (17.3 MPa); alternatively, from 0 psig (KPa) to 1,600 psig (11.0 MPa); alternatively, from 0 psig (KPa) to 1,500 psig (10.4 MPa); alternatively, from 50 psig (344 KPa) to 2,500 psig (17.3 MPa); alternatively, from 100 psig (689 KPa) to 2,500 psig (17.3 MPa); alternatively, from 150 psig (1.0 MPa) to 2,000 psig (13.8 MPa); or alternatively, from 300 psig (2.0 MPa) to 900 psig (6.2 MPa). In another aspect, contacting the bio-ethylene feed with the first catalyst system can occur at a bio-ethylene feed pressure of from 0 psig (0 KPa) to 2,500 psig (17.3 MPa); alternatively, from 50 psig (344 KPa) to 2,500 psig (17.3 MPa); alternatively, from 100 psig (689 KPa) to 2,500 psig (17.3 MPa); or alternatively, from 150 psig (1.0 MPa) to 2,000 psig (13.8).

Contacting the bio-ethylene feed with the first catalyst system can occur at any temperature which effects the desired oligomerization reactions. For example, contacting the bio-ethylene feed with the first catalyst system can occur at a temperature of at least 0° C.; alternatively, at least 10° C.; alternatively, at least 20° C.; alternatively, at least 30° C.; alternatively, at least 40° C.; alternatively, at least 50° C.; alternatively, at least 60° C.; alternatively, at least 70° C.; alternatively, at least 80° C.; alternatively, at least 90° C.; alternatively, at least 100° C.; alternatively, at least 110° C.; alternatively, at least 120° C.; alternatively, at least 130° C.; alternatively, at least 140° C.; alternatively, at least 150° C.; alternatively, at least 160° C.; alternatively, at least 170° C.; or alternatively, at least 180° C. The step of contacting the bio-ethylene feed with the first catalyst system can occur at a temperature of less than 180° C.; alternatively, less than 160° C.; alternatively, less than 140° C.; alternatively, less than 120° C.; alternatively, less than 100° C.; alternatively, less than 90° C.; or alternatively, less than 80° C.

In other aspects, contacting the bio-ethylene feed with the first catalyst system can occur at a temperature within a range of from 0° C. to 180° C.; alternatively, from 10° C. to 160° C.; alternatively, from 20° C. to 140° C.; alternatively, from 30° C. to 120° C.; alternatively, from 40° C. to 100° C.; alternatively, from 50° C. to 100° C.; or alternatively, from 60° C. to 140° C.

Biomass Ethanol and Dehydration of Biomass Ethanol to Bio-Ethylene

Biomass ethanol produced by any process can be used according to this disclosure. Biomass ethanol, including the fuel ethanol for blending with gasoline, is largely produced by fermenting the grain starch and sugars from sources such as corn, sorghum, and barley. Other feedstocks for the production of biomass ethanol include agriculture residues such as corn stalks, rice stalks, and grasses such as switchgrass, and ethanol from these sources is also termed cellulosic ethanol as it derives from lignocellulosic biomass. Microorganisms such as yeast (e.g., *Saccharomyces* species) can be employed to produce ethanol via fermentation of sugars, either directly extracted from sources such as sugarcanes and sugar beet juices or obtained via hydrolysis of starchy materials such as corn and grains. Bacteria (e.g., *Zymomonas* species) and molds (e.g., *Mucor* species) may also be used to produce biomass ethanol. The ethanol produced in this manner can then be separated by distillation.

Gas obtained from a biomass feedstock is primarily a gaseous mixture of methane and carbon dioxide, with traces of other gases. This bio-syngas can be produced by the thermal gasification (in gasifiers) of various organic feedstocks. This bio-syngas may also be termed biosynthetic gas or bio-SNG.

In an aspect, the biomass ethanol according to this disclosure can be produced from a starch-based feedstock, a sugar-based feedstock, or a cellulosic feedstock, or from a bio-syngas to ethanol process. For example, the biomass ethanol can be produced by the fermentation of sugars derived from a starch-based feedstock or a sugar-based feedstock. The biomass ethanol also may be produced by the fermentation of a carbohydrate derived from a starch-based feedstock, a sugar-based feedstock, or a cellulosic feedstock. For example, suitable starch-based feedstocks include barley, cassava root, corn, potato, rice, sorghum grain, sweet potato, wheat, rye, or any combination thereof. In another aspect, suitable sugar-based feedstocks can include sugar cane, sugar beet, sweet sorghum, molasses, fruit, or any combination thereof.

The biomass ethanol also can be produced from a starch-based feedstock by a process comprising the enzymatic hydrolysis of the starch-based feedstock to produce sugars, followed by yeast fermentation of the sugars. In another aspect, the biomass ethanol can be produced from cellulosic feedstock. In this aspect, the cellulosic feedstock can comprise or be selected from corn stover, wheat straw, sugar cane bagasse, switchgrass, or wood chips, or any combination thereof.

The dehydration of the biomass ethanol to bio-ethylene can comprise simply contacting the biomass ethanol with a dehydration catalyst under conditions suitable to form bio-ethylene. For example, the dehydration of the biomass ethanol can comprise passing liquid phase ethanol through a bed comprising the dehydration catalyst. This process can further comprise regenerating the dehydration catalyst by heating the catalyst after use at atmosphere pressure or at reduced pressure.

In an aspect, the dehydration catalyst which can converts biomass ethanol to bio-ethylene can comprise, consist essentially of, or can be selected from alumina, silica gel, silica-alumina, a crystalline silicate, a dealuminated crystalline silicate, a phosphorus-modified crystalline silicate, a zeolite, a molecular sieve, or anhydrous calcium sulfate, or combinations thereof. In aspects, the dehydration catalyst can comprise, consist essentially of, or can be a lanthanum-modified H-ZSM-catalyst, a ZSM-5/SAPO-34 composite, a mordenite catalyst, microspherical SAPO-34 catalyst, a phosphorus-modified HZSM-5 catalyst, a lanthanum-phosphorous modified HZSM-5 catalyst, a gallium-modified zeolite, a gallium-modified SAPO-11, a gallium-modified HZSM-5, a ZSM-based catalyst, a heteropolyacid catalyst, or a supported heteropolyacid catalyst. For example, in an aspect, the dehydration catalyst can comprise, consist essentially of, or can be a ZSM-5 zeolite comprising from 0.1 wt % to 0.5 wt % of lanthanum and from 0.01 wt % to 1 wt % phosphorous, relative to the weight of the catalyst, wherein the ZSM-5 has a silica to alumina molar ratio of, for example, 20 to 45.

Hydrogenation of Mixed-Decenes and Other Olefin Streams

The hydrogenation of olefins well understood, and any hydrogenation catalyst can be used in the hydrogenation of the mixed-decenes, and the $C_{16-}$ olefin stream, and other olefin streams. For example, in an aspect, the hydrogenation catalyst can comprise, consist essentially of, or be a nickel or a nickel-containing hydrogenation catalyst, a platinum or a platinum-containing hydrogenation catalyst, or a palladium or a palladium-containing hydrogenation catalyst.

The hydrogenation catalyst can comprise, consist essentially of, or can be: (a) a heterogeneous catalyst selected from a Group 8-12 metal deposited on a carrier selected from carbon, silica, alumina, silica-alumina, a zeolite, or calcium carbonate; or (b) a homogeneous catalysts selected from (i) a Ziegler catalysts comprising an organic salt of a Group 6-10 metal and an organoaluminum compound, or (ii) a coordination compound of Ru, Rh, or Ir, or (iii) a Group 4 metal organometallic compound. In this aspect: (a) the Group 8-12 metal of the heterogeneous catalysts can be selected from Fe, Co, Ni, Cu, Zn, Ru, Rh, Pd, Ir, or Pt; (b) the Group 6-10 metal of the homogeneous catalyst can be selected from Ni, Co, Fe, or Cr; or (c) the Group 4 metal organometallic compound can be selected from a Group 4 metallocene compound. For example, in embodiments, the hydrogenation catalyst can comprise one or more metals selected from cobalt, molybdenum, nickel or tungsten.

Aspects of the Disclosure

The invention is described above with reference to numerous aspects, embodiments, statements of the invention, and specific examples. Many variations will suggest themselves to those skilled in the art in light of the above detailed description. All such obvious variations are within the full intended scope of the appended claims. Other aspects of the invention can include, but are not limited to, the following. Aspects which are described as "comprising" certain components or steps, may also "consist essentially of" or "consist of" those components or steps, unless stated otherwise.

Aspect 1. A process for making a sustainable aviation fuel, the process comprising:
(a) providing a bio-ethylene feed, at least a portion of which is derived from the dehydration of biomass ethanol;
(b) contacting the bio-ethylene feed with a first catalyst system comprising a first oligomerization catalyst to form an oligomerization product comprising at least one $C_4$-$C_8$ alpha-olefin and a mixture of decenes;
(c) separating the mixture of decenes from the oligomerization product;
(d) (i) contacting the mixture of decenes with at least one $C_{6-}$ alpha-olefin in the presence of a second catalyst system comprising a second oligomerization catalyst or (ii) contacting the mixture of decenes with at least one $C_{8-}$ alpha-olefin in the presence of a second catalyst system comprising a metathesis catalyst to provide a $C_{16-}$ olefin stream;
(e) hydrogenating the $C_{16-}$ olefin stream in the presence of a first hydrogenation catalyst to provide $C_{16-}$ paraffins; and
(f) using the $C_{16-}$ paraffins as a component to form a sustainable aviation fuel.

Aspect 2. A process for making a sustainable aviation fuel, the process comprising:
(a) providing a bio-ethylene feed, at least a portion of which is derived from the dehydration of biomass ethanol;
(b) contacting the bio-ethylene feed with a first catalyst system comprising a first oligomerization catalyst to form an oligomerization product comprising at least one $C_4$-$C_8$ alpha-olefin and a mixture of decenes;
(c) separating the mixture of decenes from the oligomerization product;
(d) contacting the mixture of decenes with at least one $C_{6-}$ alpha-olefin in the presence of a second catalyst system comprising a second oligomerization catalyst to provide a $C_{16-}$ olefin stream;
(e) hydrogenating the $C_{16-}$ olefin stream in the presence of a first hydrogenation catalyst to provide $C_{16-}$ paraffins; and
(f) using the $C_{16-}$ paraffins as a component to form a sustainable aviation fuel.

Aspect 3. A process for making a sustainable aviation fuel, the process comprising:
(a) providing a bio-ethylene feed, at least a portion of which is derived from the dehydration of biomass ethanol;
(b) contacting the bio-ethylene feed with a first catalyst system comprising a first oligomerization catalyst to form an oligomerization product comprising at least one $C_4$-$C_8$ alpha-olefin and a mixture of decenes;
(c) separating the mixture of decenes from the oligomerization product;
(d) contacting the mixture of decenes with at least one $C_{8-}$ alpha-olefin in the presence of a second catalyst system comprising a metathesis catalyst to provide a $C_{16-}$ olefin stream;

(e) hydrogenating the $C_{16-}$ olefin stream in the presence of a first hydrogenation catalyst to provide $C_{16-}$ paraffins; and (f) using the $C_{16-}$ paraffins as a component to form a sustainable aviation fuel.

Aspect 4. A process for making a sustainable aviation fuel, the process comprising:
  (a) providing a bio-ethylene feed, at least a portion of which is derived from the dehydration of biomass ethanol;
  (b) contacting the bio-ethylene feed with a first catalyst system comprising a first oligomerization catalyst to form an oligomerization product comprising at least one $C_4$-$C_8$ alpha-olefin and a mixture of decenes;
  (c) separating the mixture of decenes from the oligomerization product;
  (d) hydrogenating the mixture of decenes in the presence of a second hydrogenation catalyst to provide a mixture of decanes; and
  (e) using the mixture of decanes as a component to form a sustainable aviation fuel.

Aspect 5. A process for making a sustainable aviation fuel, the process comprising:
  (a) providing a bio-ethylene feed, at least a portion of which is derived from the dehydration of biomass ethanol;
  (b) contacting the bio-ethylene feed with a first catalyst system comprising a first oligomerization catalyst to form an oligomerization product comprising at least one $C_4$-$C_6$ alpha-olefin or at least one $C_4$-$C_8$ alpha-olefin, and a mixture of decenes;
  (c) contacting the oligomerization product with a second catalyst system comprising a second oligomerization catalyst or a metathesis catalyst to provide a $C_{16-}$ olefin stream;
  (d) hydrogenating the $C_{16-}$ olefin stream in the presence of a first hydrogenation catalyst to provide $C_{16-}$ paraffins; and
  (e) using the $C_{16-}$ paraffins as a component to form a sustainable aviation fuel.

Aspect 6. The process for making a sustainable aviation fuel according to any of Aspects 1-2, wherein the at least one $C_{6-}$ alpha-olefin comprises, consists essentially of, or is ethylene, propylene, 1-butene, 1-pentene, or 1-hexene or a combination thereof; or alternatively, ethylene, 1-butene, 1-hexene, or a combination thereof.

Aspect 7. The process for making a sustainable aviation fuel according to any of Aspects 1 or 3, wherein the at least one $C_{8-}$ alpha-olefin comprises, consists essentially of, or is propylene, 1-butene, 2-butene, isobutylene, 1-pentene, 1-hexene, 3,3-dimethyl-1-butene, 1-octene, or a combination thereof; or alternatively, propylene, 1-butene, 2-butene, 1-hexene, 1-octene, or a combination thereof.

Aspect 8. The process for making a sustainable aviation fuel according to Aspect 4, wherein using the mixture of decanes as a component to form a sustainable aviation fuel comprises blending the mixture of decanes with $C_{16-}$ paraffins and/or cycloparaffins to provide a sustainable aviation fuel.

Aspect 9. The process for making a sustainable aviation fuel according to any preceding Aspect, wherein the at least one $C_4$-$C_8$ alpha-olefin comprises 1-butene, 1-hexene, 1-octene, or any combination thereof.

Aspect 10. The process for making a sustainable aviation fuel according to Aspect 5, wherein the steps of contacting the bio-ethylene feed with the first catalyst system and contacting the oligomerization product with the second catalyst system are carried out in the same reactor.

Aspect 11. The process for making a sustainable aviation fuel according to Aspect 5, wherein the steps of contacting the bio-ethylene feed with the first catalyst system and contacting the oligomerization product with the second catalyst system are carried out in different reactors.

Aspect 12. The process for making a sustainable aviation fuel according to any of Aspects 1-3 and 5-11, wherein the $C_{16-}$ paraffins comprise $C_{16-}$ n-alkanes, $C_{16-}$ iso-alkanes, or mixtures thereof.

Aspect 13. The process for making a sustainable aviation fuel according to any of Aspects 1-3 and 5-11, wherein the $C_{16-}$ paraffins comprise $C_{12}$ to $C_{16}$ n-alkanes, $C_{12}$ to $C_{16}$ iso-alkanes, or mixtures thereof.

Aspect 14. The process for making a sustainable aviation fuel according to any preceding Aspect, wherein the step of providing a bio-ethylene feed comprises:
  [1] converting a starch-based feedstock, a sugar-based feedstock, or a cellulosic feedstock to a biomass ethanol; and
  [2] dehydrating the biomass ethanol to provide a bio-ethylene feed.

Aspect 15. The process for making a sustainable aviation fuel according to any of Aspects 1-14, wherein the sustainable aviation fuel or the component thereof is not further purified.

Aspect 16. The process for making a sustainable aviation fuel according to any of Aspects 1-14, wherein the sustainable aviation fuel or the component thereof is further purified.

Aspect 17. The process for making a sustainable aviation fuel according to any preceding Aspect, wherein the sustainable aviation fuel or the component thereof is blended with a non-sustainable aviation fuel.

Aspect 18. The process for making a sustainable aviation fuel according to any preceding Aspect, wherein the oligomerization product comprises 1-butene, 1-hexene, 1-octene, or any combination thereof.

Aspect 19. The process for making a sustainable aviation fuel according to any preceding Aspect, wherein the oligomerization product further comprises octenes, dodecenes, tetradecenes, or any combination thereof.

Aspect 20. The process for making a sustainable aviation fuel according to any of Aspects 1-19, wherein all of the bio-ethylene feed is derived from the dehydration of biomass ethanol.

Aspect 21. The process for making a sustainable aviation fuel according to any of Aspects 1-19, wherein a portion of the bio-ethylene feed is derived from the dehydration of biomass ethanol.

Aspect 22. The process for making a sustainable aviation fuel according to any preceding Aspect, wherein the sustainable aviation fuel is certified as compliant with the Carbon Offsetting and Reduction Scheme for International Aviation (CORSIA) sustainability criteria in accordance with the International Sustainability and Carbon Certification (ISCC) CORSIA certification system.

Aspect 23. The process for making a sustainable aviation fuel according to any preceding Aspect, wherein the sustainable aviation fuel is certified as a Lower Carbon Aviation Fuel (LCAF) in accordance with the International Sustainability and Carbon Certification (ISCC) LCAF certification system.

Aspect 24. The process for making a sustainable aviation fuel according to any of Aspects 22-23, wherein the certification is based upon the weight or fraction of the sustainable aviation fuel attributable to the biomass ethanol determined by mass balance and the free attribution method.

Aspect 25. The process for making a sustainable aviation fuel according to any of Aspects 1-24, wherein the oligomerization product comprises at least 60 mol %; at least 65 mol %; at least 70 mol %; at least 75 mol %; at least 80 mol %; at least 85 mol %; at least 90 mol %; or at least 95 mol % 1-hexene.

Aspect 26. The process for making a sustainable aviation fuel according to any of Aspects 1-24, wherein the oligomerization product comprises at least 60 mol %; at least 65 mol %; at least 70 mol %; at least 75 mol %; at least 80 mol %; at least 85 mol %; at least 90 mol %; or at least 95 mol % 1-octene.

Aspect 27. The process for making a sustainable aviation fuel according to any of Aspects 1-24, wherein the oligomerization product comprises at least 60 mol %; at least 65 mol %; at least 70 mol %; at least 75 mol %; at least 80 mol %; at least 85 mol %; at least 90 mol %; or at least 95 mol % 1-hexene and 1-octene combined.

Aspect 28. The process for making a sustainable aviation fuel according to any of Aspects 1-24, wherein the oligomerization product comprises at least 70 wt. % hexene; at least 75 wt. % hexene; at least 80 wt. % hexene; at least 85 wt. % hexene; or at least 90 wt. % hexene, based upon the weight of the oligomerization product.

Aspect 29. The process for making a sustainable aviation fuel according to any of Aspects 1-24, wherein the oligomerization product comprises from 70 wt. % to 99.8 wt. % hexene; from 75 wt. % to 99.7 wt. % hexene; or alternatively, from 80 wt. % to 99.6 wt. % hexane, based upon the weight of the oligomerization product.

Aspect 30. The process for making a sustainable aviation fuel according to any of Aspects 1-24, wherein the oligomerization product comprises at least 70 wt. % octene; at least 75 wt. % octene; at least 80 wt. % octene; at least 85 wt. % octene; or at least 90 wt. % octene, based upon the weight of the oligomerization product.

Aspect 31. The process for making a sustainable aviation fuel according to any of Aspects 1-24, wherein the oligomerization product comprises from 70 wt. % to 99.8 wt. % octene; from 75 wt. % to 99.7 wt. % octene; or from 80 wt. % to 99.6 wt. % octene, based upon the weight of the oligomerization product.

Aspect 32. The process for making a sustainable aviation fuel according to any of Aspects 1-31, wherein the oligomerization product comprises the mixture of decenes in a concentration of at least 0.5 mol %; at least 1 mol %; at least 2 mol %; at least 3 mol %; at least 4 mol %; at least 5 mol %; at least 6 mol %; at least 8 mol %; at least 10 mol %; at least 12 mol %; or at least 15 mol %.

Aspect 33. The process for making a sustainable aviation fuel according to any of Aspects 1-32, wherein contacting the bio-ethylene feed with the first catalyst system is carried out under conditions in which at least 0.2 wt. %, at least 1 wt. %, at least 2 wt. %, at least 5 wt. %, at least 7 wt. %, at least 10 wt. %, at least 12 wt. %, or at least 15 wt. % of the oligomerization product comprises the mixture of decenes.

Aspect 34. The process for making a sustainable aviation fuel according to any of Aspects 1-33, wherein the oligomerization product comprises the mixture of decenes in a concentration of less than 40 mol %; less than 35 mol %; less than 30 mol %; less than 25 mol %; less than 20 mol %; less than 15 mol %; less than 10 mol %; or less than 5 mol %.

Aspect 35. The process for making a sustainable aviation fuel according to any of Aspects 1-34, wherein contacting the bio-ethylene feed with the first catalyst system is carried out under conditions in which less than 5 wt. %, less than 7 wt. %, less than 10 wt. %, less than 12 wt. %, less than 15 wt. %, less than 18 wt. %, or less than 20 wt. % of the oligomerization product comprises the mixture of decenes.

Aspect 36. The process for making a sustainable aviation fuel according to any of Aspects 1-35, wherein the mixture of decenes comprises 1-decene, 2-butyl-1-hexene, 3-propyl-1-heptene, 4-ethyl-1-octene, 5-methyl-1-nonene, 4-decene, 5-decene, or any combination thereof.

Aspect 37. The process for making a sustainable aviation fuel according to any of Aspects 1-36, wherein the mixture of decenes comprises at least 76 mol %, at least 78 mol %, at least 80 mol %, or at least 82 mol % $C_{10}$ monoolefins.

Aspect 38. The process for making a sustainable aviation fuel according to any of Aspects 1-37, wherein the mixture of decenes comprises from 76 mol % to 95 mol % $C_{10}$ monoolefins; from 78 mol % to 90 mol % $C_{10}$ monoolefins; from 80 mol % to 88 mol % $C_{10}$ monoolefins; or from 82 mol % to 86 mol % $C_{10}$ monoolefins.

Aspect 39. The process for making a sustainable aviation fuel according to any of Aspects 1-38, wherein the oligomerization product further comprises $C_{9-}$ monoolefins, $C_{11+}$ monoolefins, or combinations thereof.

Aspect 40. The process for making a sustainable aviation fuel according to any of Aspects 37-39, wherein the $C_{10}$ monoolefins comprise: (a) at least 3 mol %, at least 4 mol %, at least 5 mol %, at least 6 mol %, at least 7 mol %, or at least 8 mol % 2-butyl-1-hexene; (b) at least 8 mol %, at least 9 mol %, at least 10 mol %, at least 11 mol %, at least 12 mol %, or at least 13 mol % 3-propyl-1-heptene; (c) at least 6 mol %, at least 7 mol %, at least 8 mol %, at least 9 mol %, at least 10 mol %, or at least 11 mol % 4-ethyl-1-octene; and (d) at least 20 mol %, at least 22 mol %, at least 24 mol %, at least 26 mol %, at least 28 mol %, or at least 30 mol % 5-methyl-1-nonene.

Aspect 41. The process for making a sustainable aviation fuel according to any of Aspects 37-40, wherein the $C_{10}$ monoolefins comprise from 3 mol % to 20 mol %, from 4 mol % to 18 mol %, from 5 mol % to 17 mol %, from 6 mol % to 16 mol %, or from 7 mol % to 15 mol % 2-butyl-1-hexene.

Aspect 42. The process for making a sustainable aviation fuel according to any of Aspects 37-41, wherein the $C_{10}$ monoolefins comprise from 10 mol % to 32 mol %, from 11 mol % to 30 mol %, from 12 mol % to 28 mol %, from 13 mol % to 26 mol %, or from 14 mol % to 24 mol % 3-propyl-1-heptene.

Aspect 43. The process for making a sustainable aviation fuel according to any of Aspects 37-42, wherein the $C_{10}$ monoolefins comprise from 7 mol % to 25 mol %, from 8 mol % to 24 mol %, from 9 mol % to 23 mol %, from 10 mol % to 22 mol %, or from 11 mol % to 21 mol % 4-ethyl-1-octene.

Aspect 44. The process for making a sustainable aviation fuel according to any of Aspects 37-43, wherein the $C_{10}$ monoolefins comprise from 24 mol % to 52 mol %, from 26 mol % to 50 mol %, from 28 mol % to 48 mol %, from 30 mol % to 46 mol %, or from 32 mol % to 44 mol % 5-methyl-1-nonene.

Aspect 45. The process for making a sustainable aviation fuel according to any of Aspects 37-44, wherein the $C_{10}$ monoolefins have any of the following features:
 (a) a molar ratio of 2-butyl-1-hexene to 5-methyl-1-nonene of at least 2:1, at least 2.4:1, at least 2.6:1, or at least 2.8:1;

(b) a molar ratio of 3-propyl-1-heptene to 5-methyl-1-nonene of at least 1.2:1, at least 1.4:1, at least 1.6:1, or at least 1.8:1;

(c) a molar ratio of 4-ethyl-1-octene to 5-methyl-1-nonene of at least 1.6:1, at least 1.7:1, at least 1.9:1, or at least 2.1:1;

(d) a molar ratio of 2-butyl-1-hexene to 5-methyl-1-nonene of at least 2:1, at least 2.4:1, at least 2.6:1, or at least 2.8:1;

(e) a molar ratio of 3-propyl-1-heptene to 5-methyl-1-nonene of at least 1.2:1, at least 1.4:1, at least 1.6:1, or at least 1.8:1;

(f) a molar ratio of 4-ethyl-1-octene to 5-methyl-1-nonene of at least 1.6:1, at least 1.7:1, at least 1.9:1, or at least 2.1:1; or (g) any combination thereof.

Aspect 46. The process for making a sustainable aviation fuel according to any of Aspects 1-45, wherein the oligomerization product comprises at least 1 mol %, at least 2 mol %, at least 3 mol %, or at least 4 mol % $C_{14}$ monoolefins.

Aspect 47. The process for making a sustainable aviation fuel according to any of Aspects 1-45, wherein the oligomerization product comprises from 1 mol % to 12 mol % $C_{14}$ monoolefins; from 2 mol % to 10 mol % $C_{14}$ monoolefins; from 3 mol % to 8 mol % $C_{14}$ monoolefins; or from 4 mol % to 7 mol % $C_{14}$ monoolefins.

Aspect 48. The process for making a sustainable aviation fuel according to any of the preceding Aspects, wherein the oligomerization product comprises:
(a) from 0.1 mol % to 5 mol %, from 0.25 mol % to 4 mol %, or from 0.5 mol % to 3 mol % $C_8$ monoolefins, wherein the $C_8$ monoolefins comprise at least 95 mol % 1-octene;
(b) 0.1 mol % to 5 mol %, from 0.25 mol % to 4 mol %, or from 0.5 mol % to 3 mol % $C_{12}$ monoolefins, wherein the $C_{12}$ monoolefins comprise from 54 mol % to 74 mol %, 1-dodecene;
(c) from 0.05 mol % to 2 mol %, from 0.04 mol % to 1.5 mol %, from 0.06 mol % to 1.25 mol %, from 0.08 mol % to 1 mol %, or from 0.1 mol % to 0.75 mol % $C_{16}$ monoolefins and/or $C_{18}$ monoolefins; or
(d) any combination thereof.

Aspect 49. The process for making a sustainable aviation fuel according to any of the preceding Aspects, wherein the mixture of decenes comprises at least 95 mol % $C_{10}$ monoolefins, and $C_{10}$ monoolefins comprise: (a) at least 3 mol % 2-butyl-1-hexene; (b) at least 10 mol % 3-propyl-1-heptene; (c) at least 7 mol % 4-ethyl-1-octene; and (d) at least 24 mol % 5-methyl-1-nonene.

Aspect 50. The process for making a sustainable aviation fuel according to Aspect 49, wherein the mixture of decenes comprise linear $C_{10}$ monoolefins comprising or consisting essentially of 1-decene, 4-decene, 5-decene, or combinations thereof.

Aspect 51. The process for making a sustainable aviation fuel according to any preceding Aspect, wherein the $C_{16}$-olefin stream comprises 2-ethyl-3-propyl-1-heptene, 5-propyl-1-nonene, 2-ethyl-5-methyl-1-nonene, 7-methyl-1-undecene, 2-ethyl-4-ethyl-1-octene, 6-ethyl-1-decene, 2-ethyl-1-decene, and 1-dodecene.

Aspect 52. The process for making a sustainable aviation fuel according to any of Aspects 1-50, wherein the $C_{16}$-olefin stream comprises any combination of 2-ethyl-3-propyl-1-heptene, 5-propyl-1-nonene, 2-ethyl-5-methyl-1-nonene, 7-methyl-1-undecene, 2-ethyl-4-ethyl-1-octene, 6-ethyl-1-decene, 2-ethyl-1-decene, and 1-dodecene.

Aspect 53. The process for making a sustainable aviation fuel according to any of Aspects 1-50, wherein the $C_{16}$-olefin stream comprises any three, any four, any five, any six, or any seven of 2-ethyl-3-propyl-1-heptene, 5-propyl-1-nonene, 2-ethyl-5-methyl-1-nonene, 7-methyl-1-undecene, 2-ethyl-4-ethyl-1-octene, 6-ethyl-1-decene, 2-ethyl-1-decene, and 1-dodecene.

Aspect 54. The process for making a sustainable aviation fuel according to any of Aspects 1-50, wherein the $C_{16}$-paraffins comprise 3-methyl-4-propyloctane, 5-propylnonane, 3,6-dimethyldecane, 5-methylundecane, 5-ethyl-3-methylnonane, 5-ethyldecane, 3-methylundecane, and dodecane.

Aspect 55. The process for making a sustainable aviation fuel according to any of Aspects 1-50, wherein the $C_{16}$-paraffins comprise any combination of 3-methyl-4-propyloctane, 5-propylnonane, 3,6-dimethyldecane, 5-methylundecane, 5-ethyl-3-methylnonane, 5-ethyldecane, 3-methylundecane, and dodecane.

Aspect 56. The process for making a sustainable aviation fuel according to any of Aspects 1-50, wherein the $C_{16}$-paraffins comprise any three, any four, any five, any six, or any seven of 3-methyl-4-propyloctane, 5-propylnonane, 3,6-dimethyldecane, 5-methylundecane, 5-ethyl-3-methylnonane, 5-ethyldecane, 3-methylundecane, and dodecane.

Aspect 57. The process for making a sustainable aviation fuel according to any of Aspects 1-50, wherein the $C_{16}$-olefin stream comprises 4-methylene-5-propylnonane, 2-methyl-5-propylnon-1-ene, 7-methyl-4-methyleneundecane, 2,7-dimethylundec-1-ene, 6-ethyl-4-methylenedecane, 6-ethyl-2-methyldec-1-ene, 4-methylenedodecane, and 2-methyldodec-1-ene.

Aspect 58. The process for making a sustainable aviation fuel according to any of Aspects 1-50, wherein the $C_{16}$-olefin stream comprises any combination of 4-methylene-5-propylnonane, 2-methyl-5-propylnon-1-ene, 7-methyl-4-methyleneundecane, 2,7-dimethylundec-1-ene, 6-ethyl-4-methylenedecane, 6-ethyl-2-methyldec-1-ene, 4-methylenedodecane, and 2-methyldodec-1-ene.

Aspect 59. The process for making a sustainable aviation fuel according to any of Aspects 1-50, wherein the $C_{16}$-olefin stream comprises any three, any four, any five, any six, or any seven of 4-methylene-5-propylnonane, 2-methyl-5-propylnon-1-ene, 7-methyl-4-methyleneundecane, 2,7-dimethylundec-1-ene, 6-ethyl-4-methylenedecane, 6-ethyl-2-methyldec-1-ene, 4-methylenedodecane, and 2-methyldodec-1-ene.

Aspect 60. The process for making a sustainable aviation fuel according to any of Aspects 1-50, wherein the $C_{16}$-paraffins comprise 4-methyl-5-propylnonane, 2-methyl-5-propylnonane, 4,7-dimethylundecane, 2,7-dimethylundecane, 6-ethyl-4-methyldecane, 6-ethyl-2-methyldecane, 4-methyldodecane, and 2-methyldodecane.

Aspect 61. The process for making a sustainable aviation fuel according to any of Aspects 1-50, wherein the $C_{16}$-paraffins comprise any combination of 4-methyl-5-propylnonane, 2-methyl-5-propylnonane, 4,7-dimethylundecane, 2,7-dimethylundecane, 6-ethyl-4-methyldecane, 6-ethyl-2-methyldecane, 4-methyldodecane, and 2-methyldodecane.

Aspect 62. The process for making a sustainable aviation fuel according to any of Aspects 1-50, wherein the $C_{16}$-paraffins comprise any three, any four, any five, any six, or any seven of 4-methyl-5-propylnonane, 2-methyl-5-propylnonane, 4,7-dimethylundecane, 2,7-dimethylundecane, 6-ethyl-4-methyldecane, 6-ethyl-2-methyldecane, 4-methyldodecane, and 2-methyldodecane.

Aspect 63. The process for making a sustainable aviation fuel according to any of Aspects 1-50, wherein the $C_{16-}$ olefin stream comprises 5-methylene-6-propyl decane, 3-methylene-6-propyl decane, 5-methylene-8-methyl dodecane, 3-methylene-8-methyl dodecane, 5-methylene-7-ethyl undecane, 3-methylene-7-ethyl undecane, 2-butyl-1-decene, and 2-ethyl-1-dodecene.

Aspect 64. The process for making a sustainable aviation fuel according to any of Aspects 1-50, wherein the $C_{16-}$ olefin stream comprises any combination of 5-methylene-6-propyl decane, 3-methylene-6-propyl decane, 5-methylene-8-methyl dodecane, 3-methylene-8-methyl dodecane, 5-methylene-7-ethyl undecane, 3-methylene-7-ethyl undecane, 2-butyl-1-decene, and 2-ethyl-1-dodecene.

Aspect 65. The process for making a sustainable aviation fuel according to any of Aspects 1-50, wherein the $C_{16-}$ olefin stream comprises any three, any four, any five, any six, or any seven of 5-methylene-6-propyl decane, 3-methylene-6-propyl decane, 5-methylene-8-methyl dodecane, 3-methylene-8-methyl dodecane, 5-methylene-7-ethyl undecane, 3-methylene-7-ethyl undecane, 2-butyl-1-decene, and 2-ethyl-1-dodecene.

Aspect 66. The process for making a sustainable aviation fuel according to any of Aspects 1-50, wherein the $C_{16-}$ paraffins comprise 5-methyl-6-propyldecane, 3-methyl-6-propyldecane, 5,8-dimethyldodecane, 3,8-dimethyldodecane, 5-ethyl-7-methylundecane, 7-ethyl-3-methylundecane, 5-methyltridecane, and 3-methyltridecane.

Aspect 67. The process for making a sustainable aviation fuel according to any of Aspects 1-50, wherein the $C_{16-}$ paraffins comprise any combination of 5-methyl-6-propyldecane, 3-methyl-6-propyldecane, 5,8-dimethyldodecane, 3,8-dimethyldodecane, 5-ethyl-7-methylundecane, 7-ethyl-3-methylundecane, 5-methyltridecane, and 3-methyltridecane.

Aspect 68. The process for making a sustainable aviation fuel according to any of Aspects 1-50, wherein the $C_{16-}$ paraffins comprise any three, any four, any five, any six, or any seven of 5-methyl-6-propyldecane, 3-methyl-6-propyldecane, 5,8-dimethyldodecane, 3,8-dimethyldodecane, 5-ethyl-7-methylundecane, 7-ethyl-3-methylundecane, 5-methyltridecane, and 3-methyltridecane.

Aspect 69. The process for making a sustainable aviation fuel according to any of Aspects 1-50, wherein the $C_{16-}$ olefin stream comprises 6-methylene-5-propyl dodecane, 2-butyl-5-propyl-1-nonene, 2-hexyl-5-methyl-1-nonene, 2-butyl-7-methyl-1-undecene, 6-methylene-4-ethyl tridecane, 2-butyl-6-ethyl-1-decene, 2-hexyl-1-decene, and 4-butyl-1-dodecene.

Aspect 70. The process for making a sustainable aviation fuel according to any of Aspects 1-50, wherein the $C_{16-}$ olefin stream comprises any combination of 6-methylene-5-propyl dodecane, 2-butyl-5-propyl-1-nonene, 2-hexyl-5-methyl-1-nonene, 2-butyl-7-methyl-1-undecene, 6-methylene-4-ethyl tridecane, 2-butyl-6-ethyl-1-decene, 2-hexyl-1-decene, and 4-butyl-1-dodecene.

Aspect 71. The process for making a sustainable aviation fuel according to any of Aspects 1-50, wherein the $C_{16-}$ olefin stream comprises any three, any four, any five, any six, or any seven of 6-methylene-5-propyl dodecane, 2-butyl-5-propyl-1-nonene, 2-hexyl-5-methyl-1-nonene, 2-butyl-7-methyl-1-undecene, 6-methylene-4-ethyl tridecane, 2-butyl-6-ethyl-1-decene, 2-hexyl-1-decene, and 4-butyl-1-dodecene.

Aspect 72. The process for making a sustainable aviation fuel according to any of Aspects 1-50, wherein the $C_{16-}$ paraffins comprise 6-methyl-5-propyldodecane, 5-methyl-8-propyldodecane, 5,8-dimethyltetradecane, 5,10-dimethyltetradecane, 5-ethyl-7-methyltridecane, 5-ethyl-9-methyltridecane, 7-methylpentadecane, and pentadecane.

Aspect 73. The process for making a sustainable aviation fuel according to any of Aspects 1-50, wherein the $C_{16-}$ paraffins comprise any combination of 6-methyl-5-propyldodecane, 5-methyl-8-propyldodecane, 5,8-dimethyltetradecane, 5,10-dimethyltetradecane, 5-ethyl-7-methyltridecane, 5-ethyl-9-methyltridecane, 7-methylpentadecane, and pentadecane.

Aspect 74. The process for making a sustainable aviation fuel according to any of Aspects 1-50, wherein the $C_{16-}$ paraffins comprise any three, any four, any five, any six, or any seven of 6-methyl-5-propyldodecane, 5-methyl-8-propyldodecane, 5,8-dimethyltetradecane, 5,10-dimethyltetradecane, 5-ethyl-7-methyltridecane, 5-ethyl-9-methyltridecane, 7-methylpentadecane, and pentadecane.

Aspect 75. The process for making a sustainable aviation fuel according to any of Aspects 1-50, wherein the $C_{16-}$ olefin stream comprises 4-propyl-2-octene, 5-ethyl-2-nonene, 6-methyl-2-decene, 2-undecene, 2-hexene, 2-heptene, and 2-octene.

Aspect 76. The process for making a sustainable aviation fuel according to any of Aspects 1-50, wherein the $C_{16-}$ olefin stream comprises any combination of 4-propyl-2-octene, 5-ethyl-2-nonene, 6-methyl-2-decene, 2-undecene, 2-hexene, 2-heptene, and 2-octene.

Aspect 77. The process for making a sustainable aviation fuel according to any of Aspects 1-50, wherein the $C_{16-}$ olefin stream comprises any three, any four, any five, or any six of 4-propyl-2-octene, 5-ethyl-2-nonene, 6-methyl-2-decene, 2-undecene, 2-hexene, 2-heptene, and 2-octene.

Aspect 78. The process for making a sustainable aviation fuel according to any of Aspects 1-50, wherein the $C_{16-}$ paraffins comprise 4-propyloctane, 5-ethylnonane, 5-methyldecane, undecane, n-hexane, n-heptane, and n-octane.

Aspect 79. The process for making a sustainable aviation fuel according to any of Aspects 1-50, wherein the $C_{16-}$ paraffins comprise any combination of 4-propyloctane, 5-ethylnonane, 5-methyldecane, undecane, n-hexane, n-heptane, and n-octane.

Aspect 80. The process for making a sustainable aviation fuel according to any of Aspects 1-50, wherein the $C_{16-}$ paraffins comprise any three, any four, any five, or any six of 4-propyloctane, 5-ethylnonane, 5-methyldecane, undecane, n-hexane, n-heptane, and n-octane.

Aspect 81. The process for making a sustainable aviation fuel according to any of Aspects 1-50, wherein the $C_{16-}$ olefin stream comprises 5-propyl-3-nonene, 6-ethyl-3-decene, 7-methyl-3-undecene, 3-dodecene, 3-heptene, 3-octene, and 3-nonene.

Aspect 82. The process for making a sustainable aviation fuel according to any of Aspects 1-50, wherein the $C_{16-}$ olefin stream comprises any combination of 5-propyl-3-nonene, 6-ethyl-3-decene, 7-methyl-3-undecene, 3-dodecene, 3-heptene, 3-octene, and 3-nonene.

Aspect 83. The process for making a sustainable aviation fuel according to any of Aspects 1-50, wherein the $C_{16-}$ olefin stream comprises any three, any four, any five, or any six of 5-propyl-3-nonene, 6-ethyl-3-decene, 7-methyl-3-undecene, 3-dodecene, 3-heptene, 3-octene, and 3-nonene.

Aspect 84. The process for making a sustainable aviation fuel according to any of Aspects 1-50, wherein the $C_{16-}$ paraffins comprise 5-propylnonane, 5-ethyldecane, 5-methylundecane, dodecane, heptane, octane, and nonane.

Aspect 85. The process for making a sustainable aviation fuel according to any of Aspects 1-50, wherein the $C_{16-}$ paraffins comprise any combination of 5-propylnonane, 5-ethyldecane, 5-methylundecane, dodecane, heptane, octane, and nonane.

Aspect 86. The process for making a sustainable aviation fuel according to any of Aspects 1-50, wherein the $C_{16}$-paraffins comprise any three, any four, any five, or any six of 5-propylnonane, 5-ethyldecane, 5-methylundecane, dodecane, heptane, octane, and nonane.

Aspect 87. The process for making a sustainable aviation fuel according to any of Aspects 1-50, wherein the $C_{16}$-olefin stream comprises 2-methyl-4-propyl-2-octene, 5-ethyl-2-methyl-2-nonene, 2,6-dimethyl-2-decene, 2-methyl-2-undecene, 2-methyl-2-hexene, 2-methyl-2-heptene, and 2-methyl-2-octene.

Aspect 88. The process for making a sustainable aviation fuel according to any of Aspects 1-50, wherein the $C_{16}$-olefin stream comprises any combination of 2-methyl-4-propyl-2-octene, 5-ethyl-2-methyl-2-nonene, 2,6-dimethyl-2-decene, 2-methyl-2-undecene, 2-methyl-2-hexene, 2-methyl-2-heptene, and 2-methyl-2-octene.

Aspect 89. The process for making a sustainable aviation fuel according to any of Aspects 1-50, wherein the $C_{16}$-olefin stream comprises any three, any four, any five, or any six of 2-methyl-4-propyl-2-octene, 5-ethyl-2-methyl-2-nonene, 2,6-dimethyl-2-decene, 2-methyl-2-undecene, 2-methyl-2-hexene, 2-methyl-2-heptene, and 2-methyl-2-octene.

Aspect 90. The process for making a sustainable aviation fuel according to any of Aspects 1-50, wherein the $C_{16}$-paraffins comprise 2-methyl-4-propyloctane, 5-ethyl-2-methylnonane, 2,6-dimethyldecane, 2-methylundecane, 2-methylhexane, 2-methylheptane, and 2-methyloctane.

Aspect 91. The process for making a sustainable aviation fuel according to any of Aspects 1-50, wherein the $C_{16}$-paraffins comprise any combination of 2-methyl-4-propyloctane, 5-ethyl-2-methylnonane, 2,6-dimethyldecane, 2-methylundecane, 2-methylhexane, 2-methylheptane, and 2-methyloctane.

Aspect 92. The process for making a sustainable aviation fuel according to any of Aspects 1-50, wherein the $C_{16}$-paraffins comprise any three, any four, any five, or any six of 2-methyl-4-propyloctane, 5-ethyl-2-methylnonane, 2,6-dimethyldecane, 2-methylundecane, 2-methylhexane, 2-methylheptane, and 2-methyloctane.

Aspect 93. The process for making a sustainable aviation fuel according to any of Aspects 1-50, wherein the $C_{16}$-olefin stream comprises 6-propyl-4-decene, 7-ethyl-4-undecene, 8-methyl-4-dodecene, 4-tridecene, 4-octene, 4-nonene, and 4-decene.

Aspect 94. The process for making a sustainable aviation fuel according to any of Aspects 1-50, wherein the $C_{16}$-olefin stream comprises any combination of 6-propyl-4-decene, 7-ethyl-4-undecene, 8-methyl-4-dodecene, 4-tridecene, 4-octene, 4-nonene, and 4-decene.

Aspect 95. The process for making a sustainable aviation fuel according to any of Aspects 1-50, wherein the $C_{16}$-olefin stream comprises any three, any four, any five, or any six of 6-propyl-4-decene, 7-ethyl-4-undecene, 8-methyl-4-dodecene, 4-tridecene, 4-octene, 4-nonene, and 4-decene.

Aspect 96. The process for making a sustainable aviation fuel according to any of Aspects 1-50, wherein the $C_{16}$-paraffins comprise 5-propyldecane, 5-ethylundecane, 5-methyldodecane, tridecane, octane, nonane, and decane.

Aspect 97. The process for making a sustainable aviation fuel according to any of Aspects 1-50, wherein the $C_{16}$-paraffins comprise any combination of 5-propyldecane, 5-ethylundecane, 5-methyldodecane, tridecane, octane, nonane, and decane.

Aspect 98. The process for making a sustainable aviation fuel according to any of Aspects 1-50, wherein the $C_{16}$-paraffins comprise any three, any four, any five, or any six of 5-propyldecane, 5-ethylundecane, 5-methyldodecane, tridecane, octane, nonane, and decane.

Aspect 99. The process for making a sustainable aviation fuel according to any of Aspects 1-50, wherein the $C_{16}$-olefin stream comprises 7-propyl-5-undecene, 8-ethyl-5-dodecene, 9-methyl-5-tridecene, 5-tetradecene, 4-nonene, 5-decene, and 5-undecene.

Aspect 100. The process for making a sustainable aviation fuel according to any of Aspects 1-50, wherein the $C_{16}$-olefin stream comprises any combination of 7-propyl-5-undecene, 8-ethyl-5-dodecene, 9-methyl-5-tridecene, 5-tetradecene, 4-nonene, 5-decene, and 5-undecene.

Aspect 101. The process for making a sustainable aviation fuel according to any of Aspects 1-50, wherein the $C_{16}$-olefin stream comprises any three, any four, any five, or any six of 7-propyl-5-undecene, 8-ethyl-5-dodecene, 9-methyl-5-tridecene, 5-tetradecene, 4-nonene, 5-decene, and 5-undecene.

Aspect 102. The process for making a sustainable aviation fuel according to any of Aspects 1-50, wherein the $C_{16}$-paraffins comprise 5-propylundecane, 5-ethyldodecane, 5-methyltridecane, tetradecane, nonane, decane, and undecane.

Aspect 103. The process for making a sustainable aviation fuel according to any of Aspects 1-50, wherein the $C_{16}$-paraffins comprise any combination of 5-propylundecane, 5-ethyldodecane, 5-methyltridecane, tetradecane, nonane, decane, and undecane.

Aspect 104. The process for making a sustainable aviation fuel according to any of Aspects 1-50, wherein the $C_{16}$-paraffins comprise any three, any four, any five, or any six of 5-propylundecane, 5-ethyldodecane, 5-methyltridecane, tetradecane, nonane, decane, and undecane.

Aspect 105. The process for making a sustainable aviation fuel according to any of Aspects 1-50, wherein the $C_{16}$-olefin stream comprises 2,2-dimethyl-5-propyl-3-nonene, 6-ethyl-2,2-dimethyl-3-decene, 2,2,7-trimethyl-3-undecene, 2,2-dimethyl-3-dodecene, 2,2-dimethyl-3-heptene, 2,2-dimethyl-3-octene, and 2,2-dimethyl-3-nonene.

Aspect 106. The process for making a sustainable aviation fuel according to any of Aspects 1-50, wherein the $C_{16}$-olefin stream comprises any combination of 2,2-dimethyl-5-propyl-3-nonene, 6-ethyl-2,2-dimethyl-3-decene, 2,2,7-trimethyl-3-undecene, 2,2-dimethyl-3-dodecene, 2,2-dimethyl-3-heptene, 2,2-dimethyl-3-octene, and 2,2-dimethyl-3-nonene.

Aspect 107. The process for making a sustainable aviation fuel according to any of Aspects 1-50, wherein the $C_{16}$-olefin stream comprises any three, any four, any five, or any six of 2,2-dimethyl-5-propyl-3-nonene, 6-ethyl-2,2-dimethyl-3-decene, 2,2,7-trimethyl-3-undecene, 2,2-dimethyl-3-dodecene, 2,2-dimethyl-3-heptene, 2,2-dimethyl-3-octene, and 2,2-dimethyl-3-nonene.

Aspect 108. The process for making a sustainable aviation fuel according to any of Aspects 1-50, wherein the $C_{16}$-paraffins comprise 2,2-dimethyl-5-propylnonane, 6-ethyl-2,2-dimethyldecane, 2,2,7-trimethylundecane, 2,2-dimethyldodecane, 2,2-dimethylheptane, 2,2-dimethyloctane, and 2,2-dimethylnonane.

Aspect 109. The process for making a sustainable aviation fuel according to any of Aspects 1-50, wherein the $C_{16}$- paraffins comprise any combination of 2,2-dimethyl-5-propylnonane, 6-ethyl-2,2-dimethyldecane, 2,2,7-trimethylundecane, 2,2-dimethyldodecane, 2,2-dimethylheptane, 2,2-dimethyloctane, and 2,2-dimethylnonane.

Aspect 110. The process for making a sustainable aviation fuel according to any of Aspects 1-50, wherein the $C_{16}$-paraffins comprise any three, any four, any five, or any six of 2,2-dimethyl-5-propylnonane, 6-ethyl-2,2-dimethyldecane, 2,2,7-trimethylundecane, 2,2-dimethyldodecane, 2,2-dimethylheptane, 2,2-dimethyloctane, and 2,2-dimethylnonane.

Aspect 111. The process for making a sustainable aviation fuel according to any of Aspects 1-50, wherein the $C_{16}$-olefin stream comprises 5-propyl-6-tridecene, 5-ethyl-7-tetradecene, 11-methyl-7-pentadecene, 7-hexadecene, 4-undecene, 5-dodecene, and 6-tridecene.

Aspect 112. The process for making a sustainable aviation fuel according to any of Aspects 1-50, wherein the $C_{16}$-olefin stream comprises any combination of 5-propyl-6-tridecene, 5-ethyl-7-tetradecene, 11-methyl-7-pentadecene, 7-hexadecene, 4-undecene, 5-dodecene, and 6-tridecene.

Aspect 113. The process for making a sustainable aviation fuel according to any of Aspects 1-50, wherein the $C_{16}$-olefin stream comprises any three, any four, any five, or any six of 5-propyl-6-tridecene, 5-ethyl-7-tetradecene, 11-methyl-7-pentadecene, 7-hexadecene, 4-undecene, 5-dodecene, and 6-tridecene.

Aspect 114. The process for making a sustainable aviation fuel according to any of Aspects 1-50, wherein the $C_{16}$-paraffins comprise 5-propyltridecane, 5-ethyltetradecane, 5-methylpentadecane, hexadecane, undecane, dodecane, and tridecane.

Aspect 115. The process for making a sustainable aviation fuel according to any of Aspects 1-50, wherein the $C_{16}$-paraffins comprise any combination of 5-propyltridecane, 5-ethyltetradecane, 5-methylpentadecane, hexadecane, undecane, dodecane, and tridecane.

Aspect 116. The process for making a sustainable aviation fuel according to any of Aspects 1-50, wherein the $C_{16}$-paraffins comprise any three, any four, any five, or any six of 5-propyltridecane, 5-ethyltetradecane, 5-methylpentadecane, hexadecane, undecane, dodecane, and tridecane.

Aspect 117. The process for making a sustainable aviation fuel according to any preceding Aspect, wherein the first catalyst system, the second catalyst system, or both catalyst systems independently comprise a chromium-based catalyst, a metallocene-based catalyst, a Ziegler-Natta based catalyst, a metal-oxide supported Group 6-10 transition metal-based catalyst, or a combination thereof.

Aspect 118. The process for making a sustainable aviation fuel according to any preceding Aspect, wherein the first catalyst system and the second catalyst system, independently, comprises tungstated zirconium, molybdenum zirconium, nickel and/or cobalt doped tungstated zirconium, nickel and/or cobalt doped molybdenum zirconium catalysts, a Group 3 to Group 12 metal-treated zeolite, or combinations thereof.

Aspect 119. The process for making a sustainable aviation fuel according to any preceding Aspect, wherein the first catalyst system, the second catalyst system, or both catalyst systems catalyst systems independently comprise molybdenum oxide on alumina ($MoO_3/Al_2O_3$), tungsten oxide on silica ($WO_3/SiO_2$), tungsten oxide on silica-alumina ($WO_3/SiO_2/Al_2O_3$), rhenium oxide on alumina ($Re_2O_7/Al_2O_3$), cobalt oxide and molybdenum oxide on alumina (CoO/$MoO_3/Al_2O_3$), rhenium oxide on alumina activated with tetramethyl tin ($Re_2O_7/Al_2O_3/SnMe_4$), or any combination thereof.

Aspect 120. The process for making a sustainable aviation fuel according to any preceding Aspect, wherein the first catalyst system, the second catalyst system, or both catalyst systems independently comprise a metal alkyl compound selected from an organoaluminum compound, an organoaluminoxane, an organoboron compound, an organozinc compound, an organomagnesium compound, an organolithium compound, or any combination thereof.

Aspect 121. The process for making a sustainable aviation fuel according to any of preceding Aspect, wherein the first catalyst system, the second catalyst system, or both catalyst systems independently comprise a metal alkyl compound having the general formula:
 (a) $M^3(X^{10})_n(X^{11})_{3-n}$, wherein $M^3$ is boron or aluminum and n is from 1 to 3 inclusive;
 (b) $M^4(X^{10})_n(X^{11})_{2-n}$, wherein $M^4$ is magnesium or zinc and n is from 1 to 2 inclusive; or
 (c) $M^5X^{10}$;
wherein $M^5$ is Li; wherein $X^{10}$ is independently hydride or a $C_1$ to $C_{20}$ hydrocarbyl; and $X^{11}$ is independently a halide, a hydride, a $C_1$ to $C_{20}$ hydrocarbyl, or a $C_1$ to $C_{20}$ hydrocarbyloxide.

Aspect 122. The process for making a sustainable aviation fuel according to any preceding Aspect, wherein the first catalyst system, the second catalyst system, or both catalyst systems further comprise hydrogen.

Aspect 123. The process for making a sustainable aviation fuel according to any preceding Aspect, wherein the first catalyst system, the second catalyst system, or both catalyst systems further comprise hydrogen at partial pressure of from 2 psi to 100 psi; 5 psi to 75 psi; or 10 psi to 50 psi.

Aspect 124. The process for making a sustainable aviation fuel according to any of the preceding Aspects, wherein the first catalyst system, the second catalyst system, or both catalyst systems independently comprise, consist essentially of, or are selected from a chromium-based catalyst.

Aspect 125. The process for making a sustainable aviation fuel according to any of Aspects 117-124, wherein the chromium-based catalyst comprises or consists essentially of (a) a chromium-containing compound, (b) a heteroatomic ligand, (c) a metal alkyl compound, and (d) optionally, a diluent.

Aspect 126. The process for making a sustainable aviation fuel according to Aspect 125, wherein the heteroatomic ligand is a separate component of the first catalyst system, the second catalyst system, or both catalyst systems, or wherein the heteroatomic ligand is complexed to the chromium-containing compound of the first catalyst system, the second catalyst system, or both catalyst systems.

Aspect 127. The process for making a sustainable aviation fuel according to any of the preceding Aspects, wherein the first catalyst system, the second catalyst system, or both catalyst systems independently comprise, consist essentially of, or are selected from:
 (a) a chromium-containing compound, a pyrrole compound, an organoaluminum compound, and optionally a halide containing compound;
 (b) a chromium-containing compound, a diphosphino aminyl compound, an organoaluminum compound;
 (c) a chromium-containing compound complexed to a diphosphino aminyl compound, and an organoaluminum compound;

(d) a chromium-containing compound, an $N^2$-phosphinyl amidine compound, and an organoaluminum compound;

(e) a chromium-containing compound complexed to an $N^2$-phosphinyl amidine compound, and an organoaluminum compound;

(f) a chromium-containing compound, an $N^2$-phosphinyl formamidine compound, an organoaluminum compound;

(g) a chromium-containing compound complexed to an $N^2$-phosphinyl formamidine compound, and an organoaluminum compound; or (h) any combinations thereof.

Aspect 128. The process for making a sustainable aviation fuel according to any of Aspects 125-127, wherein the chromium-containing compound is selected from chromium (II) nitrate, chromium(II) sulfate, chromium(II) fluoride, chromium(II) chloride, chromium(II) bromide, or chromium (II) iodide, chromium(III) nitrate, chromium(III) sulfate, chromium(III) fluoride, chromium(III) chloride, chromium (III) bromide, or chromium(III) iodide.

Aspect 129. The process for making a sustainable aviation fuel according to any of Aspects 125-127, wherein the chromium-containing compound is selected from a chromium(II) carboxylate, a chromium(II) alkoxide, chromium (II) aryloxide, a chromium(II) beta-dionate (i.e. beta-diketonate), a chromium(III) carboxylate, a chromium(III) alkoxide, chromium(III) aryloxide, or a chromium(III) beta-dionate (i.e. beta-diketonate).

Aspect 130. The process for making a sustainable aviation fuel according to Aspect 129, wherein:

each carboxylate group of the chromium-containing compound independently can be a $C_2$ to $C_{24}$ carboxylate group, or alternatively a $C_4$ to $C_{19}$ carboxylate group, or alternatively, a $C_5$ to $C_{12}$ carboxylate group;

each alkoxide group of the chromium-containing compound independently can be a $C_1$ to $C_{24}$ alkoxy group, alternatively, a $C_4$ to $C_{19}$ alkoxy group, or alternatively, a $C_5$ to $C_{12}$ alkoxy group;

each aryloxide group of the chromium-containing compound independently can be a $C_6$ to $C_{24}$ aryloxy group, alternatively, a $C_6$ to $C_{19}$ aryloxy group, or alternatively, a $C_6$ to $C_{12}$ aryloxy group; and/or each beta-dionate group of the chromium-containing compound independently can be a $C_5$ to $C_{24}$ beta-dionate group, alternatively, a $C_5$ to $C_{19}$ beta-dionate group, or alternatively, a $C_5$ to $C_{12}$ beta-dionate group.

Aspect 131. The process for making a sustainable aviation fuel according to any of the preceding Aspects, wherein the first catalyst system, the second catalyst system, or both catalyst systems independently comprise a chromium carboxylate comprising or consisting essentially of an acetate, a propionate, a butyrate, a pentanoate, a hexanoate, a heptanoate, an octanoate, a nonanoate, a decanoate, an undecanoate, a dodecanoate, a tridecanoate, a tetradecanoate, a pentadecanoate, a hexadecanoate, a heptadecanoate, or an octadecanoate.

Aspect 132. The process for making a sustainable aviation fuel according to any of the preceding Aspects, wherein the first catalyst system, the second catalyst system, or both catalyst systems independently comprise a chromium carboxylate wherein each carboxylate group of the chromium carboxylate is independently selected from acetate, propionate, n-butyrate, isobutyrate, valerate (n-pentanoate), neopentanoate, capronate (n-hexanoate), n-heptanoate, caprylate (n-octanoate), 2-ethylhexanoate, n-nonanoate, caprate (n-decanoate), n-undecanoate, laurate (n-dodecanoate), or stearate (n-octadecanoate).

Aspect 133. The process for making a sustainable aviation fuel according to any of the preceding Aspects, wherein the first catalyst system, the second catalyst system, or both catalyst systems independently comprise a chromium carboxylate comprising, consisting essentially of, or selected from chromium(II) acetate, chromium(II) propionate, chromium(II) butyrate, chromium(II) isobutyrate, chromium(II) neopentanoate, chromium(II) oxalate, chromium(II) octanoate, chromium(II) 2-ethylhexanoate, chromium(II) laurate, or chromium(II) stearate, chromium(III) acetate, chromium (III) propionate, chromium(III) butyrate, chromium(III) isobutyrate, chromium(III) neopentanoate, chromium(III) oxalate, chromium(III) octanoate, chromium(III) 2-ethylhexanoate, chromium(III) 2,2,6,6,-tetramethylheptanedionate, chromium(III) naphthenate, chromium(III) laurate, or chromium(III) stearate.

Aspect 134. The process for making a sustainable aviation fuel according to any of Aspects 125-133, wherein the heteroatomic ligand can comprise, can consist essentially of, or can be, an amine compound, an amide compound, an imide compound, or combinations thereof.

Aspect 135. The process for making a sustainable aviation fuel according to any of Aspects 125-134, wherein the heteroatomic ligand can comprise, can consist essentially of, or can be:

(a) a $C_2$ to $C_{30}$ amine; alternatively, a $C_2$ to $C_{20}$ amine; alternatively, $C_2$ to $C_{15}$ amine; or alternatively, a $C_2$ to $C_{10}$ amine;

(b) a $C_3$ to $C_{30}$ amide; alternatively, a $C_3$ to $C_{20}$ amide; alternatively, $C_3$ to $C_{15}$ amide; or alternatively, a $C_3$ to $C_{10}$ amide; or (c) a $C_4$ to $C_{30}$ imide; alternatively, a $C_4$ to $C_{20}$ imide; alternatively, $C_4$ to $C_{15}$ imide; or alternatively, a $C_4$ to $C_{10}$ imide.

Aspect 136. The process for making a sustainable aviation fuel according to any of Aspects 125-133, wherein the heteroatomic ligand can comprise, can consist essentially of, or can be, a pyrrole compound, a diphosphino aminyl compound, an $N^2$-phosphinyl amidine compound, an $N^2$-phosphinyl formamidine compound, or combinations thereof.

Aspect 137. The process for making a sustainable aviation fuel according to any of Aspects 125-133, wherein the heteroatomic ligand can comprise, can consist essentially of, or can be:

(a) any pyrrole compound that can form a chromium pyrrolide complex;

(b) is pyrrole ($C_5H_5N$), a derivative of pyrrole (e.g., indole), a substituted pyrroles, or a metal pyrrolide compound; or (c) pyrrole or any heteroleptic or homoleptic metal complex or salt containing a pyrrolide radical or ligand; or (d) a $C_4$ to $C_{30}$ pyrrole; alternatively, a $C_4$ to $C_{20}$ pyrrole; alternatively, $C_4$ to $C_{15}$ pyrrole; or alternatively, a $C_4$ to $C_{10}$ pyrrole.

Aspect 138. The process for making a sustainable aviation fuel according to any of Aspects 125-133, wherein the pyrrole compound can have Formula P1 or Formula I1:

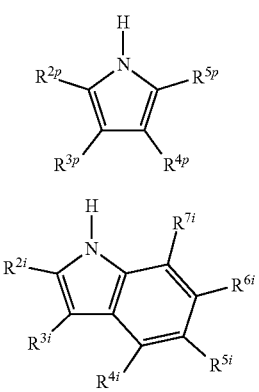

wherein: $R^{2p}$, $R^{3p}$, $R^{4p}$, and $R^{5p}$ of Formula P1 and $R^{2i}$, $R^{3i}$, $R^{4i}$, $R^{5i}$, $R^{6i}$, and $R^{7i}$ of Formula I1 can each independently be:

hydrogen, a $C_1$ to $C_{18}$ organyl group, a $C_1$ to $C_{18}$ hydrocarbyl group, or a $C_3$ to $C_{60}$ silyl group;

alternatively, hydrogen, a $C_1$ to $C_{15}$ organyl group, a $C_1$ to $C_{15}$ hydrocarbyl group, or a $C_3$ to $C_{45}$ silyl group;

alternatively, hydrogen, a $C_1$ to $C_{10}$ organyl group, a $C_1$ to $C_{10}$ hydrocarbyl group, or a $C_3$ to $C_{30}$ silyl group;

alternatively, hydrogen, a $C_1$ to $C_5$ organyl group, a $C_1$ to $C_5$ hydrocarbyl group, or a $C_3$ to $C_{15}$ silyl group.

Aspect 139. The process for making a sustainable aviation fuel according to Aspect 138, wherein $R^{2p}$, $R^{3p}$, $R^{4p}$, and $R^{5p}$ of Formula P1 and $R^{2i}$, $R^{3i}$, $R^{4i}$, $R^{5i}$, $R^{6i}$, and $R^{7i}$ of Formula I1 can each independently be:

hydrogen, or a $C_1$ to $C_{18}$ hydrocarbyl group;
alternatively, hydrogen, or a $C_1$ to $C_{15}$ hydrocarbyl group;
alternatively, hydrogen, or a $C_1$ to $C_{10}$ hydrocarbyl group; or
alternatively, hydrogen, or a $C_1$ to $C_5$ hydrocarbyl group.

Aspect 140. The process for making a sustainable aviation fuel according to any of Aspects 125-133 and 136-139, wherein the pyrrole compound can comprise, can consist essentially of, or can be, pyrrole, 2,5-dimethylpyrrole, 2-methyl-5-ethylpyrrole, 2-methyl-5-propylpyrrole, 2,5-diethylpyrrole, 3,4-dimethylpyrrole, 2,5-di-n-propylpyrrole, 2,5-di-n-butylpyrrole, 2,5-di-n-pentylpyrrole, 2,5-di-n-hexylpyrrole, 2,5-di-n-heptylpyrrole, 2,5-di-n-octylpyrrole, 2,5-dibenzylpyrrole, 2,4-dimethyl-3-ethylpyrrole, 2,3,5-triethylpyrrrole, 2,3,5-tri-n-butylpyrrrole, 2,3,5-tri-n-pentylpyrrrole, 2,3,5-tri-n-hexylpyrrrole, 2,3,5-tri-n-heptylpyrrrole, 2,3,5-tri-n-octylpyrrrole, 2,3,4,5-tetraethylpyrrole, 2,3,4,5-tetra-n-butylpyrrole, 2,3,4,5-tetra-n-hexylpyrrole, 2,5-bis(2',2',2'-trifluoroethyl) pyrrole, 2,5-bis(2'-methoxymethyl) pyrrole, 2-methyl-4-isopropylpyrrole, 2-ethyl-4-isopropylpyrrole, 2-methyl-4-sec-butylpyrrole, 2-ethyl-4-sec-butylpyrrole, 2-methyl-4-isobutylpyrrole, 2-ethyl-4-isobutylpyrrole, 2-methyl-4-t-butylpyrrole, 2-ethyl-4-t-butylpyrrole, 2-methyl-4-neopentylpyrrole, 2-ethyl-4-neopentylpyrrole, 3,4-diisopropylpyrrole, 3,4-di-sec-butylpyrrole, 3,4-diisobutylpyrrole, 3,4-di-t-butylpyrrole, 3,4-di-neopentylpropylpyrrole, tetrahydroindole, dipyrrolylmethane, indole, 3,4-dichloropyrrole, 2,3,4,5-tetrachloropyrrole, pyrrole-2-carboxylic acid, 2-acetylpyrrole, pyrrole-2-carboxaldehyde, 3-acetyl-2,4-dimethylpyrrole, ethyl-2,4-dimethyl-5-(ethoxycarbonyl)-3-pyrrole-propionate, or ethyl-3,5-dimethyl-2-pyrrolecarboxylate.

Aspect 141. The process for making a sustainable aviation fuel according to any of Aspects 125-133 and 136-139, wherein the pyrrole compound can comprise, can consist essentially of, or can be:

(a) a metal pyrrolide, such as an alkyl metal pyrrolide;
(b) a diorganoaluminum pyrrolide of any pyrrole provided herein;
(c) diethylaluminum 2,5-dimethylpyrrolide, ethylaluminum di(2,5-dimethylpyrrolide), aluminum tri (2,5-dimethylpyrrolide),
or combinations thereof.

Aspect 142. The process for making a sustainable aviation fuel according to any of Aspects 125-141, wherein the heteroatomic ligand can comprise, can consist essentially of, or can be, a diphosphino aminyl compound (i.e. a compound comprising a P—N—P (phosphorus-nitrogen-phosphorus) linkage).

Aspect 143. The process for making a sustainable aviation fuel according to any of Aspects 125-142, wherein the heteroatomic ligand can comprise, can consist essentially of, or can be a diphosphino aminyl moiety having Structure PNP2:

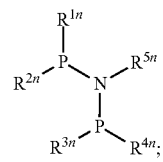

wherein the $R^{1n}$, $R^{2n}$, $R^{3n}$, $R^{4n}$, and/or $R^{5n}$, independently can be:

(a) a $C_1$ to $C_{30}$ organyl group; alternatively, a $C_1$ to $C_{20}$ organyl group; alternatively, a $C_1$ to $C_{15}$ organyl group; alternatively, a $C_1$ to $C_{10}$ organyl group; or alternatively, a $C_1$ to $C_5$ organyl group;

(b) a $C_1$ to $C_{30}$ organyl group comprising inert functional groups; alternatively, a $C_1$ to $C_{20}$ organyl group comprising inert functional groups; alternatively, a $C_1$ to $C_{15}$ organyl group comprising inert functional groups; alternatively, a $C_1$ to $C_{10}$ organyl group comprising inert functional groups; or alternatively, a $C_1$ to $C_5$ organyl group comprising inert functional groups;

(c) a $C_1$ to $C_{30}$ hydrocarbyl group; alternatively, a $C_1$ to $C_{20}$ hydrocarbyl group; alternatively, a $C_1$ to $C_{15}$ hydrocarbyl group; alternatively, a $C_1$ to $C_{10}$ hydrocarbyl group; or alternatively, a $C_1$ to $C_5$ hydrocarbyl group;

(d) a $C_1$ to $C_{30}$ alkyl group; alternatively, a $C_1$ to $C_{20}$ alkyl group; alternatively, a $C_1$ to $C_{15}$ alkyl group; alternatively, a $C_1$ to $C_{10}$ alkyl group; or alternatively, a $C_1$ to $C_5$ alkyl group;

(e) a $C_6$ to $C_{30}$ aromatic group; alternatively, a $C_6$ to $C_{20}$ aromatic group; alternatively, a $C_6$ to $C_{15}$ aromatic group; or alternatively, a $C_6$ to $C_{10}$ aromatic group;

(f) a phenyl group or a $C_6$ to $C_{30}$ substituted phenyl group; alternatively, a phenyl group or a $C_6$ to $C_{20}$ substituted phenyl group; alternatively, a phenyl group or a $C_6$ to $C_{15}$ substituted phenyl group; alternatively, a phenyl group or a $C_6$ to $C_{10}$ substituted phenyl group; or alternatively, a phenyl group; or (g) a substituted or an unsubstituted $C_1$ to $C_{20}$ alkyl group, $C_5$ to $C_{20}$ cycloalkyl group, or $C_6$-$C_{20}$ aromatic group; wherein any substituents are selected independently from a $C_1$ to $C_{10}$ hydrocarbyl group.

Aspect 144. The process for making a sustainable aviation fuel according to Aspect 143, wherein $R^{1n}$ and $R^{2n}$, and/or $R^{3n}$ and $R^{4n}$ of the diphosphino aminyl moiety can be joined to form a ring containing a phosphorus atom of the diphosphino aminyl moiety.

Aspect 145. The process for making a sustainable aviation fuel according to any of Aspects 143-144, wherein $R^{1n}$ and $R^{5n}$, or $R^{4n}$ and Ron of the diphosphino aminyl moiety can be joined to form a ring containing a phosphorus atom and the nitrogen atom of the diphosphino aminyl moiety.

Aspect 146. The process for making a sustainable aviation fuel according to any of Aspects 125-145, wherein the heteroatomic ligand can be an $N^2$-phosphinyl formamidine compound having Structure NPF1, or an $N^2$-phosphinyl formamidine compound having Structure NPA1:

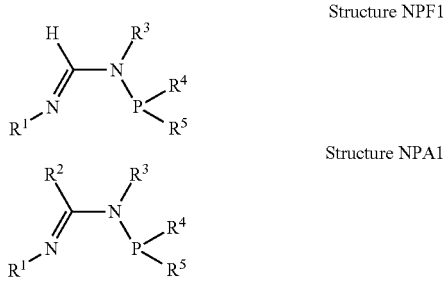

Structure NPF1

Structure NPA1 wherein $R^1$, $R^2$, $R^3$, $R^4$, and $R^5$ within Structure NPF1 and Structure NPFCr1 are independently:
(a)(i) a $C_1$ to $C_{30}$ organyl group, a $C_1$ to $C_{30}$ organyl group consisting essentially of inert functional groups, or a $C_1$ to $C_{30}$ hydrocarbyl group; (ii) a $C_1$ to $C_{20}$ organyl group, a $C_1$ to $C_{20}$ organyl group consisting essentially of inert functional groups, or a $C_1$ to $C_{20}$ hydrocarbyl group; (iii) a $C_1$ to $C_{15}$ organyl group, a $C_1$ to $C_{15}$ organyl group consisting essentially of inert functional groups, or a $C_1$ to $C_{15}$ hydrocarbyl group; (iv) a $C_1$ to $C_{10}$ organyl group, a $C_1$ to $C_{10}$ organyl group consisting essentially of inert functional groups, or a $C_1$ to $C_{10}$ hydrocarbyl group; or (v) a $C_1$ to $C_5$ organyl group, a $C_1$ to $C_5$ organyl group consisting essentially of inert functional groups, or a $C_1$ to $C_5$ hydrocarbyl group;
(b) a $C_1$ to $C_{30}$ alkyl group; alternatively, a $C_1$ to $C_{20}$ alkyl group; alternatively, a $C_1$ to $C_{15}$ alkyl group; alternatively, a $C_1$ to $C_{10}$ alkyl group; or alternatively, a $C_1$ to $C_5$ alkyl group; or
(c) a be a $C_6$ to $C_{30}$ aromatic group; alternatively, a $C_6$ to $C_{20}$ aromatic group; alternatively, a $C_6$ to $C_{15}$ aromatic group; or alternatively, a $C_6$ to $C_{10}$ aromatic group;
(d) a phenyl group or a $C_6$ to $C_{30}$ substituted phenyl group; alternatively, a phenyl group or a $C_6$ to $C_{20}$ substituted phenyl group; alternatively, a phenyl group or a $C_6$ to $C_{15}$ substituted phenyl group; or alternatively, a phenyl group or a $C_6$ to $C_{10}$ substituted phenyl group; or
(e) a benzyl group or a $C_6$ to $C_{30}$ substituted benzyl group; alternatively, a benzyl group or a $C_6$ to $C_{20}$ substituted benzyl group; alternatively, a benzyl group or a $C_6$ to $C_{15}$ substituted benzyl group; or alternatively, a benzyl group or a $C_6$ to $C_{10}$ substituted benzyl group.

Aspect 147. The process for making a sustainable aviation fuel according to any of Aspects 127-146, wherein the chromium-containing compound complexed to an $N^2$-phosphinyl formamidine compound or the chromium-containing compound complexed to an $N^2$-phosphinyl amidine compound have the following structures:

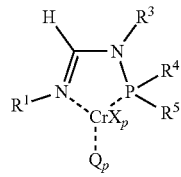

Structure NPFCr1

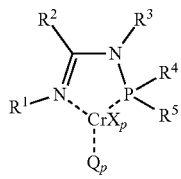

Structure NPACr1 wherein X is an anionic ligand, and p is from 2 to 6, Q is a neutral ligand such as a nitrile ligand or an ether ligand, and q is from 0 to 6; and
wherein $R^1$, $R^2$, $R^3$, $R^4$, and $R^5$ within Structure NPF1 and Structure NPFCr1 are independently:
(a)(i) a $C_1$ to $C_{30}$ organyl group, a $C_1$ to $C_{30}$ organyl group consisting essentially of inert functional groups, or a $C_1$ to $C_{30}$ hydrocarbyl group; (ii) a $C_1$ to $C_{20}$ organyl group, a $C_1$ to $C_{20}$ organyl group consisting essentially of inert functional groups, or a $C_1$ to $C_{20}$ hydrocarbyl group; (iii) a $C_1$ to $C_{15}$ organyl group, a $C_1$ to $C_{15}$ organyl group consisting essentially of inert functional groups, or a $C_1$ to $C_{15}$ hydrocarbyl group; (iv) a $C_1$ to $C_{10}$ organyl group, a $C_1$ to $C_{10}$ organyl group consisting essentially of inert functional groups, or a $C_1$ to $C_{10}$ hydrocarbyl group; or (v) a $C_1$ to $C_5$ organyl group, a $C_1$ to $C_5$ organyl group consisting essentially of inert functional groups, or a $C_1$ to $C_5$ hydrocarbyl group;
(b) a $C_1$ to $C_{30}$ alkyl group; alternatively, a $C_1$ to $C_{20}$ alkyl group; alternatively, a $C_1$ to $C_{15}$ alkyl group; alternatively, a $C_1$ to $C_{10}$ alkyl group; or alternatively, a $C_1$ to $C_5$ alkyl group; or
(c) a be a $C_6$ to $C_{30}$ aromatic group; alternatively, a $C_6$ to $C_{20}$ aromatic group; alternatively, a $C_6$ to $C_{15}$ aromatic group; or alternatively, a $C_6$ to $C_{10}$ aromatic group;
(d) a phenyl group or a $C_6$ to $C_{30}$ substituted phenyl group; alternatively, a phenyl group or a $C_6$ to $C_{20}$ substituted phenyl group; alternatively, a phenyl group or a $C_6$ to $C_{15}$ substituted phenyl group; or alternatively, a phenyl group or a $C_6$ to $C_{10}$ substituted phenyl group; or
(e) a benzyl group or a $C_6$ to $C_{30}$ substituted benzyl group; alternatively, a benzyl group or a $C_6$ to $C_{20}$ substituted benzyl group; alternatively, a benzyl group or a $C_6$ to $C_{15}$ substituted benzyl group; or alternatively, a benzyl group or a $C_6$ to $C_{10}$ substituted benzyl group.

Aspect 148. The process for making a sustainable aviation fuel according to any of Aspects 146-147, wherein:
$R^1$ is a $C_1$ to $C_{15}$ alkyl group, a $C_4$ to $C_{20}$ cycloalkyl group, a $C_4$ to $C_{20}$ substituted cycloalkyl group, a $C_6$ to $C_{20}$ aryl group, or a $C_6$ to $C_{20}$ substituted aryl group;
$R^2$ is a $C_1$ to $C_{30}$ organyl group consisting essentially of inert functional groups wherein the inert functional groups are selected from halo groups, nitro groups, hydrocarboxy groups, sulfidyl groups, hydrocarbyl groups, or combinations thereof;
$R^3$ is hydrogen; and
$R^4$ and $R^5$ are each independently a $C_1$ to $C_{30}$ organyl group consisting essentially of inert functional groups wherein the inert functional groups are selected from halo groups, nitro groups, hydrocarboxy groups, sulfidyl groups, hydrocarbyl groups, or combinations thereof.

Aspect 149. The process for making a sustainable aviation fuel according to any of Aspects 137-148, or any of the preceding Aspects, wherein any substituent of a substituted group is selected from:
(a) a halide, a hydrocarbyl group, or a hydrocarboxy group; alternatively, a halide or a hydrocarbyl group; or
(b) a $C_1$ to $C_{10}$ hydrocarbyl group, or a $C_1$ to $C_{10}$ hydrocarboxy group; alternatively, a halide or a $C_1$ to $C_{10}$ hydrocarbyl group; alternatively, a halide or a $C_1$ to $C_{10}$ hydrocarboxy group; alternatively, a $C_1$ to $C_{10}$ hydrocarbyl group or a $C_1$ to $C_{10}$ hydrocarboxy group; alternatively, a halide; alternatively, a $C_1$ to $C_{10}$ hydrocarbyl group; or alternatively, a $C_1$ to $C_{10}$ hydrocarboxy group.

Aspect 150. The process for making a sustainable aviation fuel according to any of the preceding Aspects, wherein the first catalyst system, the second catalyst system, or both catalyst systems independently comprise an organoaluminum compound.

Aspect 151. The process for making a sustainable aviation fuel according to Aspect 150, wherein the organoaluminum compound comprises, consists essentially of, or is selected from a triorganoaluminum compound, a diorganoaluminum halide, an organoaluminum dihalide, a diorganoaluminum alkoxide, an organoaluminum dialkoxide, an aluminoxane, or combinations thereof.

Aspect 152. The process for making a sustainable aviation fuel according to Aspect 150, wherein the organoaluminum compound has a general formula $Al(R^{10})_n(X^{11})_{3-n}$, wherein: n is from 1 to 3 inclusive; each $R^{10}$ is independently a $C_1$ to $C_{20}$ hydrocarbyl; and $X^{11}$ is independently a halide, a hydride, a $C_1$ to $C_{20}$ hydrocarbyl, or a $C_1$ to $C_{20}$ hydrocarbyloxide.

Aspect 153. The process for making a sustainable aviation fuel according to Aspect 150, wherein the organoaluminum compound comprises, consists of, consists essentially of, or is selected from trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, or any combination thereof.

Aspect 154. The process for making a sustainable aviation fuel according to Aspect 150, wherein the organoaluminum compound comprises, consists of, consists essentially of, or is selected from an aluminoxane compound.

Aspect 155. The process for making a sustainable aviation fuel according to Aspect 150, wherein the organoaluminum compound comprises, consists of, consists essentially of, or is selected from at least one aluminoxane compound, and wherein the aluminoxane comprises
a cyclic aluminoxane having the formula

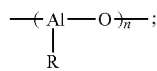

wherein R is a linear or branched alkyl having from 1 to 10 carbon atoms, and n is an integer from 3 to about 10;
a linear aluminoxane having the formula

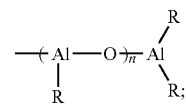

wherein R is a linear or branched alkyl having from 1 to 10 carbon atoms, and n is an integer from 1 to about 50;
a cage aluminoxane having the formula $R^t_{5m+a}R^b_{m-a}Al_{4m}O_{3m}$, wherein m is 3 or 4 and $\alpha = n_{Al(3)} - n_{O(2)} + n_{O(4)}$; wherein $n_{Al(3)}$ is the number of three coordinate aluminum atoms, no (2) is the number of two coordinate oxygen atoms, no (4) is the number of 4 coordinate oxygen atoms, $R^t$ represents a terminal alkyl group, and $R^b$ represents a bridging alkyl group; wherein R is a linear or branched alkyl having from 1 to 10 carbon atoms; or any combination thereof.

Aspect 156. The process for making a sustainable aviation fuel according to Aspect 150, wherein the organoaluminum compound comprises, consists of, consists essentially of, or is selected from an aluminoxane having the formula $(R^C-Al-O)_t$ or $R^C(R^C-Al-O)_tAl(R^C)_2$, wherein $R^C$ is a linear or branched $C_1$-$C_6$ alkyl such as methyl, ethyl, propyl, butyl, pentyl, or hexyl wherein t is an integer from 1 to 50, inclusive, or t is an integer from 2 to 20.

Aspect 157. The process for making a sustainable aviation fuel according to Aspect 150, wherein the organoaluminum compound comprises, consists of, consists essentially of, or is selected from methylaluminoxane (MAO), ethylaluminoxane, modified methylaluminoxane (MMAO) such as an isobutyl-modified methyl alumoxane, n-propylaluminoxane, iso-propyl-aluminoxane, n-butylaluminoxane, t-butylaluminoxane, sec-butylaluminoxane, iso-butylaluminoxane, t-butyl aluminoxane, 1-pentylaluminoxane, 2-pentylaluminoxane, 3-pentyl-aluminoxane, iso-pentylaluminoxane, neopentylaluminoxane, or combinations thereof.

Aspect 158. The process for making a sustainable aviation fuel according to any of the preceding Aspects, wherein the first catalyst system, the second catalyst system, or both catalyst systems independently comprise a diluent.

Aspect 159. The process for making a sustainable aviation fuel according to Aspect 158, wherein the diluent comprises, consists essentially of, or is selected from a hydrocarbon, a halogenated hydrocarbon, or combinations thereof.

Aspect 160. The process for making a sustainable aviation fuel according to any of Aspects 158-159, wherein the diluent comprises, consists essentially of, or is selected from a cyclic diluent, an acyclic diluent, or combinations thereof.

Aspect 161. The process for making a sustainable aviation fuel according to any of Aspects 158-160, wherein the diluent comprises, consists essentially of, or is selected from a linear diluent, a branched diluent, or combinations thereof.

Aspect 162. The process for making a sustainable aviation fuel according to any of Aspects 158-161, wherein the diluent comprises, consists essentially of, or is selected from a aliphatic hydrocarbons, aromatic hydrocarbons, petroleum distillates, halogenated aliphatic hydrocarbons, halogenated aromatic hydrocarbons, or combinations thereof.

Aspect 163. The process for making a sustainable aviation fuel according to any of Aspects 158-162, wherein the diluent comprises, consists essentially of, or is selected from a $C_3$ to $C_8$ linear or branched acyclic aliphatic hydrocarbon, $C_6$ to $C_{10}$ aromatic hydrocarbons, $C_1$ to $C_{15}$ halogenated aliphatic hydrocarbons, $C_1$ to $C_{10}$ halogenated aliphatic hydrocarbons, $C_1$ to $C_5$ halogenated aliphatic hydrocarbons, $C_6$ to $C_{20}$ halogenated aromatic hydrocarbons, $C_6$ to $C_{10}$ halogenated aromatic hydrocarbons, or combinations thereof.

Aspect 164. The process for making a sustainable aviation fuel according to any of Aspects 158-163, wherein the diluent comprises, consists essentially of, or is selected from a propane, iso-butane, n-butane, butane (n-butane or a mixture of linear and branched $C_4$ acyclic aliphatic hydrocarbons), pentane (n-pentane or a mixture of linear and branched $C_5$ acyclic aliphatic hydrocarbons), hexane (n-hexane or mixture of linear and branched $C_6$ acyclic aliphatic hydrocarbons), heptane (n-heptane or a mixture of linear and branched $C_7$ acyclic aliphatic hydrocarbons), octane (n-octane or a mixture of linear and branched $C_8$ acyclic aliphatic hydrocarbons), cyclohexane, methyl cyclohexane, benzene, toluene, xylene (including ortho-xylene, meta-xylene, para-xylene, or mixtures thereof), ethylbenzene, methylene chloride, chloroform, carbon tetrachloride, dichloroethane, trichloroethane, chlorobenzene, dichlorobenzene, or combinations thereof.

Aspect 165. The process for making a sustainable aviation fuel according to any of the preceding Aspects, wherein the biomass ethanol is produced from a starch-based feedstock, a sugar-based feedstock, or a cellulosic feedstock, or is produced from a bio-syngas to ethanol process.

Aspect 166. The process for making a sustainable aviation fuel according to Aspect 165, wherein the biomass ethanol is produced by the fermentation of sugars derived from a starch-based feedstock or a sugar-based feedstock.

Aspect 167. The process for making a sustainable aviation fuel according to Aspect 165, wherein the biomass ethanol is produced by the fermentation of a carbohydrate derived from a starch-based feedstock, a sugar-based feedstock, or a cellulosic feedstock.

Aspect 168. The process for making a sustainable aviation fuel according to any of Aspects 165-167, wherein the starch-based feedstock comprises barley, cassava root, corn, potato, rice, sorghum grain, sweet potato, wheat, rye, or any combination thereof.

Aspect 169. The process for making a sustainable aviation fuel according to any of Aspects 165-168, wherein the sugar-based feedstock comprises sugar cane, sugar beet, sweet sorghum, molasses, fruit, or any combination thereof.

Aspect 170. The process for making a sustainable aviation fuel according to any of Aspects 165-169, wherein the biomass ethanol is produced from a starch-based feedstock by a process comprising the enzymatic hydrolysis of the starch-based feedstock to produce sugars, followed by yeast fermentation of the sugars.

Aspect 171. The process for making a sustainable aviation fuel according to Aspect 165, wherein the biomass ethanol is produced from cellulosic feedstock.

Aspect 172. The process for making a sustainable aviation fuel according to Aspect 171, wherein the cellulosic feedstock comprises corn stover, wheat straw, sugar cane bagasse, switchgrass, or wood chips.

Aspect 173. The process for making a sustainable aviation fuel according to any of the preceding Aspects, wherein dehydration of the biomass ethanol comprising contacting the biomass ethanol with a dehydration catalyst under conditions suitable to form bio-ethylene.

Aspect 174. The process for making a sustainable aviation fuel according to Aspect 173, wherein dehydration of the biomass ethanol comprises passing liquid phase ethanol through a bed comprising the dehydration catalyst.

Aspect 175. The process for making a sustainable aviation fuel according to any of Aspects 173-174, further comprising regenerating the dehydration catalyst by heating at atmosphere pressure or at reduced pressure.

Aspect 176. The process for making a sustainable aviation fuel according to any of Aspects 173-175, wherein the dehydration catalyst comprises, consists essentially of, or is alumina, silica gel, silica-alumina, a crystalline silicate, a dealuminated crystalline silicate, a phosphorus-modified crystalline silicate, a zeolite, a molecular sieve, or anhydrous calcium sulfate.

Aspect 177. The process for making a sustainable aviation fuel according to any of Aspects 173-176, wherein the dehydration catalyst comprises, consists essentially of, or is a lanthanum-modified H-ZSM-catalyst, a ZSM-5/SAPO-34 composite, a mordenite catalyst, microspherical SAPO-34 catalyst, a phosphorus-modified HZSM-5 catalyst, a lanthanum-phosphorous modified HZSM-5 catalyst, a gallium-modified zeolite, a gallium-modified SAPO-11, a gallium-modified HZSM-5, a ZSM-based catalyst, a heteropolyacid catalyst, or a supported heteropolyacid catalyst.

Aspect 178. The process for making a sustainable aviation fuel according to any of Aspects 173-177, wherein the dehydration catalyst comprises, consists essentially of, or is a ZSM-5 zeolite comprising from 0.1 wt % to 0.5 wt % of lanthanum and from 0.01 wt % to 1 wt % phosphorous, relative to the weight of the catalyst, wherein the ZSM-5 has a silica to alumina molar ratio of 20 to 45.

Aspect 179. The process for making a sustainable aviation fuel according to any of the preceding Aspects, wherein the first hydrogenation catalyst, the second hydrogenation catalyst, or both independently comprise, consist essentially of, or are selected from a nickel or a nickel-containing catalyst, a platinum or a platinum-containing catalyst, or a palladium or a palladium-containing catalyst.

Aspect 180. The process for making a sustainable aviation fuel according to any of the preceding Aspects, wherein the first hydrogenation catalyst, the second hydrogenation catalyst, or both independently comprise, consist essentially of, or are selected from:
(a) a heterogeneous catalyst selected from a Group 8-12 metal deposited on a carrier selected from carbon, silica, alumina, silica-alumina, a zeolite, or calcium carbonate; or
(b) a homogeneous catalysts selected from (i) a Ziegler catalysts comprising an organic salt of a Group 6-10 metal and an organoaluminum compound, or (ii) a coordination compound of Ru, Rh, or Ir, or (iii) a Group 4 metal organometallic compound.

Aspect 181. The process for making a sustainable aviation fuel according to Aspect 180, wherein (a) the Group 8-12 metal of the heterogeneous catalysts is selected from Fe, Co, Ni, Cu, Zn, Ru, Rh, Pd, Ir, or Pt; (b) the Group 6-10 metal of the homogeneous catalyst is selected from Ni, Co, Fe, or Cr; or (c) the Group 4 metal organometallic compound is selected from a Group 4 metallocene compound.

Aspect 182. The process for making a sustainable aviation fuel according to any of the preceding Aspects, wherein the first hydrogenation catalyst, the second hydrogenation catalyst, or both independently comprise one or more metals selected from cobalt, molybdenum, nickel or tungsten.

Aspect 183. The process for making a sustainable aviation fuel according to any of the preceding Aspects, wherein the contacting the bio-ethylene feed with the first catalyst system occurs at a total pressure of from 0 psig (0 KPa) to 2,500 psig (17.3 MPa); alternatively, from 0 psig (KPa) to 1,600 psig (11.0 MPa); alternatively, from 0 psig (KPa) to 1,500 psig (10.4 MPa); alternatively, from 50 psig (344 KPa) to 2,500 psig (17.3 MPa); alternatively, from 100 psig (689 KPa) to 2,500 psig (17.3 MPa); alternatively, from 150 psig (1.0 MPa) to 2,000 psig (13.8 MPa); or alternatively, from 300 psig (2.0 MPa) to 900 psig (6.2 MPa).

Aspect 184. The process for making a sustainable aviation fuel according to any of the preceding Aspects, wherein the contacting the bio-ethylene feed with the first catalyst system occurs at a bio-ethylene feed pressure of from 0 psig (0 KPa) to 2,500 psig (17.3 MPa); alternatively, from 50 psig (344 KPa) to 2,500 psig (17.3 MPa); alternatively, from 100 psig (689 KPa) to 2,500 psig (17.3 MPa); or alternatively, from 150 psig (1.0 MPa) to 2,000 psig (13.8).

Aspect 185. The process for making a sustainable aviation fuel according to any of the preceding Aspects, wherein the contacting the bio-ethylene feed with the first catalyst system occurs at a temperature of at least 0° C.; alternatively, at least 10° C.; alternatively, at least 20° C.; alternatively, at least 30° C.; alternatively, at least 40° C.; alternatively, at least 50° C.; alternatively, at least 60° C.; alternatively, at least 70° C.; alternatively, at least 80° C.; alternatively, at least 90° C.; alternatively, at least 100° C.; alternatively, at least 110° C.; alternatively, at least 120° C.; alternatively, at least 130° C.; alternatively, at least 140° C.; alternatively, at least 150° C.; alternatively, at least 160° C.; alternatively, at least 170° C.; or alternatively, at least 180° C.

Aspect 186. The process for making a sustainable aviation fuel according to any of the preceding Aspects, wherein the contacting the bio-ethylene feed with the first catalyst system occurs at a temperature of less than 180° C.; alternatively, less than 160° C.; alternatively, less than 140° C.; alternatively, less than 120° C.; alternatively, less than 100° C.; alternatively, less than 90° C.; or alternatively, less than 80° C.

Aspect 187. The process for making a sustainable aviation fuel according to any of the preceding Aspects, wherein the contacting the bio-ethylene feed with the first catalyst system occurs at a temperature within a range of from 0° C. to 180° C.; alternatively, from 10° C. to 160° C.; alternatively, from 20° C. to 140° C.; alternatively, from 30° C. to 120° C.; alternatively, from 40° C. to 100° C.; alternatively, from 50° C. to 100° C.; or alternatively, from 60° C. to 140° C.

Aspect 188. A composition comprising 2-ethyl-3-propyl-1-heptene, 5-propyl-1-nonene, 2-ethyl-5-methyl-1-nonene, 7-methyl-1-undecene, 2-ethyl-4-ethyl-1-octene, 6-ethyl-1-decene, 2-ethyl-1-decene, and 1-dodecene.

Aspect 189. A composition comprising any combination of 2-ethyl-3-propyl-1-heptene, 5-propyl-1-nonene, 2-ethyl-5-methyl-1-nonene, 7-methyl-1-undecene, 2-ethyl-4-ethyl-1-octene, 6-ethyl-1-decene, 2-ethyl-1-decene, and 1-dodecene.

Aspect 190. A composition comprising any three of 2-ethyl-3-propyl-1-heptene, 5-propyl-1-nonene, 2-ethyl-5-methyl-1-nonene, 7-methyl-1-undecene, 2-ethyl-4-ethyl-1-octene, 6-ethyl-1-decene, 2-ethyl-1-decene, and 1-dodecene.

Aspect 191. A composition comprising any four of 2-ethyl-3-propyl-1-heptene, 5-propyl-1-nonene, 2-ethyl-5-methyl-1-nonene, 7-methyl-1-undecene, 2-ethyl-4-ethyl-1-octene, 6-ethyl-1-decene, 2-ethyl-1-decene, and 1-dodecene.

Aspect 192. A composition comprising any five of 2-ethyl-3-propyl-1-heptene, 5-propyl-1-nonene, 2-ethyl-5-methyl-1-nonene, 7-methyl-1-undecene, 2-ethyl-4-ethyl-1-octene, 6-ethyl-1-decene, 2-ethyl-1-decene, and 1-dodecene.

Aspect 193. A composition comprising any six of 2-ethyl-3-propyl-1-heptene, 5-propyl-1-nonene, 2-ethyl-5-methyl-1-nonene, 7-methyl-1-undecene, 2-ethyl-4-ethyl-1-octene, 6-ethyl-1-decene, 2-ethyl-1-decene, and 1-dodecene.

Aspect 194. A composition comprising any seven of 2-ethyl-3-propyl-1-heptene, 5-propyl-1-nonene, 2-ethyl-5-methyl-1-nonene, 7-methyl-1-undecene, 2-ethyl-4-ethyl-1-octene, 6-ethyl-1-decene, 2-ethyl-1-decene, and 1-dodecene.

Aspect 195. A composition comprising 3-methyl-4-propyloctane, 5-propylnonane, 3,6-dimethyldecane, 5-methylundecane, 5-ethyl-3-methylnonane, 5-ethyldecane, 3-methylundecane, and dodecane.

Aspect 196. A composition comprising any combination of 3-methyl-4-propyloctane, 5-propylnonane, 3,6-dimethyldecane, 5-methylundecane, 5-ethyl-3-methylnonane, 5-ethyldecane, 3-methylundecane, and dodecane.

Aspect 197. A composition comprising any three of 3-methyl-4-propyloctane, 5-propylnonane, 3,6-dimethyldecane, 5-methylundecane, 5-ethyl-3-methylnonane, 5-ethyldecane, 3-methylundecane, and dodecane.

Aspect 198. A composition comprising any four of 3-methyl-4-propyloctane, 5-propylnonane, 3,6-dimethyldecane, 5-methylundecane, 5-ethyl-3-methylnonane, 5-ethyldecane, 3-methylundecane, and dodecane.

Aspect 199. A composition comprising any five of 3-methyl-4-propyloctane, 5-propylnonane, 3,6-dimethyldecane, 5-methylundecane, 5-ethyl-3-methylnonane, 5-ethyldecane, 3-methylundecane, and dodecane.

Aspect 200. A composition comprising any six of 3-methyl-4-propyloctane, 5-propylnonane, 3,6-dimethyldecane, 5-methylundecane, 5-ethyl-3-methylnonane, 5-ethyldecane, 3-methylundecane, and dodecane.

Aspect 201. A composition comprising any seven of 3-methyl-4-propyloctane, 5-propylnonane, 3,6-dimethyldecane, 5-methylundecane, 5-ethyl-3-methylnonane, 5-ethyldecane, 3-methylundecane, and dodecane.

Aspect 202. A composition comprising 4-methylene-5-propylnonane, 2-methyl-5-propylnon-1-ene, 7-methyl-4-methyleneundecane, 2,7-dimethylundec-1-ene, 6-ethyl-4-methylenedecane, 6-ethyl-2-methyldec-1-ene, 4-methylenedodecane, and 2-methyldodec-1-ene.

Aspect 203. A composition comprising any combination of 4-methylene-5-propylnonane, 2-methyl-5-propylnon-1-ene, 7-methyl-4-methyleneundecane, 2,7-dimethylundec-1-ene, 6-ethyl-4-methylenedecane, 6-ethyl-2-methyldec-1-ene, 4-methylenedodecane, and 2-methyldodec-1-ene.

Aspect 204. A composition comprising any three of 4-methylene-5-propylnonane, 2-methyl-5-propylnon-1-ene, 7-methyl-4-methyleneundecane, 2,7-dimethylundec-1-ene, 6-ethyl-4-methylenedecane, 6-ethyl-2-methyldec-1-ene, 4-methylenedodecane, and 2-methyldodec-1-ene.

Aspect 205. A composition comprising any four of 4-methylene-5-propylnonane, 2-methyl-5-propylnon-1-ene, 7-methyl-4-methyleneundecane, 2,7-dimethylundec-1-ene, 6-ethyl-4-methylenedecane, 6-ethyl-2-methyldec-1-ene, 4-methylenedodecane, and 2-methyldodec-1-ene.

Aspect 206. A composition comprising any five of 4-methylene-5-propylnonane, 2-methyl-5-propylnon-1-ene, 7-methyl-4-methyleneundecane, 2,7-dimethylundec-1-ene, 6-ethyl-4-methylenedecane, 6-ethyl-2-methyldec-1-ene, 4-methylenedodecane, and 2-methyldodec-1-ene.

Aspect 207. A composition comprising any six of 4-methylene-5-propylnonane, 2-methyl-5-propylnon-1-ene, 7-methyl-4-methyleneundecane, 2,7-dimethylundec-1-ene, 6-ethyl-4-methylenedecane, 6-ethyl-2-methyldec-1-ene, 4-methylenedodecane, and 2-methyldodec-1-ene.

Aspect 208. A composition comprising any seven of 4-methylene-5-propylnonane, 2-methyl-5-propylnon-1-ene, 7-methyl-4-methyleneundecane, 2,7-dimethylundec-1-ene, 6-ethyl-4-methylenedecane, 6-ethyl-2-methyldec-1-ene, 4-methylenedodecane, and 2-methyldodec-1-ene.

Aspect 209. A composition comprising 4-methyl-5-propylnonane, 2-methyl-5-propylnonane, 4,7-dimethylundecane, 2,7-dimethylundecane, 6-ethyl-4-methyldecane, 6-ethyl-2-methyldecane, 4-methyldodecane, and 2-methyldodecane.

Aspect 210. A composition comprising any combination of 4-methyl-5-propylnonane, 2-methyl-5-propylnonane, 4,7-dimethylundecane, 2,7-dimethylundecane, 6-ethyl-4-methyldecane, 6-ethyl-2-methyldecane, 4-methyldodecane, and 2-methyldodecane.

Aspect 211. A composition comprising any three of 4-methyl-5-propylnonane, 2-methyl-5-propylnonane, 4,7-dimethylundecane, 2,7-dimethylundecane, 6-ethyl-4-methyldecane, 6-ethyl-2-methyldecane, 4-methyldodecane, and 2-methyldodecane.

Aspect 212. A composition comprising any four of 4-methyl-5-propylnonane, 2-methyl-5-propylnonane, 4,7-dimethylundecane, 2,7-dimethylundecane, 6-ethyl-4-methyldecane, 6-ethyl-2-methyldecane, 4-methyldodecane, and 2-methyldodecane.

Aspect 213. A composition comprising any five of 4-methyl-5-propylnonane, 2-methyl-5-propylnonane, 4,7-dimethylundecane, 2,7-dimethylundecane, 6-ethyl-4-methyldecane, 6-ethyl-2-methyldecane, 4-methyldodecane, and 2-methyldodecane.

Aspect 214. A composition comprising any six of 4-methyl-5-propylnonane, 2-methyl-5-propylnonane, 4,7-dimethylundecane, 2,7-dimethylundecane, 6-ethyl-4-methyldecane, 6-ethyl-2-methyldecane, 4-methyldodecane, and 2-methyldodecane.

Aspect 215. A composition comprising any seven of 4-methyl-5-propylnonane, 2-methyl-5-propylnonane, 4,7-dimethylundecane, 2,7-dimethylundecane, 6-ethyl-4-methyldecane, 6-ethyl-2-methyldecane, 4-methyldodecane, and 2-methyldodecane.

Aspect 216. A composition comprising 5-methylene-6-propyl decane, 3-methylene-6-propyl decane, 5-methylene-8-methyl dodecane, 3-methylene-8-methyl dodecane, 5-methylene-7-ethyl undecane, 3-methylene-7-ethyl undecane, 2-butyl-1-decene, and 2-ethyl-1-dodecene.

Aspect 217. A composition comprising any combination of 5-methylene-6-propyl decane, 3-methylene-6-propyl decane, 5-methylene-8-methyl dodecane, 3-methylene-8-methyl dodecane, 5-methylene-7-ethyl undecane, 3-methylene-7-ethyl undecane, 2-butyl-1-decene, and 2-ethyl-1-dodecene.

Aspect 218. A composition comprising any three of 5-methylene-6-propyl decane, 3-methylene-6-propyl decane, 5-methylene-8-methyl dodecane, 3-methylene-8-methyl dodecane, 5-methylene-7-ethyl undecane, 3-methylene-7-ethyl undecane, 2-butyl-1-decene, and 2-ethyl-1-dodecene.

Aspect 219. A composition comprising any four of 5-methylene-6-propyl decane, 3-methylene-6-propyl decane, 5-methylene-8-methyl dodecane, 3-methylene-8-methyl dodecane, 5-methylene-7-ethyl undecane, 3-methylene-7-ethyl undecane, 2-butyl-1-decene, and 2-ethyl-1-dodecene.

Aspect 220. A composition comprising any five of 5-methylene-6-propyl decane, 3-methylene-6-propyl decane, 5-methylene-8-methyl dodecane, 3-methylene-8-methyl dodecane, 5-methylene-7-ethyl undecane, 3-methylene-7-ethyl undecane, 2-butyl-1-decene, and 2-ethyl-1-dodecene.

Aspect 221. A composition comprising any six of 5-methylene-6-propyl decane, 3-methylene-6-propyl decane, 5-methylene-8-methyl dodecane, 3-methylene-8-methyl dodecane, 5-methylene-7-ethyl undecane, 3-methylene-7-ethyl undecane, 2-butyl-1-decene, and 2-ethyl-1-dodecene.

Aspect 222. A composition comprising any seven of 5-methylene-6-propyl decane, 3-methylene-6-propyl decane, 5-methylene-8-methyl dodecane, 3-methylene-8-methyl dodecane, 5-methylene-7-ethyl undecane, 3-methylene-7-ethyl undecane, 2-butyl-1-decene, and 2-ethyl-1-dodecene.

Aspect 223. A composition comprising 5-methyl-6-propyldecane, 3-methyl-6-propyldecane, 5,8-dimethyldodecane, 3,8-dimethyldodecane, 5-ethyl-7-methylundecane, 7-ethyl-3-methylundecane, 5-methyltridecane, and 3-methyltridecane.

Aspect 224. A composition comprising any combination of 5-methyl-6-propyldecane, 3-methyl-6-propyldecane, 5,8-dimethyldodecane, 3,8-dimethyldodecane, 5-ethyl-7-methylundecane, 7-ethyl-3-methylundecane, 5-methyltridecane, and 3-methyltridecane.

Aspect 225. A composition comprising any three of 5-methyl-6-propyldecane, 3-methyl-6-propyldecane, 5,8-dimethyldodecane, 3,8-dimethyldodecane, 5-ethyl-7-methylundecane, 7-ethyl-3-methylundecane, 5-methyltridecane, and 3-methyltridecane.

Aspect 226. A composition comprising any four of 5-methyl-6-propyldecane, 3-methyl-6-propyldecane, 5,8-dimethyldodecane, 3,8-dimethyldodecane, 5-ethyl-7-methylundecane, 7-ethyl-3-methylundecane, 5-methyltridecane, and 3-methyltridecane.

Aspect 227. A composition comprising any five of 5-methyl-6-propyldecane, 3-methyl-6-propyldecane, 5,8-dimethyldodecane, 3,8-dimethyldodecane, 5-ethyl-7-methylundecane, 7-ethyl-3-methylundecane, 5-methyltridecane, and 3-methyltridecane.

Aspect 228. A composition comprising any six of 5-methyl-6-propyldecane, 3-methyl-6-propyldecane, 5,8-dimethyldodecane, 3,8-dimethyldodecane, 5-ethyl-7-methylundecane, 7-ethyl-3-methylundecane, 5-methyltridecane, and 3-methyltridecane.

Aspect 229. A composition comprising any seven of 5-methyl-6-propyldecane, 3-methyl-6-propyldecane, 5,8-dimethyldodecane, 3,8-dimethyldodecane, 5-ethyl-7-methylundecane, 7-ethyl-3-methylundecane, 5-methyltridecane, and 3-methyltridecane.

Aspect 230. A composition comprising 6-methylene-5-propyl dodecane, 2-butyl-5-propyl-1-nonene, 2-hexyl-5-methyl-1-nonene, 2-butyl-7-methyl-1-undecene, 6-methylene-4-ethyl tridecane, 2-butyl-6-ethyl-1-decene, 2-hexyl-1-decene, and 4-butyl-1-dodecane.

Aspect 231. A composition comprising any combination of 6-methylene-5-propyl dodecane, 2-butyl-5-propyl-1-nonene, 2-hexyl-5-methyl-1-nonene, 2-butyl-7-methyl-1-undecene, 6-methylene-4-ethyl tridecane, 2-butyl-6-ethyl-1-decene, 2-hexyl-1-decene, and 4-butyl-1-dodecane.

Aspect 232. A composition comprising any three of 6-methylene-5-propyl dodecane, 2-butyl-5-propyl-1-nonene, 2-hexyl-5-methyl-1-nonene, 2-butyl-7-methyl-1-undecene, 6-methylene-4-ethyl tridecane, 2-butyl-6-ethyl-1-decene, 2-hexyl-1-decene, and 4-butyl-1-dodecane.

Aspect 233. A composition comprising any four of 6-methylene-5-propyl dodecane, 2-butyl-5-propyl-1-nonene, 2-hexyl-5-methyl-1-nonene, 2-butyl-7-methyl-1-undecene, 6-methylene-4-ethyl tridecane, 2-butyl-6-ethyl-1-decene, 2-hexyl-1-decene, and 4-butyl-1-dodecene.

Aspect 234. A composition comprising any five of 6-methylene-5-propyl dodecane, 2-butyl-5-propyl-1-nonene, 2-hexyl-5-methyl-1-nonene, 2-butyl-7-methyl-1-undecene, 6-methylene-4-ethyl tridecane, 2-butyl-6-ethyl-1-decene, 2-hexyl-1-decene, and 4-butyl-1-dodecene.

Aspect 235. A composition comprising any six of 6-methylene-5-propyl dodecane, 2-butyl-5-propyl-1-nonene, 2-hexyl-5-methyl-1-nonene, 2-butyl-7-methyl-1-undecene, 6-methylene-4-ethyl tridecane, 2-butyl-6-ethyl-1-decene, 2-hexyl-1-decene, and 4-butyl-1-dodecene.

Aspect 236. A composition comprising any seven of 6-methylene-5-propyl dodecane, 2-butyl-5-propyl-1-nonene, 2-hexyl-5-methyl-1-nonene, 2-butyl-7-methyl-1-undecene, 6-methylene-4-ethyl tridecane, 2-butyl-6-ethyl-1-decene, 2-hexyl-1-decene, and 4-butyl-1-dodecene.

Aspect 237. A composition comprising 6-methyl-5-propyldodecane, 5-methyl-8-propyldodecane, 5,8-dimethyltetradecane, 5,10-dimethyltetradecane, 5-ethyl-7-methyltridecane, 5-ethyl-9-methyltridecane, 7-methylpentadecane, and pentadecane.

Aspect 238. A composition comprising any combination of 6-methyl-5-propyldodecane, 5-methyl-8-propyldodecane, 5,8-dimethyltetradecane, 5,10-dimethyltetradecane, 5-ethyl-7-methyltridecane, 5-ethyl-9-methyltridecane, 7-methylpentadecane, and pentadecane.

Aspect 239. A composition comprising any three of 6-methyl-5-propyldodecane, 5-methyl-8-propyldodecane, 5,8-dimethyltetradecane, 5,10-dimethyltetradecane, 5-ethyl-7-methyltridecane, 5-ethyl-9-methyltridecane, 7-methylpentadecane, and pentadecane.

Aspect 240. A composition comprising any four of 6-methyl-5-propyldodecane, 5-methyl-8-propyldodecane, 5,8-dimethyltetradecane, 5,10-dimethyltetradecane, 5-ethyl-7-methyltridecane, 5-ethyl-9-methyltridecane, 7-methylpentadecane, and pentadecane.

Aspect 241. A composition comprising any five of 6-methyl-5-propyldodecane, 5-methyl-8-propyldodecane, 5,8-dimethyltetradecane, 5,10-dimethyltetradecane, 5-ethyl-7-methyltridecane, 5-ethyl-9-methyltridecane, 7-methylpentadecane, and pentadecane.

Aspect 242. A composition comprising any six of 6-methyl-5-propyldodecane, 5-methyl-8-propyldodecane, 5,8-dimethyltetradecane, 5,10-dimethyltetradecane, 5-ethyl-7-methyltridecane, 5-ethyl-9-methyltridecane, 7-methylpentadecane, and pentadecane.

Aspect 243. A composition comprising any seven of 6-methyl-5-propyldodecane, 5-methyl-8-propyldodecane, 5,8-dimethyltetradecane, 5,10-dimethyltetradecane, 5-ethyl-7-methyltridecane, 5-ethyl-9-methyltridecane, 7-methylpentadecane, and pentadecane.

Aspect 244. A composition comprising 4-propyl-2-octene, 5-ethyl-2-nonene, 6-methyl-2-decene, 2-undecene, 2-hexene, 2-heptene, and 2-octene.

Aspect 245. A composition comprising any combination of 4-propyl-2-octene, 5-ethyl-2-nonene, 6-methyl-2-decene, 2-undecene, 2-hexene, 2-heptene, and 2-octene.

Aspect 246. A composition comprising any three of 4-propyl-2-octene, 5-ethyl-2-nonene, 6-methyl-2-decene, 2-undecene, 2-hexene, 2-heptene, and 2-octene.

Aspect 247. A composition comprising any four of 4-propyl-2-octene, 5-ethyl-2-nonene, 6-methyl-2-decene, 2-undecene, 2-hexene, 2-heptene, and 2-octene.

Aspect 248. A composition comprising any five of 4-propyl-2-octene, 5-ethyl-2-nonene, 6-methyl-2-decene, 2-undecene, 2-hexene, 2-heptene, and 2-octene.

Aspect 249. A composition comprising any six of 4-propyl-2-octene, 5-ethyl-2-nonene, 6-methyl-2-decene, 2-undecene, 2-hexene, 2-heptene, and 2-octene.

Aspect 250. A composition comprising 4-propyloctane, 5-ethylnonane, 5-methyldecane, undecane, n-hexane, n-heptane, and n-octane.

Aspect 251. A composition comprising any combination of 4-propyloctane, 5-ethylnonane, 5-methyldecane, undecane, n-hexane, n-heptane, and n-octane.

Aspect 252. A composition comprising any three of 4-propyloctane, 5-ethylnonane, 5-methyldecane, undecane, n-hexane, n-heptane, and n-octane.

Aspect 253. A composition comprising any four of 4-propyloctane, 5-ethylnonane, 5-methyldecane, undecane, n-hexane, n-heptane, and n-octane.

Aspect 254. A composition comprising any five of 4-propyloctane, 5-ethylnonane, 5-methyldecane, undecane, n-hexane, n-heptane, and n-octane.

Aspect 255. A composition comprising any six of 4-propyloctane, 5-ethylnonane, 5-methyldecane, undecane, n-hexane, n-heptane, and n-octane.

Aspect 256. A composition comprising 5-propyl-3-nonene, 6-ethyl-3-decene, 7-methyl-3-undecene, 3-dodecene, 3-heptene, 3-octene, and 3-nonene.

Aspect 257. A composition comprising any combination of 5-propyl-3-nonene, 6-ethyl-3-decene, 7-methyl-3-undecene, 3-dodecene, 3-heptene, 3-octene, and 3-nonene.

Aspect 258. A composition comprising any three of 5-propyl-3-nonene, 6-ethyl-3-decene, 7-methyl-3-undecene, 3-dodecene, 3-heptene, 3-octene, and 3-nonene.

Aspect 259. A composition comprising any four of 5-propyl-3-nonene, 6-ethyl-3-decene, 7-methyl-3-undecene, 3-dodecene, 3-heptene, 3-octene, and 3-nonene.

Aspect 260. A composition comprising any five of 5-propyl-3-nonene, 6-ethyl-3-decene, 7-methyl-3-undecene, 3-dodecene, 3-heptene, 3-octene, and 3-nonene.

Aspect 261. A composition comprising any six of 5-propyl-3-nonene, 6-ethyl-3-decene, 7-methyl-3-undecene, 3-dodecene, 3-heptene, 3-octene, and 3-nonene.

Aspect 262. A composition comprising 5-propylnonane, 5-ethyldecane, 5-methylundecane, dodecane, heptane, octane, and nonane.

Aspect 263. A composition comprising any combination of 5-propylnonane, 5-ethyldecane, 5-methylundecane, dodecane, heptane, octane, and nonane.

Aspect 264. A composition comprising any three of 5-propylnonane, 5-ethyldecane, 5-methylundecane, dodecane, heptane, octane, and nonane.

Aspect 265. A composition comprising any four of 5-propylnonane, 5-ethyldecane, 5-methylundecane, dodecane, heptane, octane, and nonane.

Aspect 266. A composition comprising any five of 5-propylnonane, 5-ethyldecane, 5-methylundecane, dodecane, heptane, octane, and nonane.

Aspect 267. A composition comprising any six of 5-propylnonane, 5-ethyldecane, 5-methylundecane, dodecane, heptane, octane, and nonane.

Aspect 268. A composition comprising 2-methyl-4-propyl-2-octene, 5-ethyl-2-methyl-2-nonene, 2,6-dimethyl-2-decene, 2-methyl-2-undecene, 2-methyl-2-hexene, 2-methyl-2-heptene, and 2-methyl-2-octene.

Aspect 269. A composition comprising any combination of 2-methyl-4-propyl-2-octene, 5-ethyl-2-methyl-2-nonene, 2,6-dimethyl-2-decene, 2-methyl-2-undecene, 2-methyl-2-hexene, 2-methyl-2-heptene, and 2-methyl-2-octene.

Aspect 270. A composition comprising any three of 2-methyl-4-propyl-2-octene, 5-ethyl-2-methyl-2-nonene, 2,6-dimethyl-2-decene, 2-methyl-2-undecene, 2-methyl-2-hexene, 2-methyl-2-heptene, and 2-methyl-2-octene.

Aspect 271. A composition comprising any four of 2-methyl-4-propyl-2-octene, 5-ethyl-2-methyl-2-nonene, 2,6-dimethyl-2-decene, 2-methyl-2-undecene, 2-methyl-2-hexene, 2-methyl-2-heptene, and 2-methyl-2-octene.

Aspect 272. A composition comprising any five of 2-methyl-4-propyl-2-octene, 5-ethyl-2-methyl-2-nonene, 2,6-dimethyl-2-decene, 2-methyl-2-undecene, 2-methyl-2-hexene, 2-methyl-2-heptene, and 2-methyl-2-octene.

Aspect 273. A composition comprising any six of 2-methyl-4-propyl-2-octene, 5-ethyl-2-methyl-2-nonene, 2,6-dimethyl-2-decene, 2-methyl-2-undecene, 2-methyl-2-hexene, 2-methyl-2-heptene, and 2-methyl-2-octene.

Aspect 274. A composition comprising 2-methyl-4-propyloctane, 5-ethyl-2-methylnonane, 2,6-dimethyldecane, 2-methylundecane, 2-methylhexane, 2-methylheptane, and 2-methyloctane.

Aspect 275. A composition comprising any combination of 2-methyl-4-propyloctane, 5-ethyl-2-methylnonane, 2,6-dimethyldecane, 2-methylundecane, 2-methylhexane, 2-methylheptane, and 2-methyloctane.

Aspect 276. A composition comprising any three of 2-methyl-4-propyloctane, 5-ethyl-2-methylnonane, 2,6-dimethyldecane, 2-methylundecane, 2-methylhexane, 2-methylheptane, and 2-methyloctane.

Aspect 277. A composition comprising any four of 2-methyl-4-propyloctane, 5-ethyl-2-methylnonane, 2,6-dimethyldecane, 2-methylundecane, 2-methylhexane, 2-methylheptane, and 2-methyloctane.

Aspect 278. A composition comprising any five of 2-methyl-4-propyloctane, 5-ethyl-2-methylnonane, 2,6-dimethyldecane, 2-methylundecane, 2-methylhexane, 2-methylheptane, and 2-methyloctane.

Aspect 279. A composition comprising any six of 2-methyl-4-propyloctane, 5-ethyl-2-methylnonane, 2,6-dimethyldecane, 2-methylundecane, 2-methylhexane, 2-methylheptane, and 2-methyloctane.

Aspect 280. A composition comprising 6-propyl-4-decene, 7-ethyl-4-undecene, 8-methyl-4-dodecene, 4-tridecene, 4-octene, 4-nonene, and 4-decene.

Aspect 281. A composition comprising any combination of 6-propyl-4-decene, 7-ethyl-4-undecene, 8-methyl-4-dodecene, 4-tridecene, 4-octene, 4-nonene, and 4-decene.

Aspect 282. A composition comprising any three of 6-propyl-4-decene, 7-ethyl-4-undecene, 8-methyl-4-dodecene, 4-tridecene, 4-octene, 4-nonene, and 4-decene.

Aspect 283. A composition comprising any four of 6-propyl-4-decene, 7-ethyl-4-undecene, 8-methyl-4-dodecene, 4-tridecene, 4-octene, 4-nonene, and 4-decene.

Aspect 284. A composition comprising any five of 6-propyl-4-decene, 7-ethyl-4-undecene, 8-methyl-4-dodecene, 4-tridecene, 4-octene, 4-nonene, and 4-decene.

Aspect 285. A composition comprising any six of 6-propyl-4-decene, 7-ethyl-4-undecene, 8-methyl-4-dodecene, 4-tridecene, 4-octene, 4-nonene, and 4-decene.

Aspect 286. A composition comprising 5-propyldecane, 5-ethylundecane, 5-methyldodecane, tridecane, octane, nonane, and decane.

Aspect 287. A composition comprising any combination of 5-propyldecane, 5-ethylundecane, 5-methyldodecane, tridecane, octane, nonane, and decane.

Aspect 288. A composition comprising any three of 5-propyldecane, 5-ethylundecane, 5-methyldodecane, tridecane, octane, nonane, and decane.

Aspect 289. A composition comprising any four of 5-propyldecane, 5-ethylundecane, 5-methyldodecane, tridecane, octane, nonane, and decane.

Aspect 290. A composition comprising any five of 5-propyldecane, 5-ethylundecane, 5-methyldodecane, tridecane, octane, nonane, and decane.

Aspect 291. A composition comprising any six of 5-propyldecane, 5-ethylundecane, 5-methyldodecane, tridecane, octane, nonane, and decane.

Aspect 292. A composition comprising 7-propyl-5-undecene, 8-ethyl-5-dodecene, 9-methyl-5-tridecene, 5-tetradecene, 4-nonene, 5-decene, and 5-undecene.

Aspect 293. A composition comprising any combination of 7-propyl-5-undecene, 8-ethyl-5-dodecene, 9-methyl-5-tridecene, 5-tetradecene, 4-nonene, 5-decene, and 5-undecene.

Aspect 294. A composition comprising any three of 7-propyl-5-undecene, 8-ethyl-5-dodecene, 9-methyl-5-tridecene, 5-tetradecene, 4-nonene, 5-decene, and 5-undecene.

Aspect 295. A composition comprising any four of 7-propyl-5-undecene, 8-ethyl-5-dodecene, 9-methyl-5-tridecene, 5-tetradecene, 4-nonene, 5-decene, and 5-undecene.

Aspect 296. A composition comprising any five of 7-propyl-5-undecene, 8-ethyl-5-dodecene, 9-methyl-5-tridecene, 5-tetradecene, 4-nonene, 5-decene, and 5-undecene.

Aspect 297. A composition comprising any six of 7-propyl-5-undecene, 8-ethyl-5-dodecene, 9-methyl-5-tridecene, 5-tetradecene, 4-nonene, 5-decene, and 5-undecene.

Aspect 298. A composition comprising 5-propylundecane, 5-ethyldodecane, 5-methyltridecane, tetradecane, nonane, decane, and undecane.

Aspect 299. A composition comprising any combination of 5-propylundecane, 5-ethyldodecane, 5-methyltridecane, tetradecane, nonane, decane, and undecane.

Aspect 300. A composition comprising any three of 5-propylundecane, 5-ethyldodecane, 5-methyltridecane, tetradecane, nonane, decane, and undecane.

Aspect 301. A composition comprising any four of 5-propylundecane, 5-ethyldodecane, 5-methyltridecane, tetradecane, nonane, decane, and undecane.

Aspect 302. A composition comprising any five of 5-propylundecane, 5-ethyldodecane, 5-methyltridecane, tetradecane, nonane, decane, and undecane.

Aspect 303. A composition comprising any six of 5-propylundecane, 5-ethyldodecane, 5-methyltridecane, tetradecane, nonane, decane, and undecane.

Aspect 304. A composition comprising 2,2-dimethyl-5-propyl-3-nonene, 6-ethyl-2,2-dimethyl-3-decene, 2,2,7-trimethyl-3-undecene, 2,2-dimethyl-3-dodecene, 2,2-dimethyl-3-heptene, 2,2-dimethyl-3-octene, and 2,2-dimethyl-3-nonene.

Aspect 305. A composition comprising any combination of 2,2-dimethyl-5-propyl-3-nonene, 6-ethyl-2,2-dimethyl-3-decene, 2,2,7-trimethyl-3-undecene, 2,2-dimethyl-3-dodecene, 2,2-dimethyl-3-heptene, 2,2-dimethyl-3-octene, and 2,2-dimethyl-3-nonene.

Aspect 306. A composition comprising any three of 2,2-dimethyl-5-propyl-3-nonene, 6-ethyl-2,2-dimethyl-3-decene, 2,2,7-trimethyl-3-undecene, 2,2-dimethyl-3-dodecene, 2,2-dimethyl-3-heptene, 2,2-dimethyl-3-octene, and 2,2-dimethyl-3-nonene.

Aspect 307. A composition comprising any four of 2,2-dimethyl-5-propyl-3-nonene, 6-ethyl-2,2-dimethyl-3-decene, 2,2,7-trimethyl-3-undecene, 2,2-dimethyl-3-dodecene, 2,2-dimethyl-3-heptene, 2,2-dimethyl-3-octene, and 2,2-dimethyl-3-nonene.

Aspect 308. A composition comprising any five of 2,2-dimethyl-5-propyl-3-nonene, 6-ethyl-2,2-dimethyl-3-decene, 2,2,7-trimethyl-3-undecene, 2,2-dimethyl-3-dodecene, 2,2-dimethyl-3-heptene, 2,2-dimethyl-3-octene, and 2,2-dimethyl-3-nonene.

Aspect 309. A composition comprising any six of 2,2-dimethyl-5-propyl-3-nonene, 6-ethyl-2,2-dimethyl-3-decene, 2,2,7-trimethyl-3-undecene, 2,2-dimethyl-3-dodecene, 2,2-dimethyl-3-heptene, 2,2-dimethyl-3-octene, and 2,2-dimethyl-3-nonene.

Aspect 310. A composition comprising 2,2-dimethyl-5-propylnonane, 6-ethyl-2,2-dimethyldecane, 2,2,7-trimethylundecane, 2,2-dimethyldodecane, 2,2-dimethylheptane, 2,2-dimethyloctane, and 2,2-dimethylnonane.

Aspect 311. A composition comprising any combination of 2,2-dimethyl-5-propylnonane, 6-ethyl-2,2-dimethyldecane, 2,2,7-trimethylundecane, 2,2-dimethyldodecane, 2,2-dimethylheptane, 2,2-dimethyloctane, and 2,2-dimethylnonane.

Aspect 312. A composition comprising any three of 2,2-dimethyl-5-propylnonane, 6-ethyl-2,2-dimethyldecane, 2,2,7-trimethylundecane, 2,2-dimethyldodecane, 2,2-dimethylheptane, 2,2-dimethyloctane, and 2,2-dimethylnonane.

Aspect 313. A composition comprising any four of 2,2-dimethyl-5-propylnonane, 6-ethyl-2,2-dimethyldecane, 2,2,7-trimethylundecane, 2,2-dimethyldodecane, 2,2-dimethylheptane, 2,2-dimethyloctane, and 2,2-dimethylnonane.

Aspect 314. A composition comprising any five of 2,2-dimethyl-5-propylnonane, 6-ethyl-2,2-dimethyldecane, 2,2,7-trimethylundecane, 2,2-dimethyldodecane, 2,2-dimethylheptane, 2,2-dimethyloctane, and 2,2-dimethylnonane.

Aspect 315. A composition comprising any six of 2,2-dimethyl-5-propylnonane, 6-ethyl-2,2-dimethyldecane, 2,2,7-trimethylundecane, 2,2-dimethyldodecane, 2,2-dimethylheptane, 2,2-dimethyloctane, and 2,2-dimethylnonane.

Aspect 316. A composition comprising 5-propyl-6-tridecene, 5-ethyl-7-tetradecene, 11-methyl-7-pentadecene, 7-hexadecene, 4-undecene, 5-dodecene, and 6-tridecene.

Aspect 317. A composition comprising any combination of 5-propyl-6-tridecene, 5-ethyl-7-tetradecene, 11-methyl-7-pentadecene, 7-hexadecene, 4-undecene, 5-dodecene, and 6-tridecene.

Aspect 318. A composition comprising any three of 5-propyl-6-tridecene, 5-ethyl-7-tetradecene, 11-methyl-7-pentadecene, 7-hexadecene, 4-undecene, 5-dodecene, and 6-tridecene.

Aspect 319. A composition comprising any four of 5-propyl-6-tridecene, 5-ethyl-7-tetradecene, 11-methyl-7-pentadecene, 7-hexadecene, 4-undecene, 5-dodecene, and 6-tridecene.

Aspect 320. A composition comprising any five of 5-propyl-6-tridecene, 5-ethyl-7-tetradecene, 11-methyl-7-pentadecene, 7-hexadecene, 4-undecene, 5-dodecene, and 6-tridecene.

Aspect 321. A composition comprising any six of 5-propyl-6-tridecene, 5-ethyl-7-tetradecene, 11-methyl-7-pentadecene, 7-hexadecene, 4-undecene, 5-dodecene, and 6-tridecene.

Aspect 322. A composition comprising 5-propyltridecane, 5-ethyltetradecane, 5-methylpentadecane, hexadecane, undecane, dodecane, and tridecane.

Aspect 323. A composition comprising any combination of 5-propyltridecane, 5-ethyltetradecane, 5-methylpentadecane, hexadecane, undecane, dodecane, and tridecane.

Aspect 324. A composition comprising any three of 5-propyltridecane, 5-ethyltetradecane, 5-methylpentadecane, hexadecane, undecane, dodecane, and tridecane.

Aspect 325. A composition comprising any four of 5-propyltridecane, 5-ethyltetradecane, 5-methylpentadecane, hexadecane, undecane, dodecane, and tridecane.

Aspect 326. A composition comprising any five of 5-propyltridecane, 5-ethyltetradecane, 5-methylpentadecane, hexadecane, undecane, dodecane, and tridecane.

Aspect 327. A composition comprising any six of 5-propyltridecane, 5-ethyltetradecane, 5-methylpentadecane, hexadecane, undecane, dodecane, and tridecane.

Aspect 328. A sustainable aviation fuel comprising the composition according to any preceding composition Aspect.

Aspect 329. A sustainable aviation fuel comprising the composition according to any preceding composition Aspect, wherein at least a portion of the composition is derived from oligomerization of a bio-ethylene feed.

Aspect 330. The sustainable aviation fuel according to any of Aspects 328-329, further comprising at least one $C_{16-}$ n-alkane, at least one $C_{16-}$ iso-alkane, at least one $C_{16-}$ cycloalkane, at least one $C_{16-}$ olefin, at least one $C_{12-}$ aromatic compound, or any combinations thereof.

Aspect 331. The sustainable aviation fuel according to Aspect 330, wherein all or a portion of the $C_{16-}$ n-alkane, the $C_{16-}$ iso-alkane, the $C_{16-}$ cycloalkane, the $C_{16-}$ olefin, the $C_{12-}$ aromatic compound, or the combinations thereof is derived from oligomerization of a bio-ethylene feed.

Aspect 332. The sustainable aviation fuel according to Aspect 330, wherein the $C_{16-}$ n-alkane, the $C_{16-}$ iso-alkane, the $C_{16-}$ cycloalkane, the $C_{16-}$ olefin, the $C_{12-}$ aromatic compound, or the combinations thereof is not derived from oligomerization of a bio-ethylene feed.

Aspect 333. The sustainable aviation fuel according to any of Aspects 328-332, further comprising an antioxidant, a metal deactivator, a fuel system icing inhibitor, a corrosion inhibitor, a static dissipater additive, or any combination thereof.

Aspect 334. The sustainable aviation fuel according to any of Aspects 328-333, wherein the sustainable aviation fuel is certified as compliant with the Carbon Offsetting and Reduction Scheme for International Aviation (CORSIA) sustainability criteria in accordance with the International Sustainability and Carbon Certification (ISCC) CORSIA certification system.

Aspect 335. The sustainable aviation fuel according to any of Aspects 328-334, wherein the sustainable aviation fuel is certified as a Lower Carbon Aviation Fuel (LCAF) in accordance with the International Sustainability and Carbon Certification (ISCC) LCAF certification system.

Aspect 336. The process for making a sustainable aviation fuel according to any of Aspects 328-335, wherein the sustainable aviation fuel is certified based upon the weight or fraction of the sustainable aviation fuel attributable to the biomass ethanol determined by mass balance and the free attribution method.

What is claimed is:

1. A process for making a sustainable aviation fuel, the process comprising:
   (a) providing a bio-ethylene feed, at least a portion of which is derived from dehydration of biomass ethanol;
   (b) contacting the bio-ethylene feed with a first catalyst system comprising a first oligomerization catalyst to form an oligomerization product comprising at least one $C_4$-$C_8$ alpha-olefin and a mixture of decenes;
   (c) separating the mixture of decenes from the oligomerization product;
   (d) (i) contacting the mixture of decenes with at least one $C_{6-}$ alpha-olefin in the presence of a second catalyst system comprising a second oligomerization catalyst, or (ii) contacting the mixture of decenes with at least one $C_{8-}$ alpha-olefin in the presence of a second catalyst system comprising a metathesis catalyst, to provide a $C_{16-}$ olefin stream;

(e) hydrogenating the $C_{16-}$ olefin stream in the presence of a first hydrogenation catalyst to provide $C_{16-}$ paraffins; and (f) using the $C_{16-}$ paraffins as a component to form a sustainable aviation fuel.

2. The process for making a sustainable aviation fuel according to claim 1, wherein the at least one $C_{6-}$ alpha-olefin comprises ethylene, propylene, 1-butene, 1-pentene, 1-hexene, or a combination thereof.

3. The process for making a sustainable aviation fuel according to claim 1, wherein the at least one $C_{8-}$ alpha-olefin comprises propylene, 1-butene, 2-butene, isobutylene, 1-pentene, 1-hexene, 3,3-dimethyl-1-butene, 1-octene, or a combination thereof.

4. The process for making a sustainable aviation fuel according to claim 1, wherein the oligomerization product comprises 1-butene, 1-hexene, 1-octene, dodecenes, tetradecenes, or any combination thereof.

5. The process for making a sustainable aviation fuel according to claim 1, wherein:
(a) the sustainable aviation fuel is certified as compliant with the Carbon Offsetting and Reduction Scheme for International Aviation (CORSIA) sustainability criteria in accordance with the International Sustainability and Carbon Certification (ISCC) CORSIA certification system; or
(b) the sustainable aviation fuel is certified as a Lower Carbon Aviation Fuel (LCAF) in accordance with the International Sustainability and Carbon Certification (ISCC) LCAF certification system;
wherein the certification is based upon the weight or fraction of the sustainable aviation fuel attributable to the biomass ethanol determined by mass balance and a free attribution method.

6. The process for making a sustainable aviation fuel according to claim 1, wherein the oligomerization product comprises:
at least 60 mol % 1-hexene, at least 60 mol % 1-octene, or at least 60 mol % 1-hexene and 1-octene combined; or
from 70 wt. % to 99.8 wt. % hexene or from 70 wt. % to 99.8 wt. % octene, and at least 0.2 wt. % of the mixture of decenes.

7. The process for making a sustainable aviation fuel according to claim 1, wherein the mixture of decenes comprises 1-decene, 2-butyl-1-hexene, 3-propyl-1-heptene, 4-ethyl-1-octene, 5-methyl-1-nonene, 4-decene, 5-decene, or any combination thereof.

8. The process for making a sustainable aviation fuel according to claim 1, wherein the mixture of decenes comprises from 76 mol % to 95 mol % $C_{10}$ monoolefins.

9. The process for making a sustainable aviation fuel according to claim 1, wherein the first catalyst system, the second catalyst system, or both comprise independently a chromium-based catalyst, a metallocene-based catalyst, a Ziegler-Natta based catalyst, a metal-oxide supported Group 6-10 transition metal-based catalyst, or a combination thereof.

10. The process for making a sustainable aviation fuel according to claim 9, wherein the first catalyst system, the second catalyst system, or both further comprise a metal alkyl compound selected from an organoaluminum compound, an organoaluminoxane, an organoboron compound, an organozinc compound, an organomagnesium compound, an organolithium compound, or any combination thereof.

11. The process for making a sustainable aviation fuel according to claim 1, wherein the first catalyst system, the second catalyst system, or both comprise independently a chromium-based catalyst, and the chromium-based catalyst comprises (a) a chromium-containing compound, (b) a heteroatomic ligand, (c) a metal alkyl compound, and (d) optionally, a diluent.

12. The process for making a sustainable aviation fuel according to claim 11, wherein the heteroatomic ligand is selected from a pyrrole compound, a diphosphino aminyl compound, an $N^2$-phosphinyl amidine compound, an $N^2$-phosphinyl formamidine compound, or combinations thereof.

13. The process for making a sustainable aviation fuel according to claim 11, wherein the heteroatomic ligand is selected from a pyrrole compound having the Formula P1 or Formula I1:

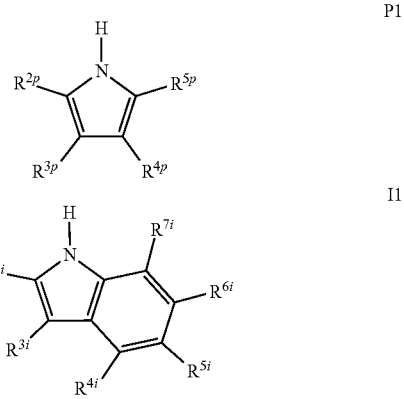

wherein $R^{2p}$, $R^{3p}$, $R^{4p}$, and $R^{5p}$ of Formula P1 and $R^{2i}$, $R^{3i}$, $R^{4i}$, $R^{5i}$, $R^{6i}$, and $R^{7i}$ of Formula I1 are selected independently from a $C_1$ to $C_{18}$ organyl group, a $C_1$ to $C_{18}$ hydrocarbyl group, or a $C_3$ to $C_{60}$ silyl group.

14. The process for making a sustainable aviation fuel according to claim 11, wherein the heteroatomic ligand is a diphosphino aminyl moiety having Structure PNP2:

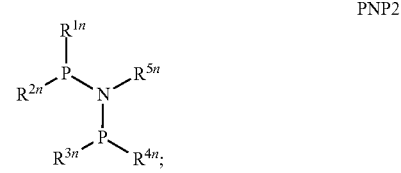

wherein the $R^{1n}$, $R^{2n}$, $R^{3n}$, $R^{4n}$, and $R^{5n}$ independently are: a $C_1$ to $C_{30}$ organyl group; a $C_1$ to $C_{30}$ organyl group comprising inert functional groups; a $C_1$ to $C_{30}$ hydrocarbyl group; a $C_1$ to $C_{30}$ alkyl group; a $C_6$ to $C_{30}$ aromatic group; a phenyl group or a $C_6$ to $C_{30}$ substituted phenyl group; or a substituted or an unsubstituted $C_1$ to $C_{20}$ alkyl group.

15. The process for making a sustainable aviation fuel according to claim 14, wherein any substituent of a substituted group is selected from a halide, a $C_1$ to $C_{10}$ hydrocarbyl group, or a $C_1$ to $C_{10}$ hydrocarboxy group.

16. The process for making a sustainable aviation fuel according to claim 11, wherein the heteroatomic ligand is selected from an $N^2$-phosphinyl formamidine compound having Structure NPF1, or an $N^2$-phosphinyl formamidine compound having Structure NPA1:

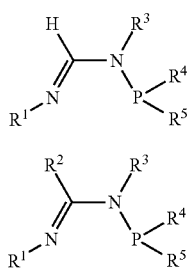

Structure NPF1

Structure NPA1 wherein $R^1$, $R^2$, $R^3$, $R^4$, and $R^5$ are independently a $C_1$ to $C_{30}$ organyl group, a $C_1$ to $C_{30}$ organyl group consisting essentially of inert functional groups, or a $C_1$ to $C_{30}$ hydrocarbyl group.

17. The process for making a sustainable aviation fuel according to claim 11, wherein the diluent comprises a hydrocarbon, a halogenated hydrocarbon, or combinations thereof.

18. The process for making a sustainable aviation fuel according to claim 1, wherein the first catalyst system, the second catalyst system, or both comprise independently:
(a) a chromium-containing compound, a pyrrole compound, an organoaluminum compound, and optionally a halide containing compound;
(b) a chromium-containing compound, a diphosphino aminyl compound, and an organoaluminum compound;
(c) a chromium-containing compound complexed to a diphosphino aminyl compound, and an organoaluminum compound;
(d) a chromium-containing compound, an $N^2$-phosphinyl amidine compound, and an organoaluminum compound;
(e) a chromium-containing compound complexed to an $N^2$-phosphinyl amidine compound, and an organoaluminum compound;
(f) a chromium-containing compound, an $N^2$-phosphinyl formamidine compound, and an organoaluminum compound;
(g) a chromium-containing compound complexed to an $N^2$-phosphinyl formamidine compound, and an organoaluminum compound; or
(h) any combinations thereof.

19. The process for making a sustainable aviation fuel according to claim 18, wherein the chromium-containing compound complexed to an $N^2$-phosphinyl formamidine compound and the chromium-containing compound complexed to an $N^2$-phosphinyl amidine compound have the following structures:

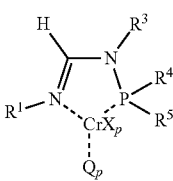

Structure NPFCr1

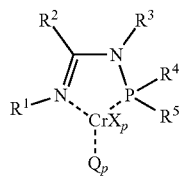

Structure NPACr1 wherein X is an anionic ligand, p is from 2 to 6, Q is a neutral ligand, and q is from 0 to 6; and
wherein $R^1$, $R^2$, $R^3$, $R^4$, and $R^5$ are independently a $C_1$ to $C_{30}$ organyl group, a $C_1$ to $C_{30}$ organyl group consisting essentially of inert functional groups, or a $C_1$ to $C_{30}$ hydrocarbyl group.

20. The process for making a sustainable aviation fuel according to claim 18, wherein the chromium-containing compound is selected from chromium(II) nitrate, chromium (II) sulfate, chromium(II) fluoride, chromium(II) chloride, chromium(II) bromide, chromium(II) iodide, chromium(III) nitrate, chromium(III) sulfate, chromium(III) fluoride, chromium(III) chloride, chromium(III) bromide, chromium(III) iodide, a chromium(II) carboxylate, a chromium(II) alkoxide, chromium(II) aryloxide, a chromium(II) beta-dionate, a chromium(III) carboxylate, a chromium(III) alkoxide, chromium(III) aryloxide, or a chromium(III) beta-dionate.

21. The process for making a sustainable aviation fuel according to claim 1, wherein the first catalyst system, the second catalyst system, or both independently comprise a chromium carboxylate, wherein each carboxylate group of the chromium carboxylate is independently selected from acetate, propionate, n-butyrate, isobutyrate, valerate (n-pentanoate), neo-pentanoate, capronate (n-hexanoate), n-heptanoate, caprylate (n-octanoate), 2-ethylhexanoate, n-nonanoate, caprate (n-decanoate), n-undecanoate, laurate (n-dodecanoate), or stearate (n-octadecanoate).

22. The process for making a sustainable aviation fuel according to claim 1, wherein the first catalyst system, the second catalyst system, or both independently comprise a chromium carboxylate selected from chromium(II) acetate, chromium(II) propionate, chromium(II) butyrate, chromium (II) isobutyrate, chromium(II) neopentanoate, chromium(II) oxalate, chromium(II) octanoate, chromium(II) 2-ethylhexanoate, chromium(II) laurate, chromium(II) stearate, chromium(III) acetate, chromium(III) propionate, chromium(III) butyrate, chromium(III) isobutyrate, chromium(III) neopentanoate, chromium(III) oxalate, chromium(III) octanoate, chromium(III) 2-ethylhexanoate, chromium(III) 2,2,6,6,-tetramethylheptanedionate, chromium(III) naphthenate, chromium(III) laurate, or chromium(III) stearate.

23. The process for making a sustainable aviation fuel according to claim 1, wherein the first catalyst system, the second catalyst system, or both independently comprise an organoaluminum compound selected from a triorganoaluminum compound, a diorganoaluminum halide, an organoaluminum dihalide, a diorganoaluminum alkoxide, an organoaluminum dialkoxide, an aluminoxane, or combinations thereof.

24. The process for making a sustainable aviation fuel according to claim 1, wherein the first catalyst system, the second catalyst system, or both independently comprise:
(a) molybdenum oxide on alumina ($MoO_3/Al_2O_3$), tungsten oxide on silica ($WO_3/SiO_2$), tungsten oxide on silica-alumina ($WO_3/SiO_2/Al_2O_3$), rhenium oxide on alumina ($Re_2O_7/Al_2O_3$), cobalt oxide and molybdenum oxide on alumina ($CoO/MoO_3/Al_2O_3$), rhenium oxide on alumina activated with tetramethyl tin (Re$_2$O$_7$/Al$_2$O$_3$/SnMe$_4$), or any combination thereof; or (b) tungstated zirconium, molybdenum zirconium, nickel and/or cobalt doped tungstated zirconium, nickel and/or cobalt doped molybdenum zirconium catalysts, a Group 3 to Group 12 metal-treated zeolite, or combinations thereof.

25. The process for making a sustainable aviation fuel according to claim 1, wherein the dehydration of the biomass ethanol comprises contacting the biomass ethanol with a dehydration catalyst under conditions suitable to form bio-ethylene, and wherein the dehydration catalyst comprises:

(a) alumina, silica gel, silica-alumina, a crystalline silicate, a dealuminated crystalline silicate, a phosphorus-modified crystalline silicate, a zeolite, a molecular sieve, or anhydrous calcium sulfate; or (b) a lanthanum-modified H-ZSM-catalyst, a ZSM-5/SAPO-34 composite, a mordenite catalyst, microspherical SAPO-34 catalyst, a phosphorus-modified HZSM-5 catalyst, a lanthanum-phosphorous modified HZSM-5 catalyst, a gallium-modified zeolite, a gallium-modified SAPO-11, a gallium-modified HZSM-5, a ZSM-based catalyst, a heteropolyacid catalyst, or a supported heteropolyacid catalyst.

26. The process for making a sustainable aviation fuel according to claim 1, wherein the first hydrogenation catalyst comprises:

(a) a heterogeneous catalyst selected from a Group 8-12 metal deposited on a carrier selected from carbon, silica, alumina, silica-alumina, a zeolite, or calcium carbonate; or (b) a homogeneous catalyst selected from (i) a Ziegler catalyst comprising an organic salt of a Group 6-10 metal and an organoaluminum compound, or (ii) a coordination compound of Ru, Rh, or Ir, or (iii) a Group 4 metal organometallic compound.

27. The process for making a sustainable aviation fuel according to claim 26, wherein (a) the Group 8-12 metal is selected from Fe, Co, Ni, Cu, Zn, Ru, Rh, Pd, Ir, or Pt; (b) the Group 6-10 metal is selected from Ni, Co, Fe, or Cr; and (c) the Group 4 metal organometallic compound is selected from a Group 4 metallocene compound.

28. The process for making a sustainable aviation fuel according to claim 1, wherein contacting the bio-ethylene feed with the first catalyst system occurs at a temperature within a range of from 0° C. to 180° C.

29. The process for making a sustainable aviation fuel according to claim 1, wherein the C$_{16-}$ olefin stream comprises:

2-ethyl-3-propyl-1-heptene, 5-propyl-1-nonene, 2-ethyl-5-methyl-1-nonene, 7-methyl-1-undecene, 2-ethyl-4-ethyl-1-octene, 6-ethyl-1-decene, 2-ethyl-1-decene, and 1-dodecene;

4-methylene-5-propylnonane, 2-methyl-5-propylnon-1-ene, 7-methyl-4-methyleneundecane, 2,7-dimethylundec-1-ene, 6-ethyl-4-methylenedecane, 6-ethyl-2-methyldec-1-ene, 4-methylenedodecane, and 2-methyldodec-1-ene;

5-methylene-6-propyl decane, 3-methylene-6-propyl decane, 5-methylene-8-methyl dodecane, 3-methylene-8-methyl dodecane, 5-methylene-7-ethyl undecane, 3-methylene-7-ethyl undecane, 2-butyl-1-decene, and 2-ethyl-1-dodecene; or 6-methylene-5-propyl dodecane, 2-butyl-5-propyl-1-nonene, 2-hexyl-5-methyl-1-nonene, 2-butyl-7-methyl-1-undecene, 6-methylene-4-ethyl tridecane, 2-butyl-6-ethyl-1-decene, 2-hexyl-1-decene, and 4-butyl-1-dodecene.

30. The process for making a sustainable aviation fuel according to claim 1, wherein the C$_{16-}$ olefin stream comprises:

4-propyl-2-octene, 5-ethyl-2-nonene, 6-methyl-2-decene, 2-undecene, 2-hexene, 2-heptene, and 2-octene;

5-propyl-3-nonene, 6-ethyl-3-decene, 7-methyl-3-undecene, 3-dodecene, 3-heptene, 3-octene, and 3-nonene;

2-methyl-4-propyl-2-octene, 5-ethyl-2-methyl-2-nonene, 2,6-dimethyl-2-decene, 2-methyl-2-undecene, 2-methyl-2-hexene, 2-methyl-2-heptene, and 2-methyl-2-octene;

6-propyl-4-decene, 7-ethyl-4-undecene, 8-methyl-4-dodecene, 4-tridecene, 4-octene, 4-nonene, and 4-decene;

7-propyl-5-undecene, 8-ethyl-5-dodecene, 9-methyl-5-tridecene, 5-tetradecene, 4-nonene, 5-decene, and 5-undecene;

2,2-dimethyl-5-propyl-3-nonene, 6-ethyl-2,2-dimethyl-3-decene, 2,2,7-trimethyl-3-undecene, 2,2-dimethyl-3-dodecene, 2,2-dimethyl-3-heptene, 2,2-dimethyl-3-octene, and 2,2-dimethyl-3-nonene; or 5-propyl-6-tridecene, 5-ethyl-7-tetradecene, 11-methyl-7-pentadecene, 7-hexadecene, 4-undecene, 5-dodecene, and 6-tridecene.

31. A process for making a sustainable aviation fuel, the process comprising:

(a) providing a bio-ethylene feed, at least a portion of which is derived from the dehydration of biomass ethanol;

(b) contacting the bio-ethylene feed with a first catalyst system comprising a first oligomerization catalyst to form an oligomerization product comprising at least one C$_4$-C$_8$ alpha-olefin and a mixture of decenes;

(c) separating the mixture of decenes from the oligomerization product;

(d) hydrogenating the mixture of decenes in the presence of a first hydrogenation catalyst to provide a mixture of decanes; and (e) using the mixture of decanes as a component to form a sustainable aviation fuel.

32. The process for making a sustainable aviation fuel according to claim 31, wherein the mixture of decanes is blended with C$_{16-}$ paraffins and/or cycloparaffins to form the sustainable aviation fuel.

33. The process for making a sustainable aviation fuel according to claim 31, wherein:

(a) the sustainable aviation fuel is certified as compliant with the Carbon Offsetting and Reduction Scheme for International Aviation (CORSIA) sustainability criteria in accordance with the International Sustainability and Carbon Certification (ISCC) CORSIA certification system; or (b) the sustainable aviation fuel is certified as a Lower Carbon Aviation Fuel (LCAF) in accordance with the International Sustainability and Carbon Certification (ISCC) LCAF certification system;

wherein the certification is based upon the weight or fraction of the sustainable aviation fuel attributable to the biomass ethanol determined by mass balance and a free attribution method.

34. The process for making a sustainable aviation fuel according to claim 31, wherein the mixture of decenes comprises 1-decene, 2-butyl-1-hexene, 3-propyl-1-heptene, 4-ethyl-1-octene, 5-methyl-1-nonene, 4-decene, 5-decene, or any combination thereof.

35. The process for making a sustainable aviation fuel according to claim 34, wherein the at least one $C_4$-$C_8$ alpha-olefin comprises 1-butene, 1-hexene, 1-octene, or any combination thereof.

36. The process for making a sustainable aviation fuel according to claim 35, wherein the oligomerization product comprises:
- at least 60 mol % 1-hexene, at least 60 mol % 1-octene, or at least 60 mol % 1-hexene and 1-octene combined; or
- from 70 wt. % to 99.8 wt. % hexene or from 70 wt. % to 99.8 wt. % octene, and at least 0.2 wt. % of the mixture of decenes.

* * * * *